US010715329B1

(12) United States Patent
Wellman

(10) Patent No.: US 10,715,329 B1
(45) Date of Patent: Jul. 14, 2020

(54) PERSONATED REALITY ECOSYSTEM

(71) Applicant: PERSONATED REALITY SOLUTIONS INC., Lexington, MA (US)

(72) Inventor: William L. Wellman, Lexington, MA (US)

(73) Assignee: PERSONATED REALITY SOLUTIONS INC., Lexington, MA (US)

( * ) Notice: Subject to any disclaimer, the term of this patent is extended or adjusted under 35 U.S.C. 154(b) by 0 days.

(21) Appl. No.: 16/661,909

(22) Filed: Oct. 23, 2019

Related U.S. Application Data

(60) Provisional application No. 62/869,782, filed on Jul. 2, 2019.

(51) Int. Cl.
*H04L 9/32* (2006.01)
*H04L 9/06* (2006.01)
(Continued)

(52) U.S. Cl.
CPC .......... *H04L 9/3231* (2013.01); *H04L 9/0643* (2013.01); *H04L 9/0819* (2013.01);
(Continued)

(58) Field of Classification Search
CPC ....... H04L 9/3231; H04L 9/0819; H04L 9/30; H04L 9/3213; H04L 9/0643; H04L 2209/38
See application file for complete search history.

(56) References Cited

U.S. PATENT DOCUMENTS

2013/0191724 A1* 7/2013 Locufier ............... G06F 16/958
715/234
2013/0283055 A1* 10/2013 Dettinger ............... G06F 21/16
713/176
(Continued)

FOREIGN PATENT DOCUMENTS

CN 108509546 A * 9/2018

OTHER PUBLICATIONS

Zollhofer, Michael et al., "Automatic Reconstruction of Personalized Avatars from 3D Face Scans", Computer Animation and Virtual Worlds, Wiley, 2011, 8 pages. (Year: 2011).*
(Continued)

*Primary Examiner* — Michael Pyzocha
(74) *Attorney, Agent, or Firm* — Nguyen Tarbet

(57) ABSTRACT

A Personated Reality Ecosystem System enables real-time interactions between Users and Personated Virtual Assistants (PVA) acting on behalf of the User. The PVA is a computer-generated character, an animated virtual human, combined with artificial intelligence and a unique digital identity that is authenticated and authorized using blockchain technologies. A PVA when initially created is not unique hence is referred to as a GenericPVA. A GenericPVA can undergo a process that makes it unique transforming it into a UniquePVA. The PVA looks, behaves, communicates, thinks, reasons and learns, like a human being displayed on a computer screen or other visual representation. UniquePVAs are paired with Users utilizing secure blockchain technologies ensures the UniquePVA only accepts orders from the User they are paired with.

20 Claims, 40 Drawing Sheets

(51) Int. Cl.
*H04L 9/30* (2006.01)
*H04L 9/08* (2006.01)
(52) U.S. Cl.
CPC .............. *H04L 9/30* (2013.01); *H04L 9/3213* (2013.01); *H04L 2209/38* (2013.01)

(56) References Cited

U.S. PATENT DOCUMENTS

| 2014/0109201 A1* | 4/2014 | Israel | G06F 21/31 726/5 |
| 2016/0066034 A1* | 3/2016 | Hicks | H05K 999/99 725/12 |
| 2016/0269178 A1* | 9/2016 | Yang | H04L 63/0861 |

OTHER PUBLICATIONS

Bader, S. et al., "Identity Management in Virtual Worlds Based on Biometrics Watermarking", International Science Index, Computer and Systems Engineering vol. 10, No. 8, 2016, pp. 1478-1482. (Year: 2016).*

Samira, Bader et al., "A Securing Access Approach to Virtual worlds Based on 3D Mesh Watermarking of Avatar's Face", IEEE 2014, 6 pages. (Year: 2014).*

Samira, Bader et al., "Robust and blind watermarking of avatar faces", 2014 Information and Communication Technologies Innovation and Application (ICTIA), 6 pages. (Year: 2014).*

* cited by examiner

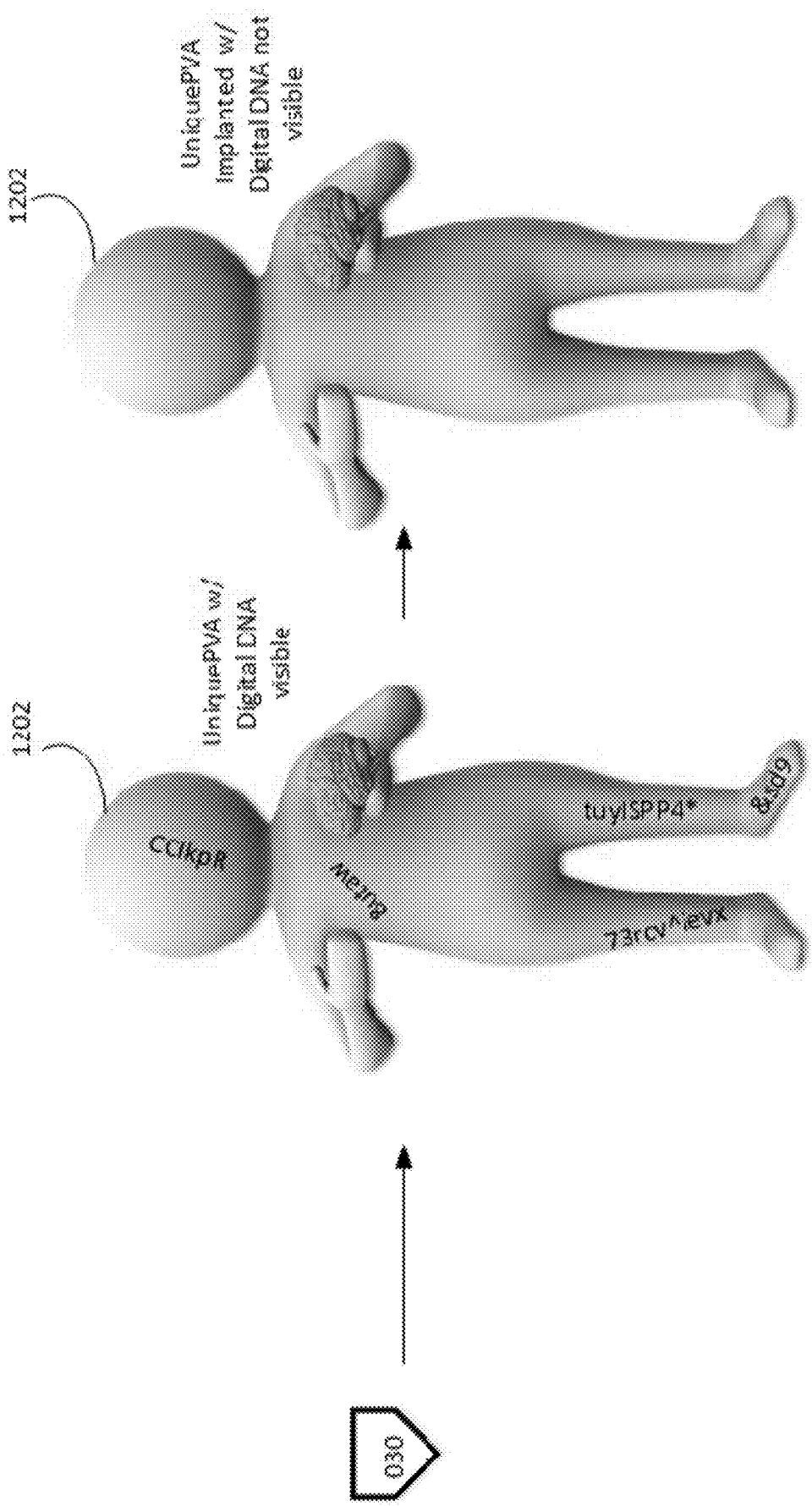

*AI Improvement Engine*

*Human Expert*

Human Assistant in expert's office is notified of appointment and takes no action to modify appointment.

FIG. 12D

PVA Digital DNA

Fungible Token Character String

N21 13Ayxn77#65mtuyISPP4*8utawCCikpR&sd9ut9vbjlq$ggmqcx73rcv^ievx

PVA with Fungible Token Character string components in normal state – not visible PVA with Fungible Token Character string components revealed

PERSONATED REALITY ECOSYSTEM

CROSS-REFERENCES TO RELATED APPLICATIONS

This application is a non-provisional and claims benefit of U.S. Patent Application No. 62/869,782, filed Jul. 2, 2019, the specification(s) of which is/are incorporated herein in their entirety by reference.

BACKGROUND OF THE INVENTION

Field of the Invention

The present invention relates to personated virtual reality. More specifically, the present invention relates to secure interactions between human users and personated virtual assistants (PVAs) in synchronous real time and asynchronous off-line mode. A PVA when initially created is not unique hence is referred to as a GenericPVA. A GenericPVA can undergo a process that makes it unique, one of a kind, transforming it into a UniquePVA.

Background of the Art

Virtual assistants have the potential to assist users so as to simplify tasks and increase overall productivity. However, existing virtual assistants are not unique, digital entities with unique human likenesses, mathematically and exclusively paired with their users in a one-to-one relationship. As will be appreciated by those skilled in the art, that exclusivity is essential to relationships between the user and the virtual assistant in which trust and privacy are paramount.

Relationships with existing virtual assistants can be compromised in various ways, including (but not limited to) impersonation of the virtual assistant by third parties and interception of private conversations between the virtual assistant and user. The unauthenticated virtual assistants that currently exist are susceptible to unauthorized access by third parties, resulting in the unauthorized disclosure of confidential user information and information contained in the conversation. In addition to this vulnerability, a limitation of the interaction between existing virtual assistants and users is that such interactions are primarily synchronous (i.e., in real time) and scheduled. In contrast, PVAs operate in both synchronous real time and asynchronous mode, allowing the PVA to receive tasks assigned by a user (in a synchronous/real-time session), complete the assigned tasks (while asynchronous/offline) utilizing independent, algorithmic judgment, and report to the user (in a subsequent, synchronous/real-time session) the completion status and/or results.

Existing virtual assistants access data repositories and interact with things to complete the assignments tasked by the user. In contrast, PVAs can interact with other human beings on behalf of (i.e., as an agent for) the paired user. Existing virtual assistants are limited to performing very specific, user-defined tasks, such as turning on the lights at a specific time of day or day of the week. In contrast, PVAs perform complex activities based upon expert judgment imbued in advanced algorithms. For example, a trusted UniquePVA operating as a virtual assistant for a medical doctor would utilize an algorithm defined by the physician that could not be altered by anyone other than the physician. Such a UniquePVA would be able to adjust the dosage of a patient's blood pressure medication based upon information obtained from a secure conversation with the patient, observation of the patient via streaming video, and trusted medical data collected from medical devices.

The bedrock of the physician-patient relationship is trust. To engender that trust, any agent of the physician must therefore fully embody the physician's trustworthiness.

SUMMARY OF THE INVENTION

The present invention provides a system (referred to herein as a "Personated Reality Ecosystem") and method for real-time interactions between a user and a personated virtual assistant (PVA). The term "personated virtual assistant" (PVA) refers to a 2-dimensional or 3-dimensional graphical representation of a human being capable of performing in a variety of roles which may include (but are not limited to) a physician assistant, a retail clerk, a stock broker, a customer service agent, a shipping clerk, a bank teller, a sales agent, a health coach and a real estate agent. The PVA may be embodied as a collection of instructions stored in a computer-readable storage medium. By way of non-limiting example, computers, servers, mobile devices, and generally any device with a processor, RAM, and the computer-readable storage medium may render the PVA onto any display device. Display devices may include such non-limiting examples as a computer monitors, LED screens, OLED screens, LCD screens, plasma screens, cathode-ray tubes, tablets, mobile devices, etc. The instructions may include (but are not limited to) instructions for rendering the PVA, registering the UniquePVA, authenticating the UniquePVA, executing user instructions, providing services to a user and diagnosis of a user. The human users may include (but are not limited to) a physician, a lawyer, a business owner, a sales executive, a patient, a customer, a student, a manager, an employee, a teacher, an engineer, a dentist, a journalist, a pharmacist, an accountant, a plumber, an electrician and a passenger that is a human or other animal.

Instructions for diagnosis may include instructions for synchronous/real-time interaction and asynchronous/offline user interaction. The concept of synchrony, as used herein, refers generally to a session of user input. Thus, instructions for "synchronous" or "real-time" user interaction may include instructions for user interface, including (without limitation) conversation (i.e., natural language interface methods known in the art) and other I/O methods known in the art (including such non-limiting examples as typing, gesturing, prosthetic interface, etc.). The concept of asynchrony, as used herein, refers to processing functions that the PVA performs in the background that are based on the user input without requiring further/continuous user input, such as (but not limited to) database queries, data-processing, networking, operation of peripherals, training neural networks, etc.

Instructions for binding an unregistered UniquePVA to a user may include instructions for receiving a first user ID; retrieving a binding key; capturing a first biometric of the user; retrieving a UniquePVA ID, retrieving a UniquePVA then concatenating the first biometric, the binding key and the UniquePVA, hashing the concatenation, providing the hash (also known as the a digital binding chain) to a smart contract in a blockchain and storing the hash in a new block on the blockchain.

Instructions for concealing the Digital DNA in the GenericPVA may include instructions for rendering the non-fungible token data string as a 2-dimensional or 3-dimensional vector graphic, determining how to cut up the vector graphic into a plurality of vector graphic segments that will graphically fit (with respect to spatial structure in 2D or 3D space) their respective hiding places in the GenericPVA, cutting up the vector graphic into the vector graphic segments, hiding each vector graphic segment in the GenericPVA by mapping the position and orientation of the vector graphic segments with the position and orientation of the respective hiding place to create a UniquePVA when all vector graphic segments have been successfully hidden. As the UniquePVA is animated, the position and orientation of a hiding place may change through a series of geometric transformations, such as translation, reflection, rotation, and dilation. Each of the vector graphic segments may change through a series of geometric transformations, such that the position and orientation of the vector segment is aligned with the new position and orientation of the respective hiding place.

Instructions for authentication of a UniquePVA may include instructions for receiving a second user ID, receiving a second password, capturing a second biometric of the user, retrieving a binding key, retrieving a UniquePVA, computing a second digital binding chain with the concatenated biometric, binding key and UniquePVA, and comparing the second digital binding chain with the first digital binding chain stored on a blockchain. An identical match authenticates the UniquePVA and its relationship to the user.

One of the unique and inventive technical features of the present invention is the uniqueness of the UniquePVA digital object. As a unique digital object, the UniquePVA can't be unknowingly altered or modified because it contains unique digital DNA. The UniquePVA can be paired with a user through a unique digital bond, a unique digital binding chain, utilizing a concatenation of the user biometric, a key securely stored on the users personal computing device and the UniquePVA. This information is mathematically combined to form a unique cryptographic code (hash code) that pairs the PVA and the user. The unique cryptographic code, a unique link between the PVA and the user, is stored on a blockchain making it immutable.

Each interactive session between the PVA and the User is proceeded by computing this unique cryptographic code and validating it against the original cryptographic code stored on the blockchain. The UniquePVA will only accept commands from the unique User with whom they are paired. This allows a unique trusted relationship to be established between the UniquePVA and the User. As part of this trusted relationship, the UniquePVA will only execute commands from the User and will maintain the privacy and confidentiality of the information obtained from the User and their interactions. Digital objects can easily be replicated however, surprisingly the UniquePVA is a unique digital object that is paired with a user using the user's unique biometrics. Existing virtual assistants are easily replicated by simply copying the software without any means of verification by the user the software has not been modified or infected with malware. Infused with a unique character data string, the UniquePVA and its associated software is validated as being unchanged and uniquely associated with a unique user thereby rendering it trustworthy. Without wishing to limit the invention to any theory or mechanism, it is believed that the technical feature of the present invention advantageously provides for trusted digital virtual assistants. None of the presently known prior references or work has the unique inventive technical feature of the present invention. Furthermore, the prior references teach away from the present invention. For example, voice activated digital assistants have been demonstrated to not be trustworthy, including maintaining user privacy. Voice activated digital assistants have been demonstrated to be inadvertently activated by a random person in the room who happens to utter an activation key word. Subsequently, unauthorized recordings are made by the voice activated digital assistants which can later be used in violation of the user's rights including the use of such recordings in court cases against the user. Deepfake videos of numerous well known individuals containing fake digital objects have appeared on popular social media sites wherein the fake digital representation of the well-known individuals express false points of view that are inconsistent with their true point of view of the human being. The fake likenesses and points of view appear to be accurate to viewers of the video. It is difficult to validate and authenticate the relationship between the digital likeness and the actually human being the likeness represents. The fake likeness can be made to mimic the movements and gestures of the actually human being it represents making it difficult to detect the fraud.

Furthermore, the inventive technical features of the present invention contributed to a surprising result. For example, only the user paired with the UniquePVA can activate the UniquePVA as this activation is tied to a combination of the user's biometrics and a password known by the user. This security can be enhanced by requiring an additional biometric and the use of a specific electronic device. While surprisingly easy for the paired user to activate the UniquePVA, it is exceedingly difficult if not impossible for an unauthorized user to access to the UniquePVA. Surprisingly, the UniquePVA is a unique digital entity that will only perform tasks and activities for the paired user making the UniquePVA an exclusive trusted agent.

It is to be understood that both the foregoing general description and the following detailed description are exemplary and explanatory only and are not restrictive of the disclosed embodiments, as claimed. Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE SEVERAL VIEWS OF THE DRAWING(S)

The features and advantages of the present invention will become apparent from a consideration of the following detailed description presented in connection with the accompanying drawings in which:

FIGS. 1A-1E illustrate the interaction of components of the Personated Reality Ecosystem (PRE) including the vector based mechanism for concealing digital DNA in a unique Personated Virtual Assistant (UniquePVA).

Figure 1A:
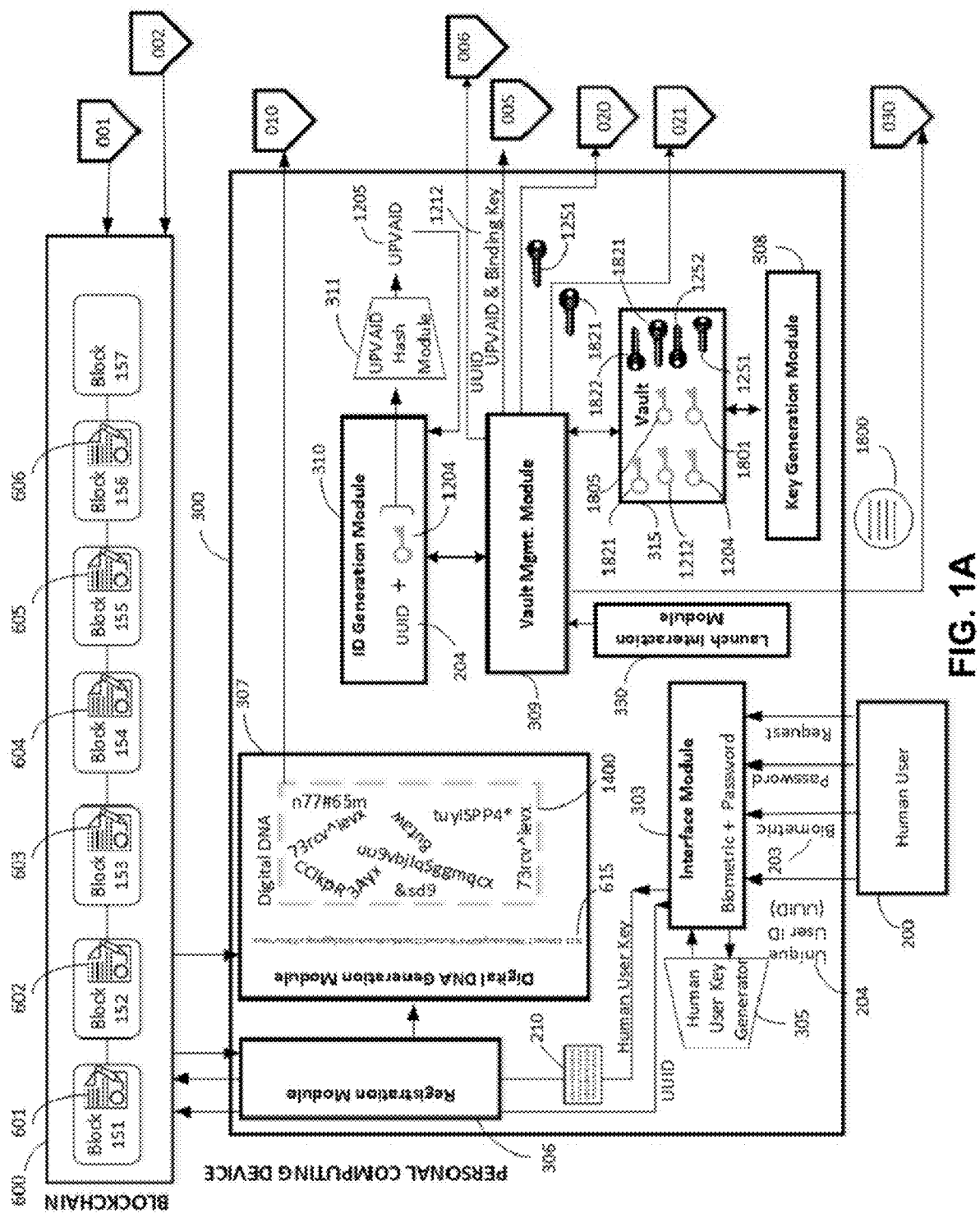
Figure 1B:
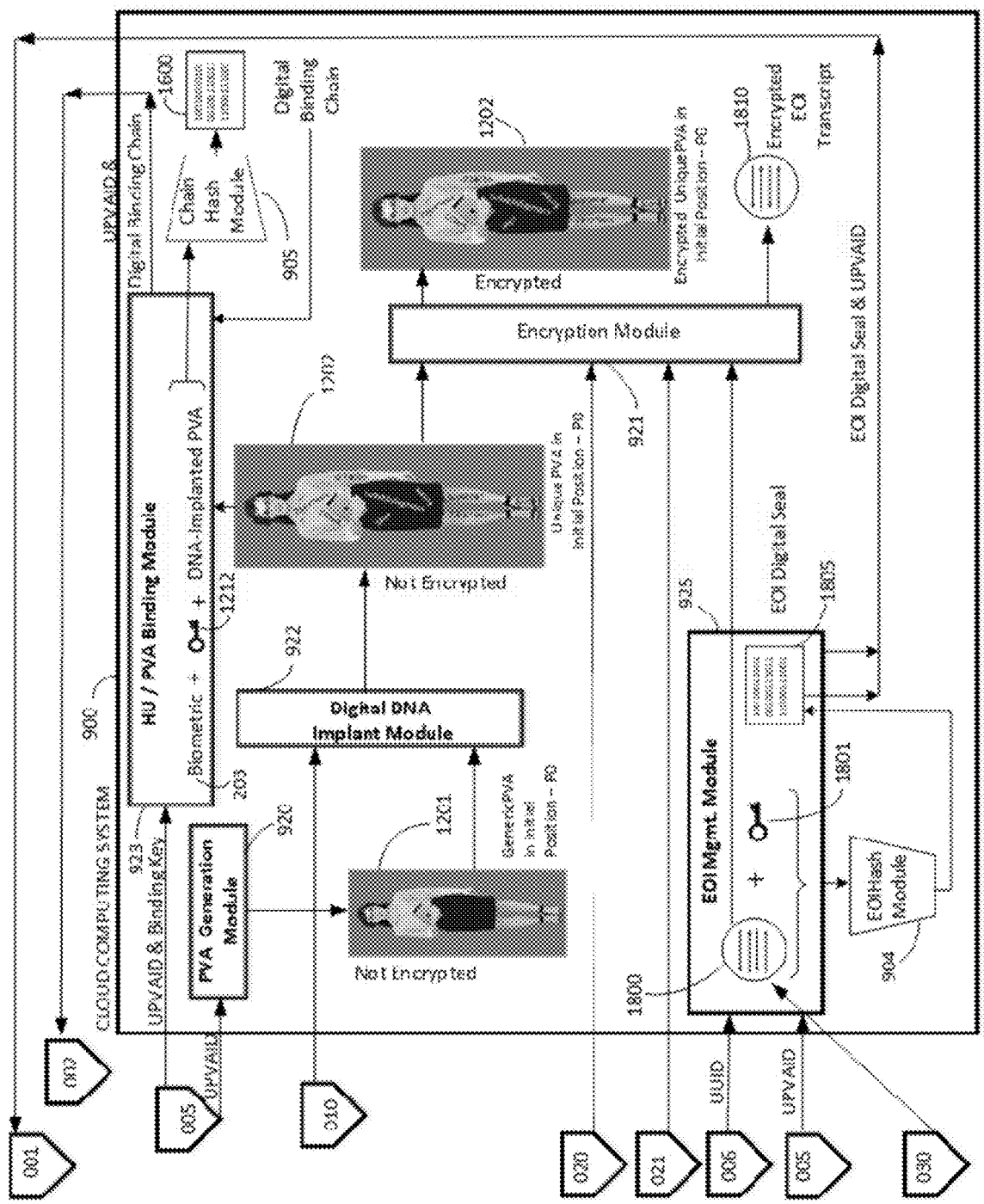
Figure 1C:
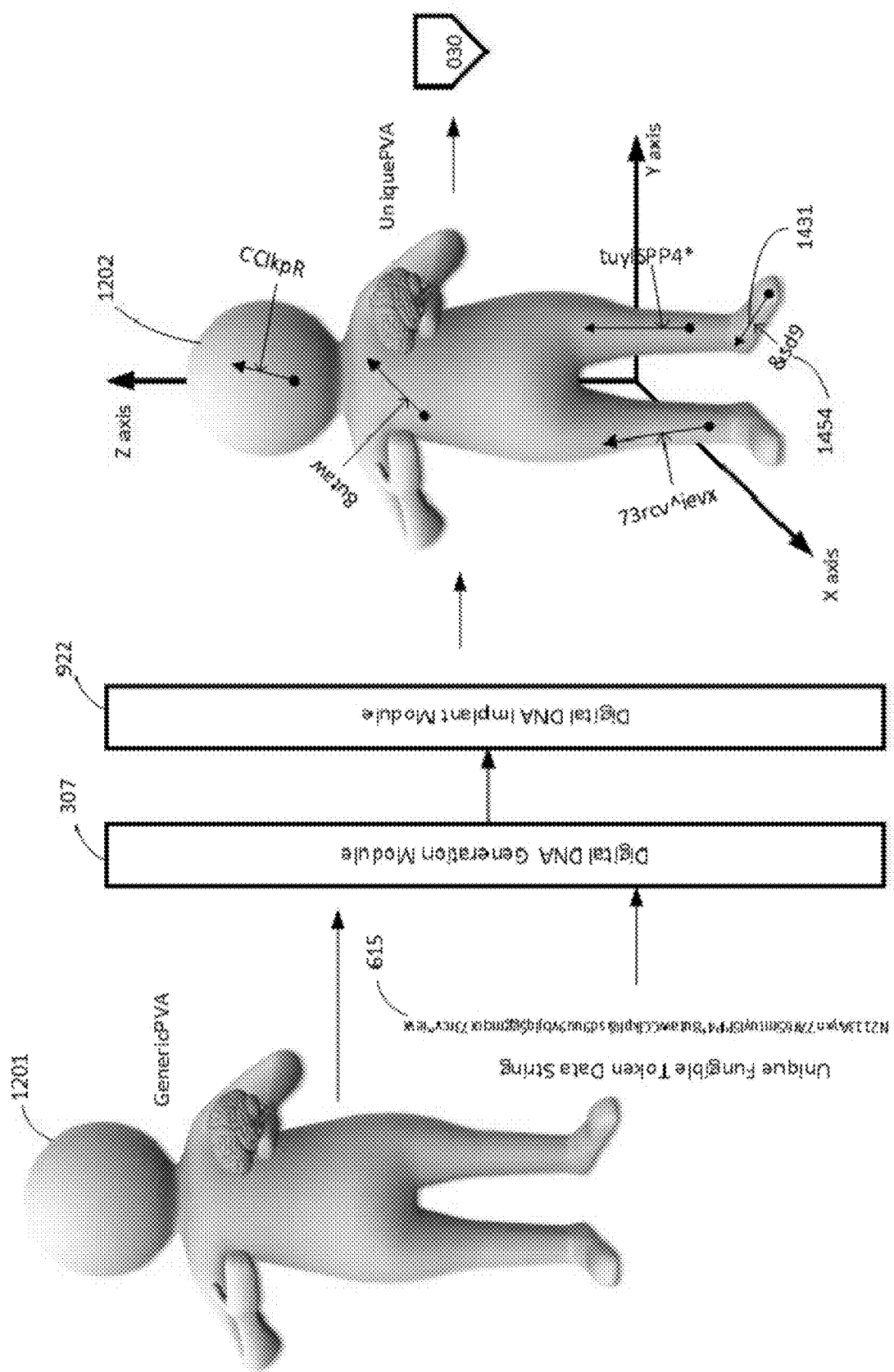
Figure 1E:
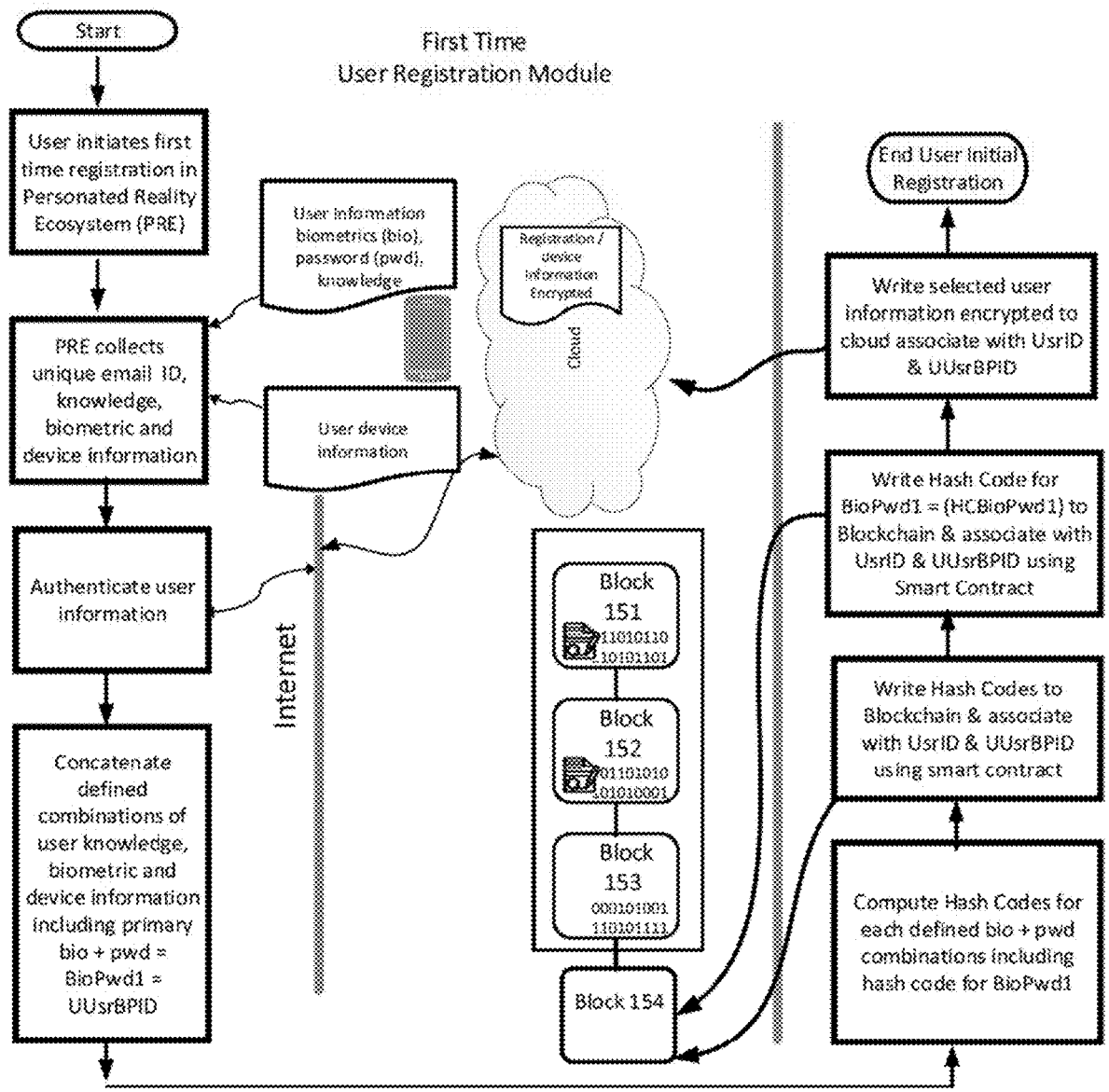
Figure 2A:
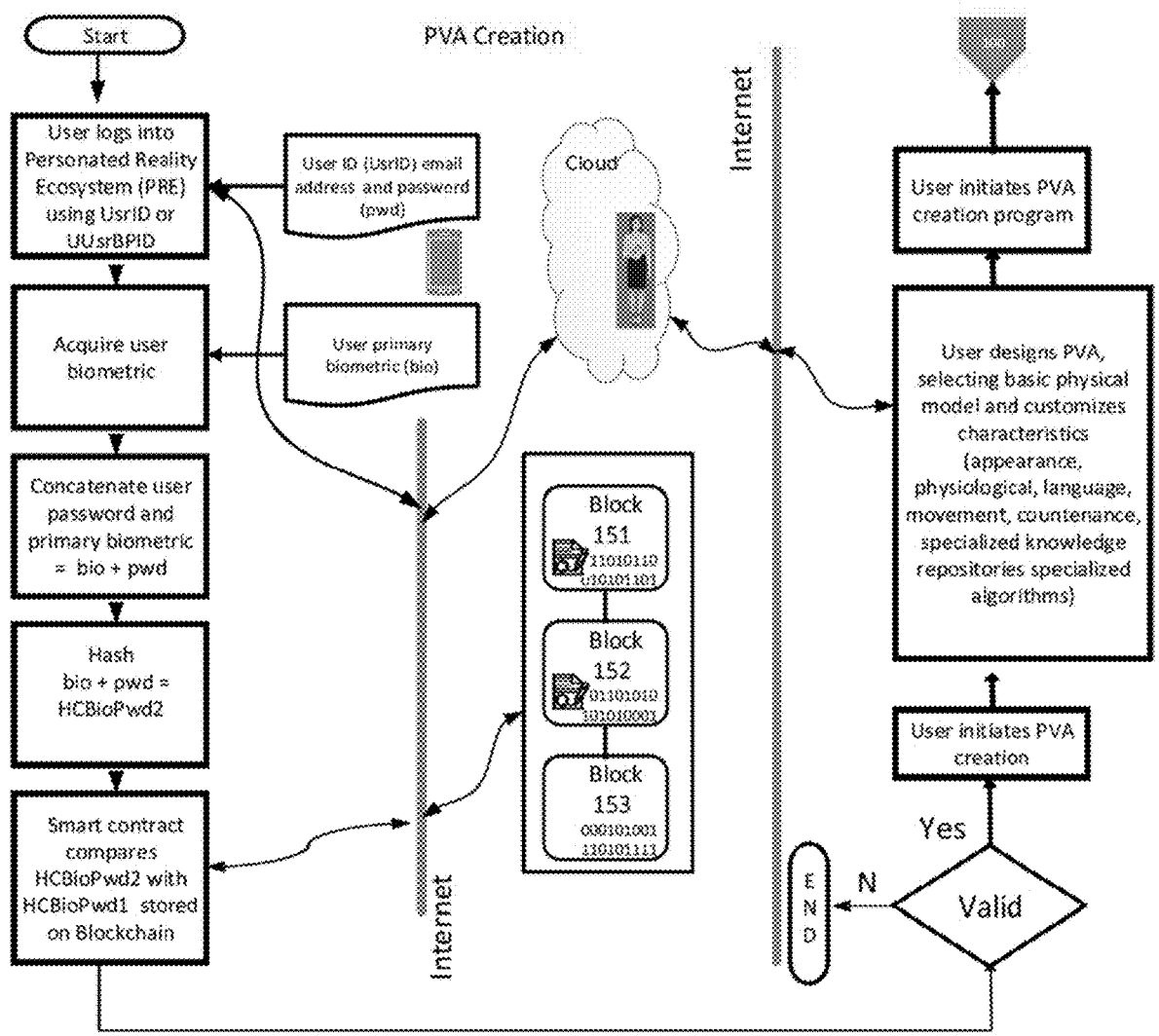
FIGS. 2A-2D illustrate the mechanism utilized to create a unique UniquePVA and create an immutable pairing between the UniquePVA and the User.
Figure 2B:
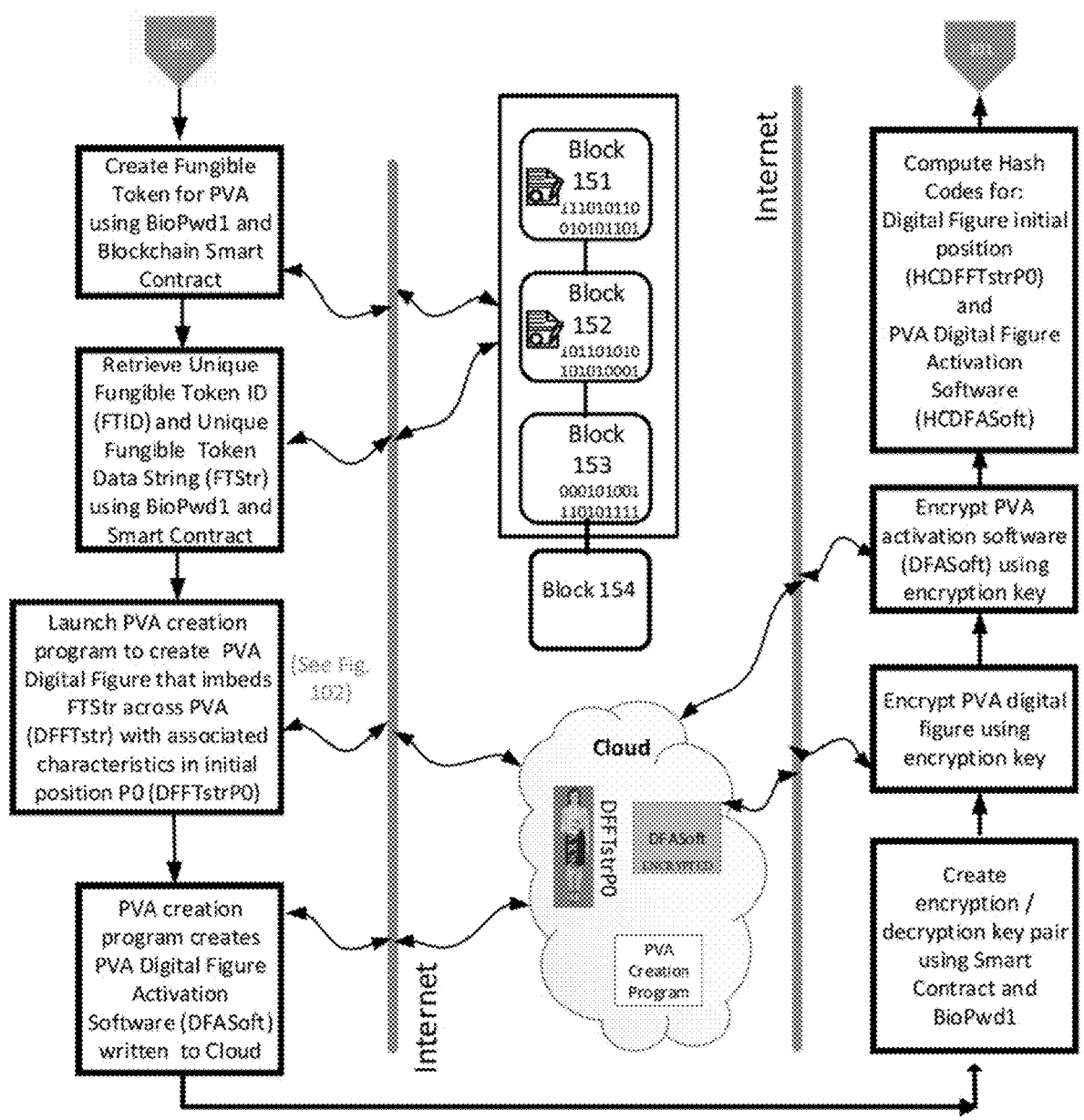
Figure 2C:
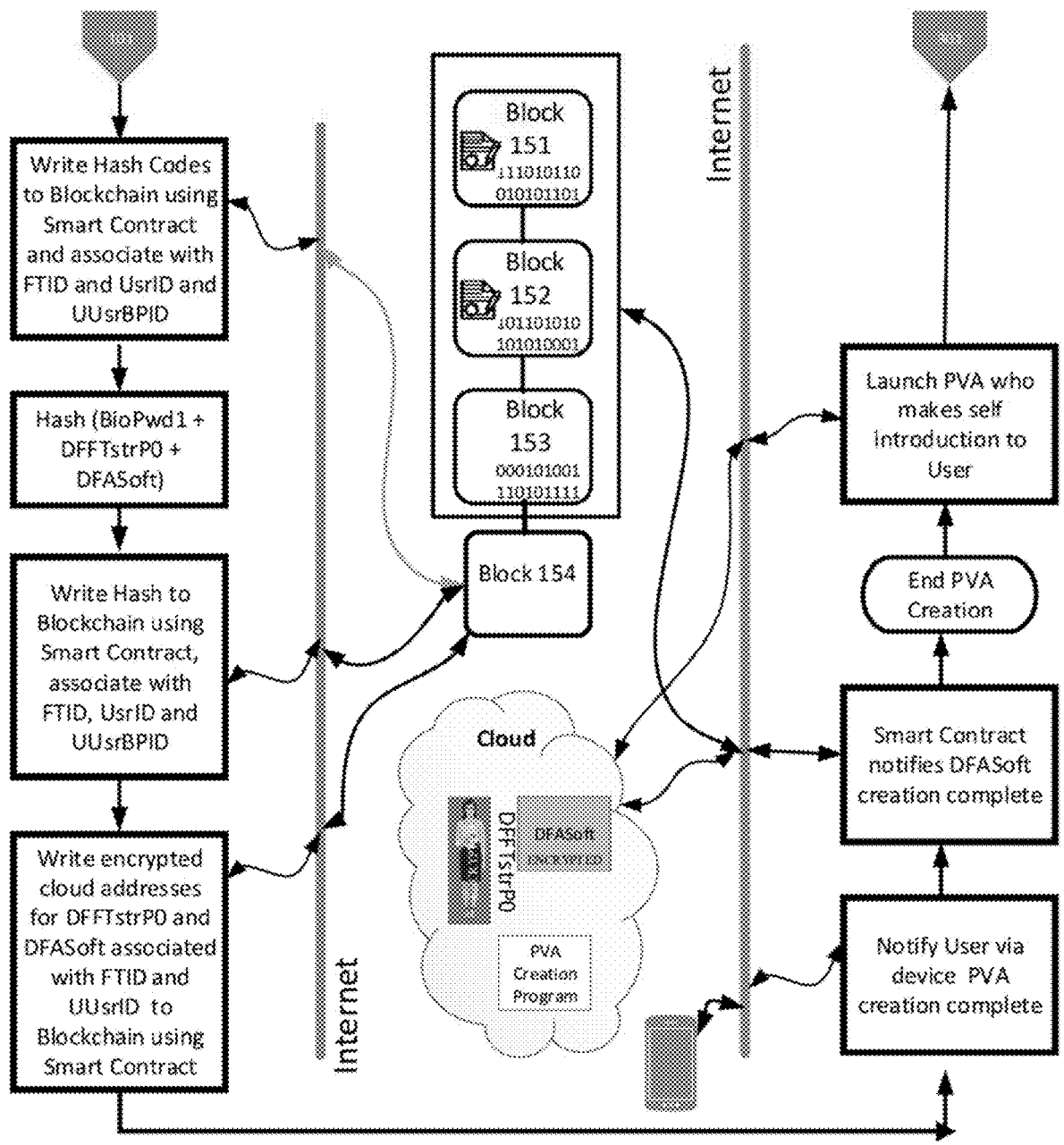
Figure 2D:
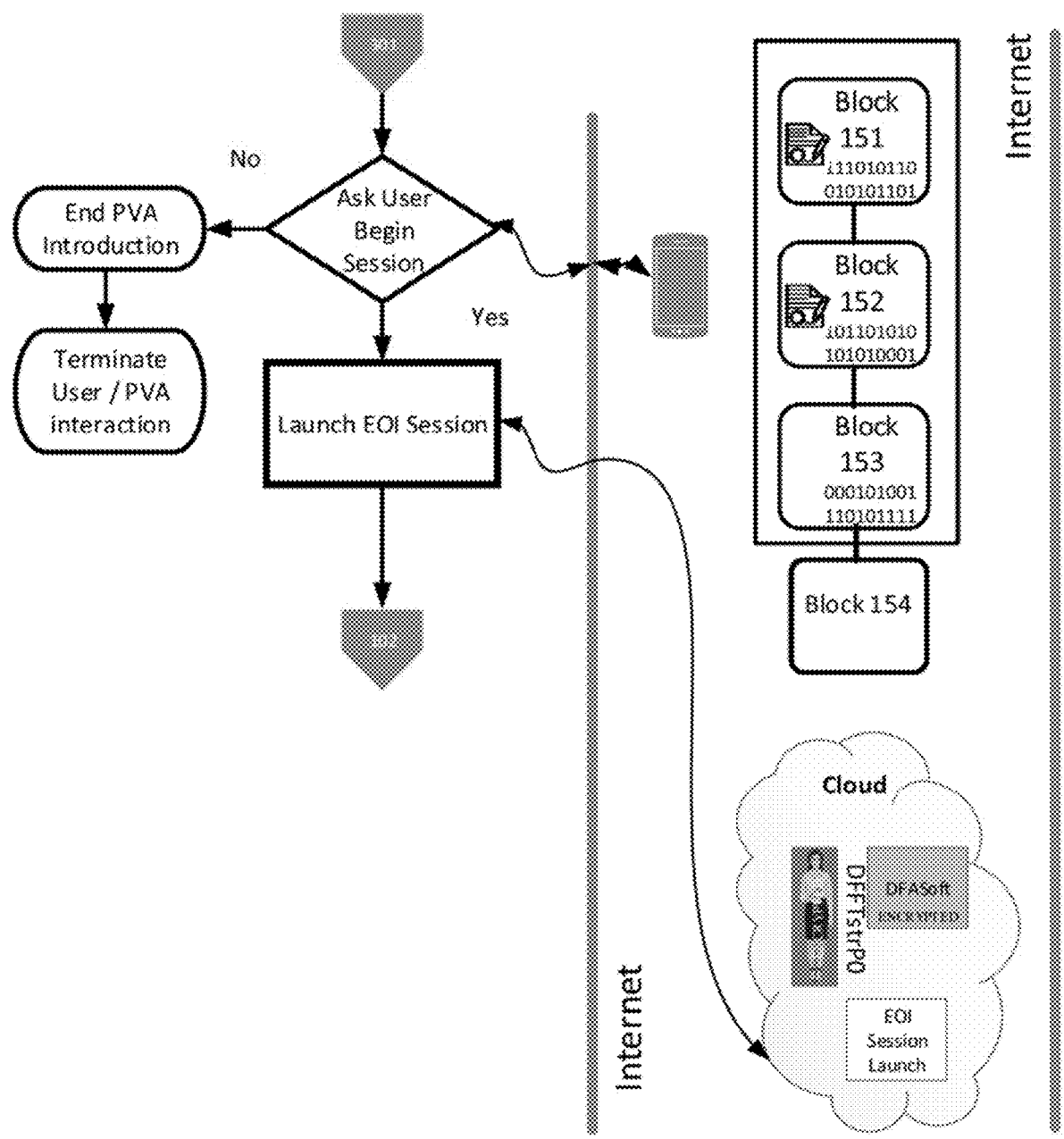
Figure 3:
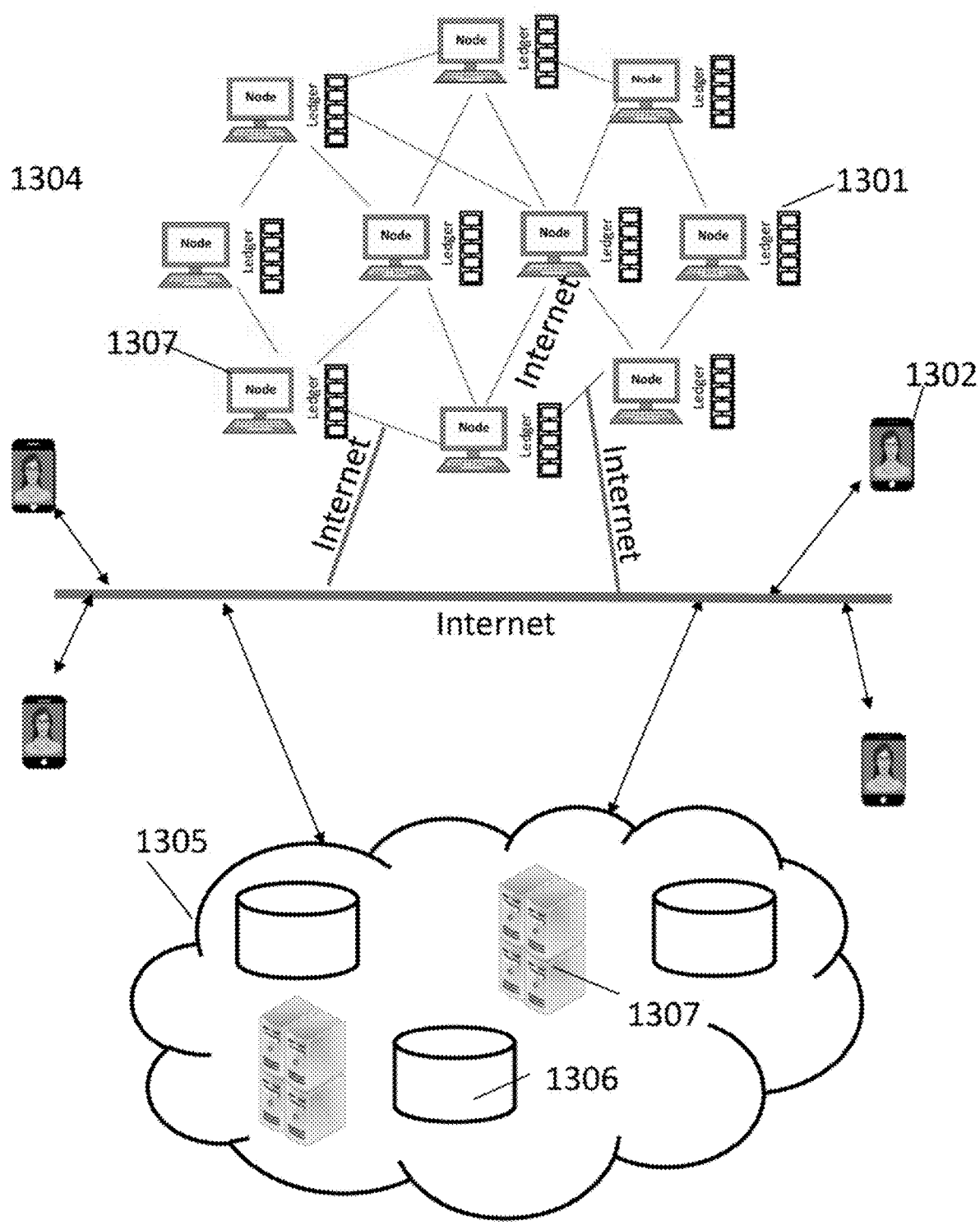
FIG. 3 shows a schematic illustrating a personated virtual assistant (PVA) system.
Figure 4:
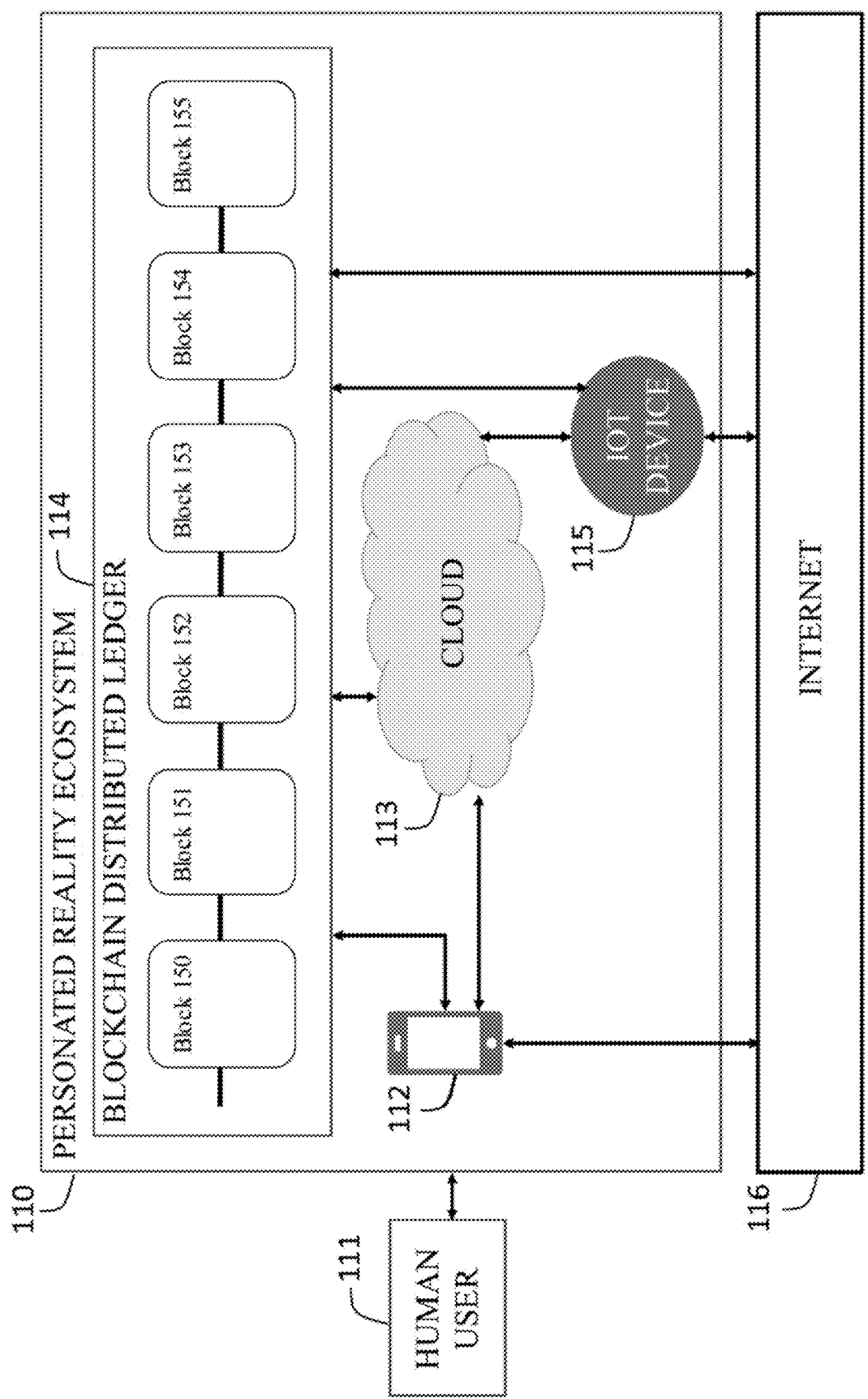
FIG. 4 illustrates the fundamental components of the Personated Reality Ecosystem, their interrelationships and their interaction with the user of the system.
Figure 5:
FIG. 5 illustrates a unique Personated Virtual Assistant (UniquePVA) possessing all of the visual characteristics of a human being holding an object.
Figure 6:
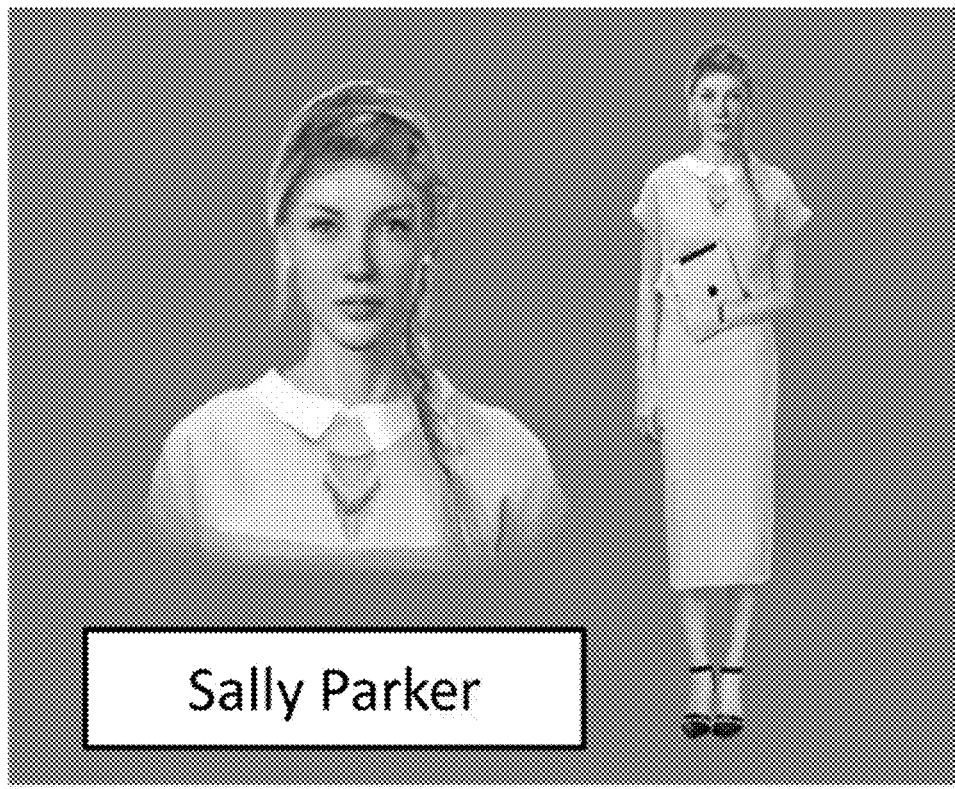
FIG. 6 illustrates a second unique Personated Virtual Assistant (UniquePVA) holding an object.
Figure 7:
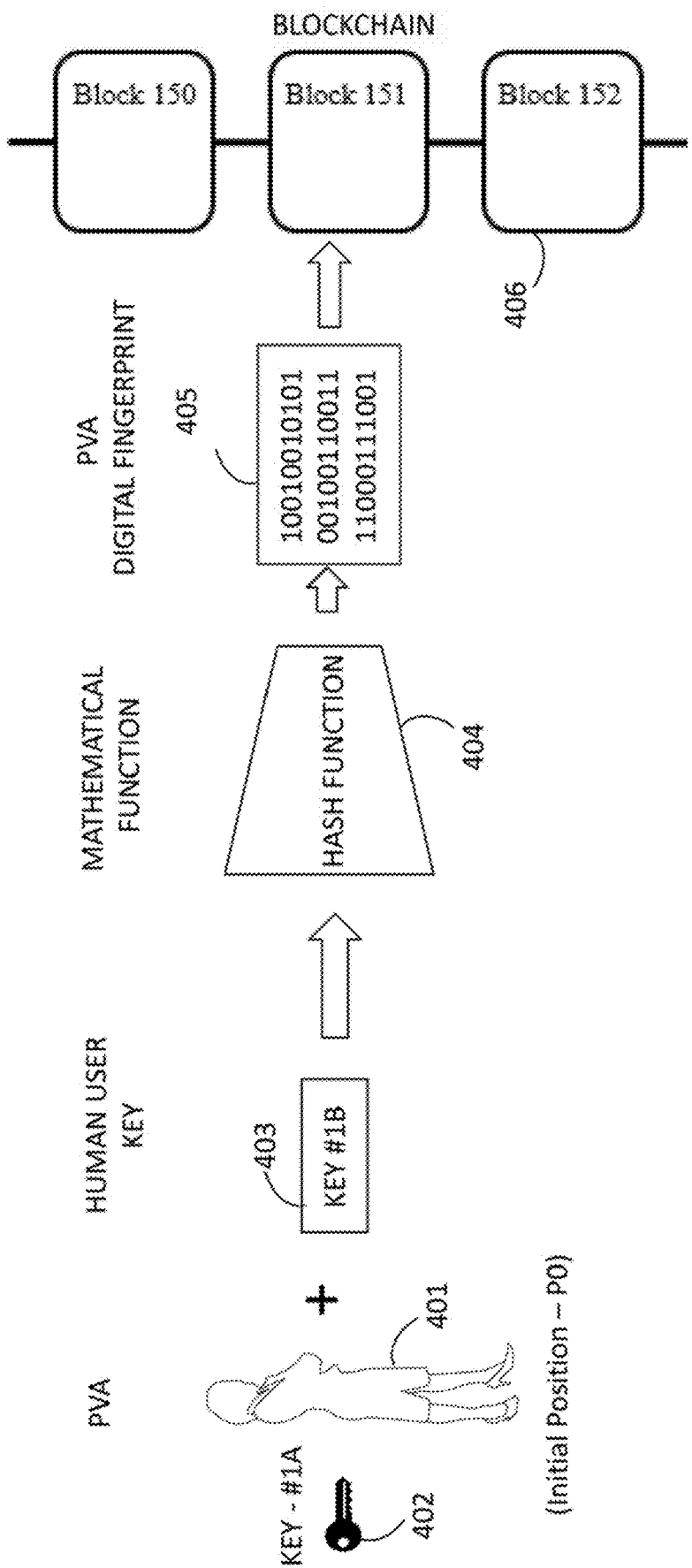
FIG. 7 illustrates the creation and recording of a unique digital fingerprint to a blockchain for a unique Personated Virtual Assistant (UniquePVA) in the initial or starting position on a Cloud Computing System.
Figure 8:
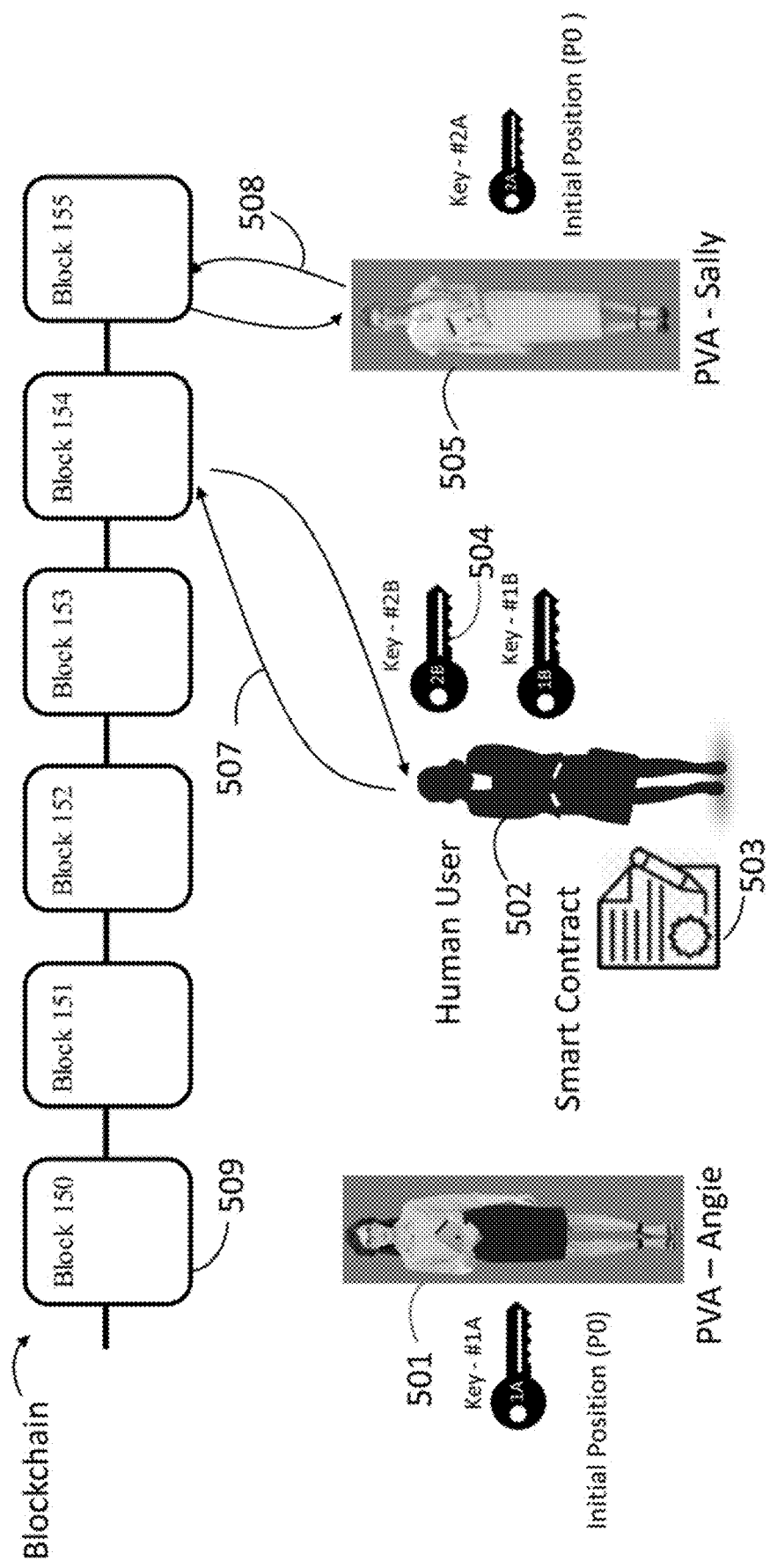
FIG. 8 illustrates the authentication of a unique Personated Virtual Assistant previously registered on the blockchain using a Smart Contract by a User.
Figure 9:
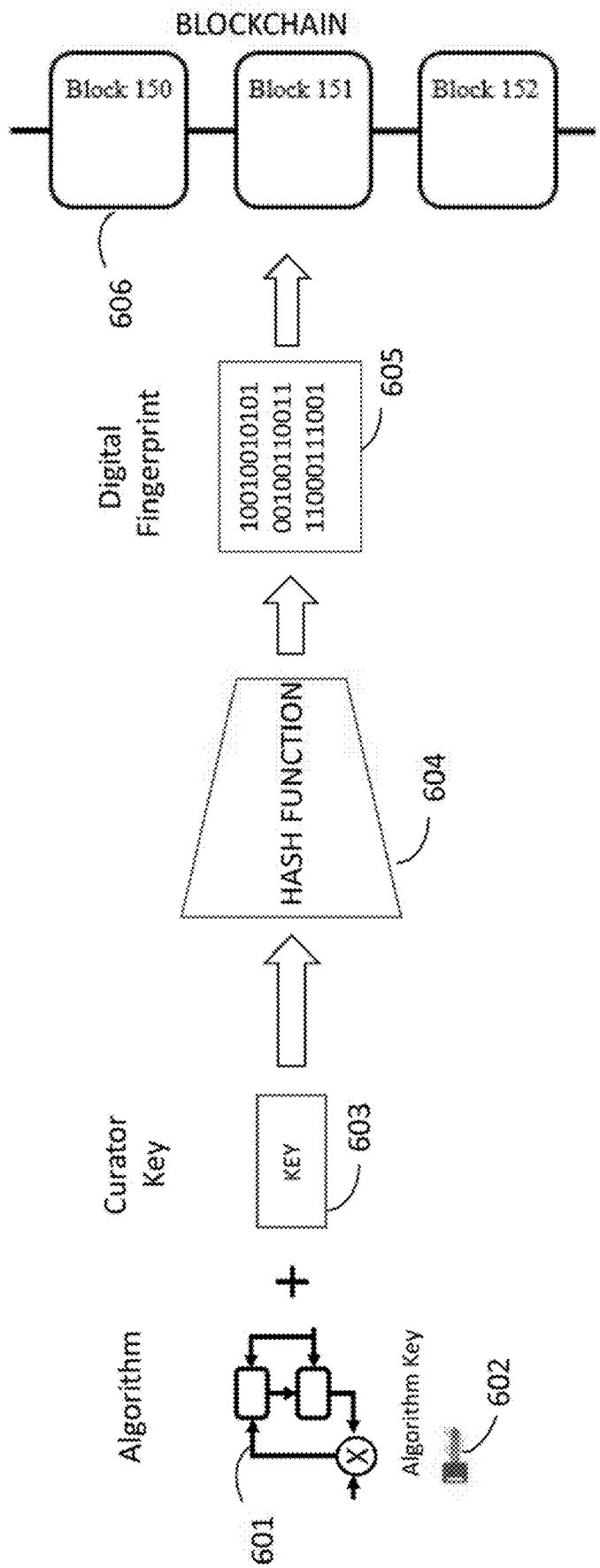
FIG. 9 illustrates the creation and recording of a digital fingerprint for an algorithm utilized by a unique Personal Virtual Assistant.
Figure 10:
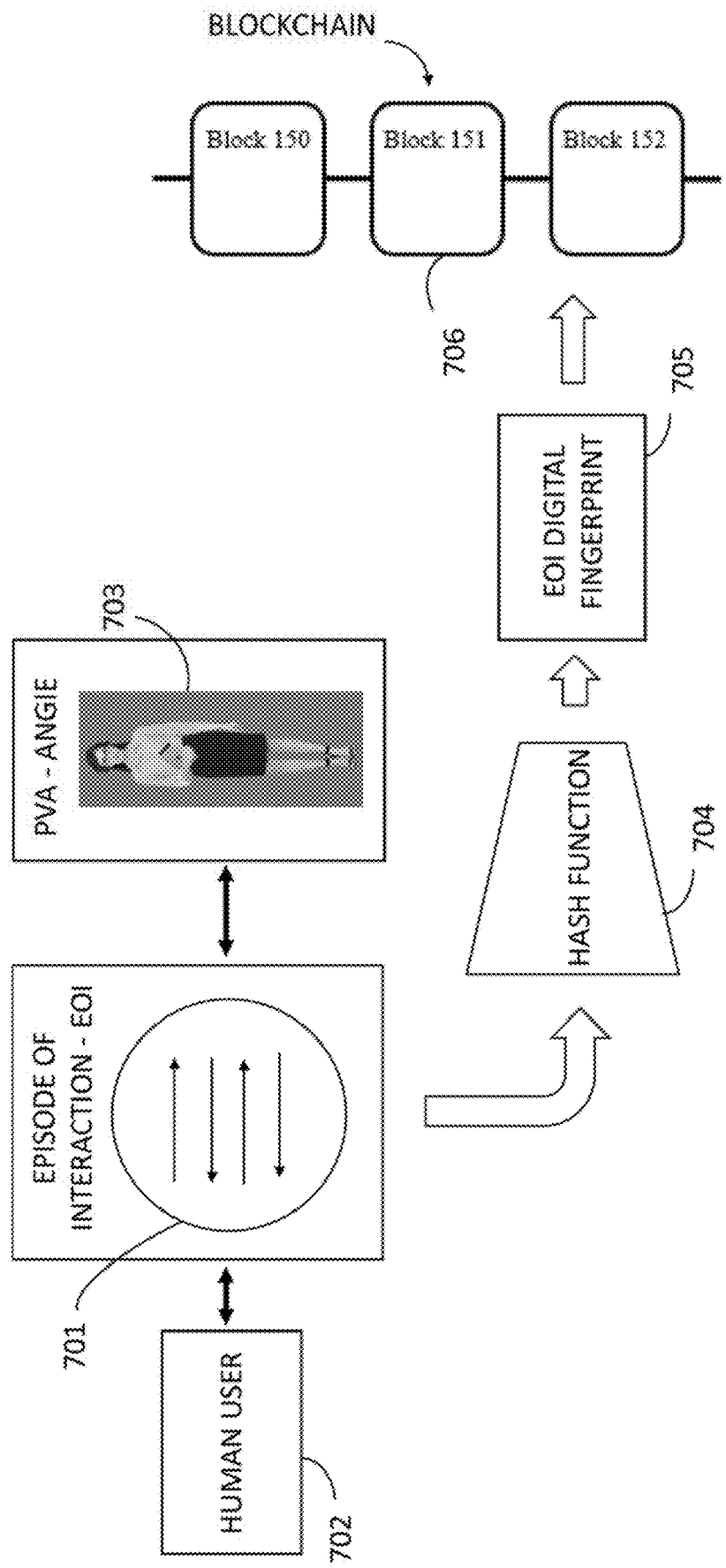
FIG. 10 illustrates the creation and recording of an Episode of Interaction (EOI) digital hash code for a completed episode of interaction between a User and a unique Personated Digital Assistant.
Figure 11:
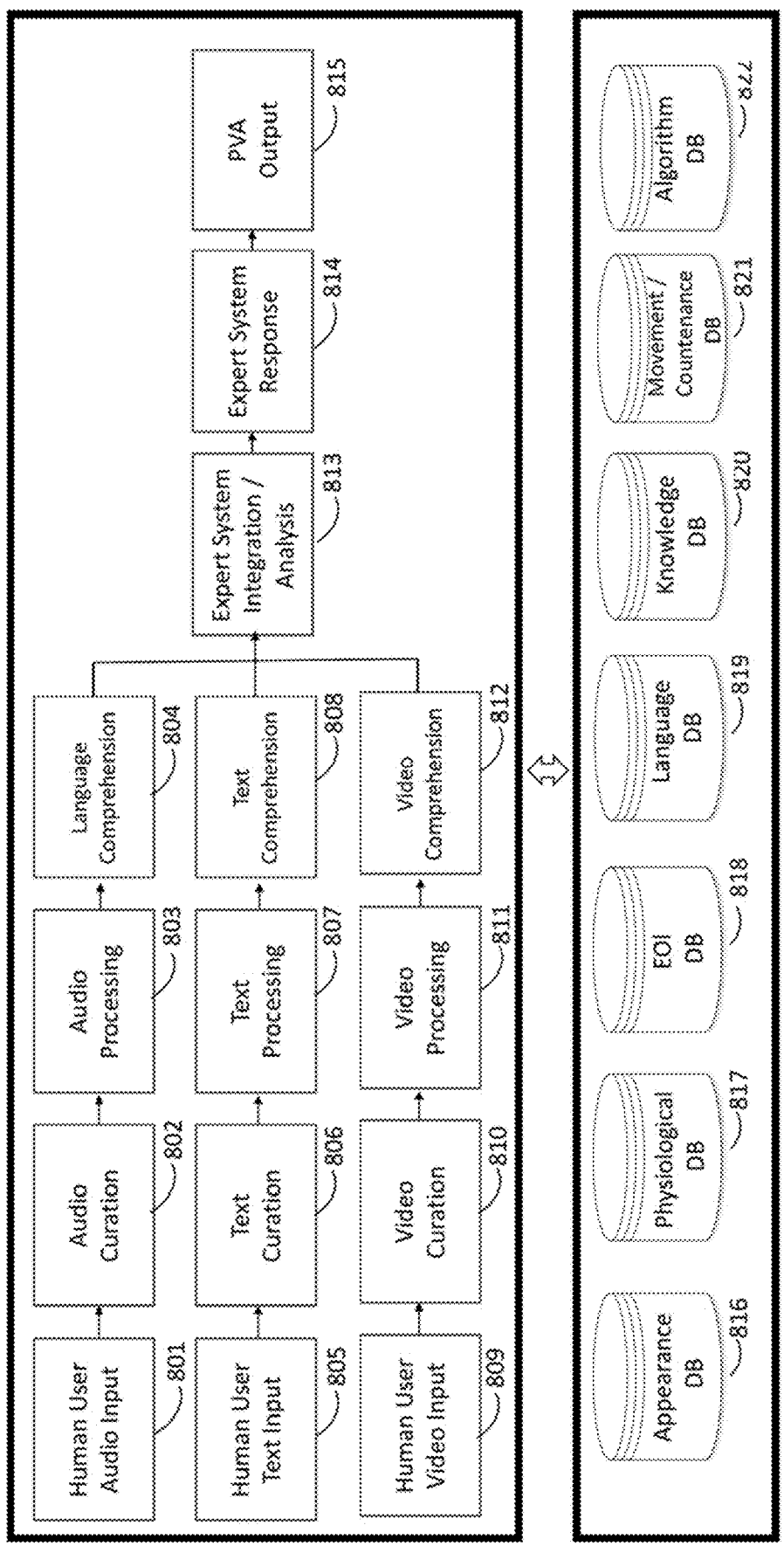
Figure 12A:
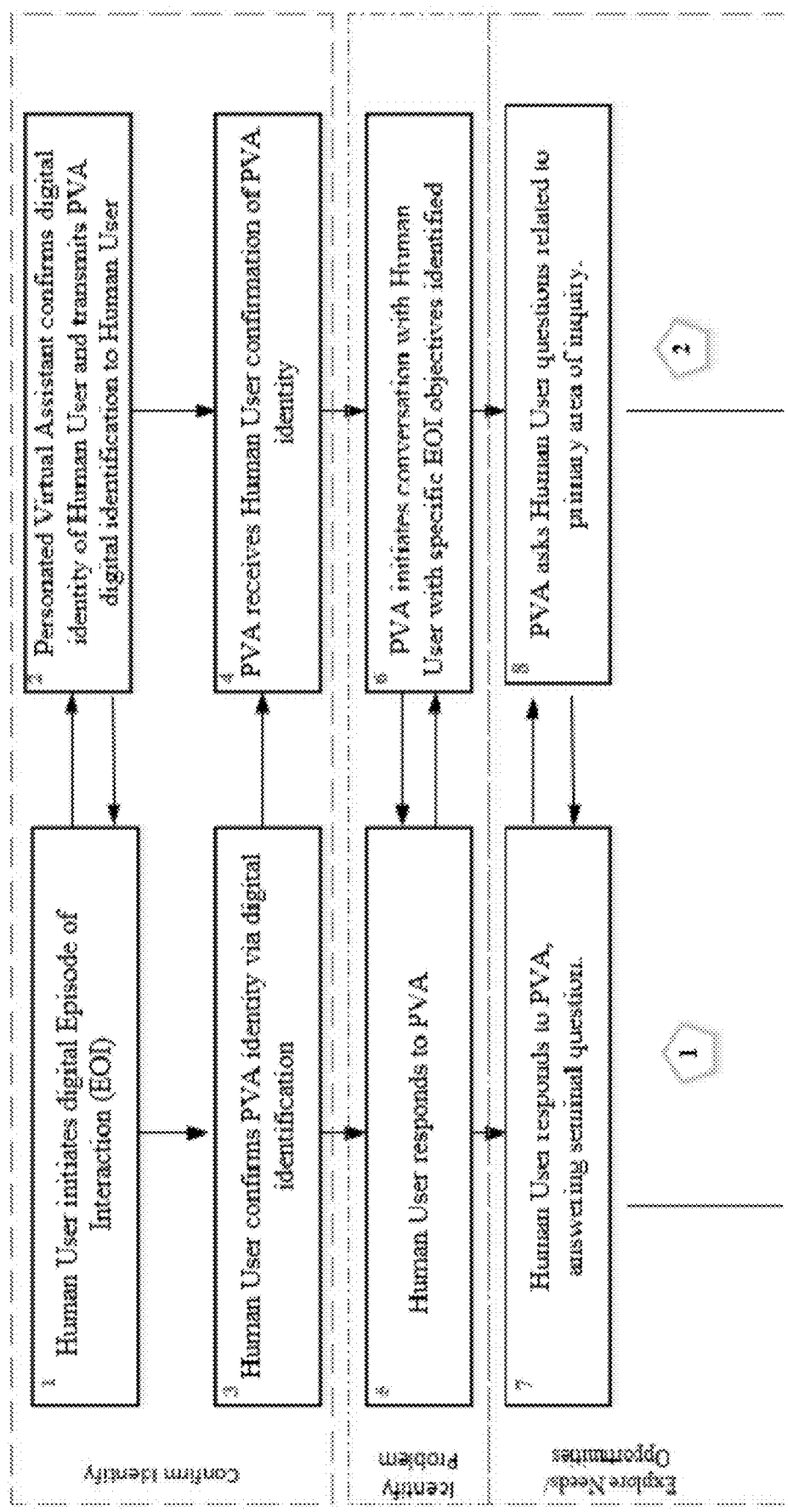
Figure 12B:
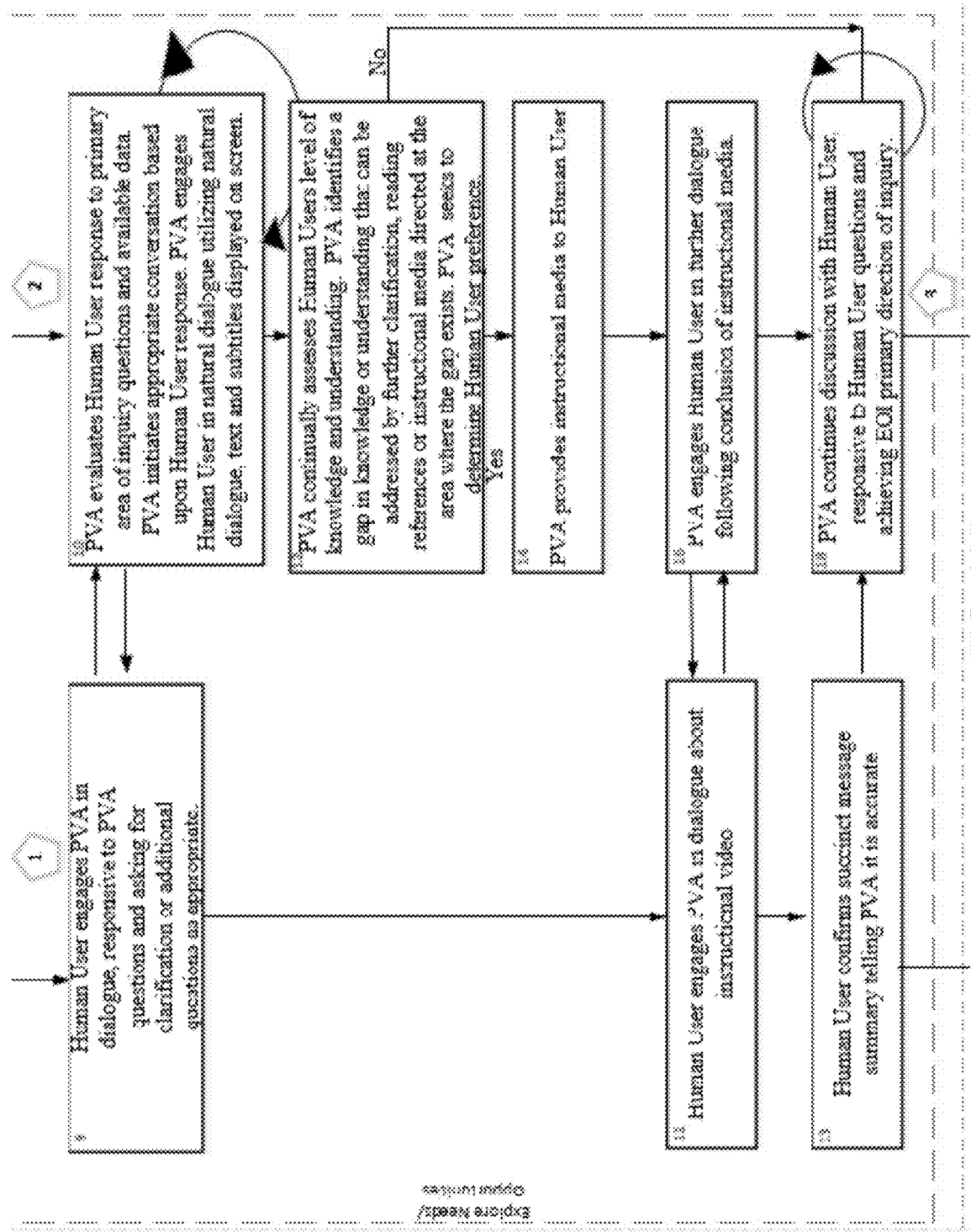
Figure 12C:
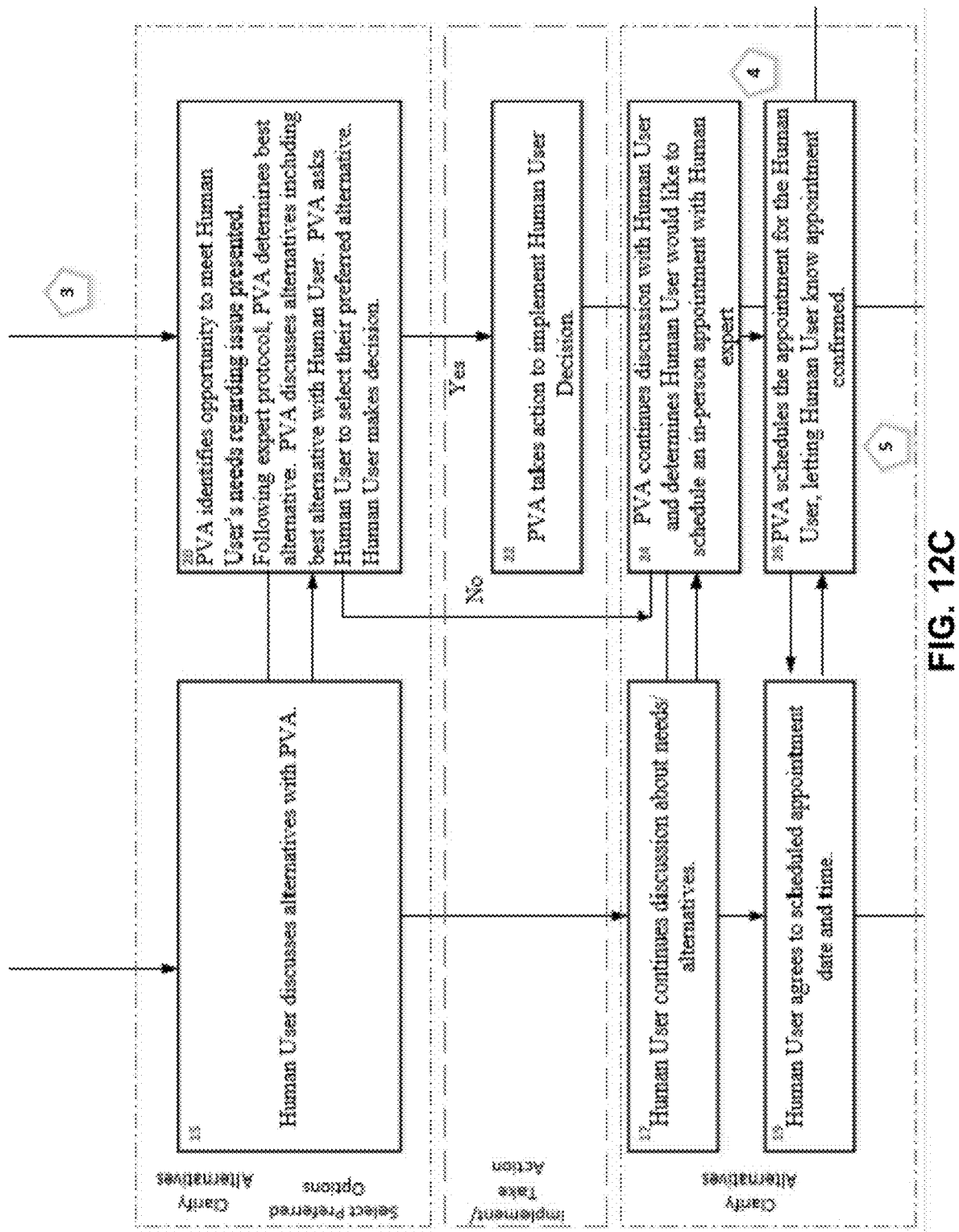
Figure 12E:
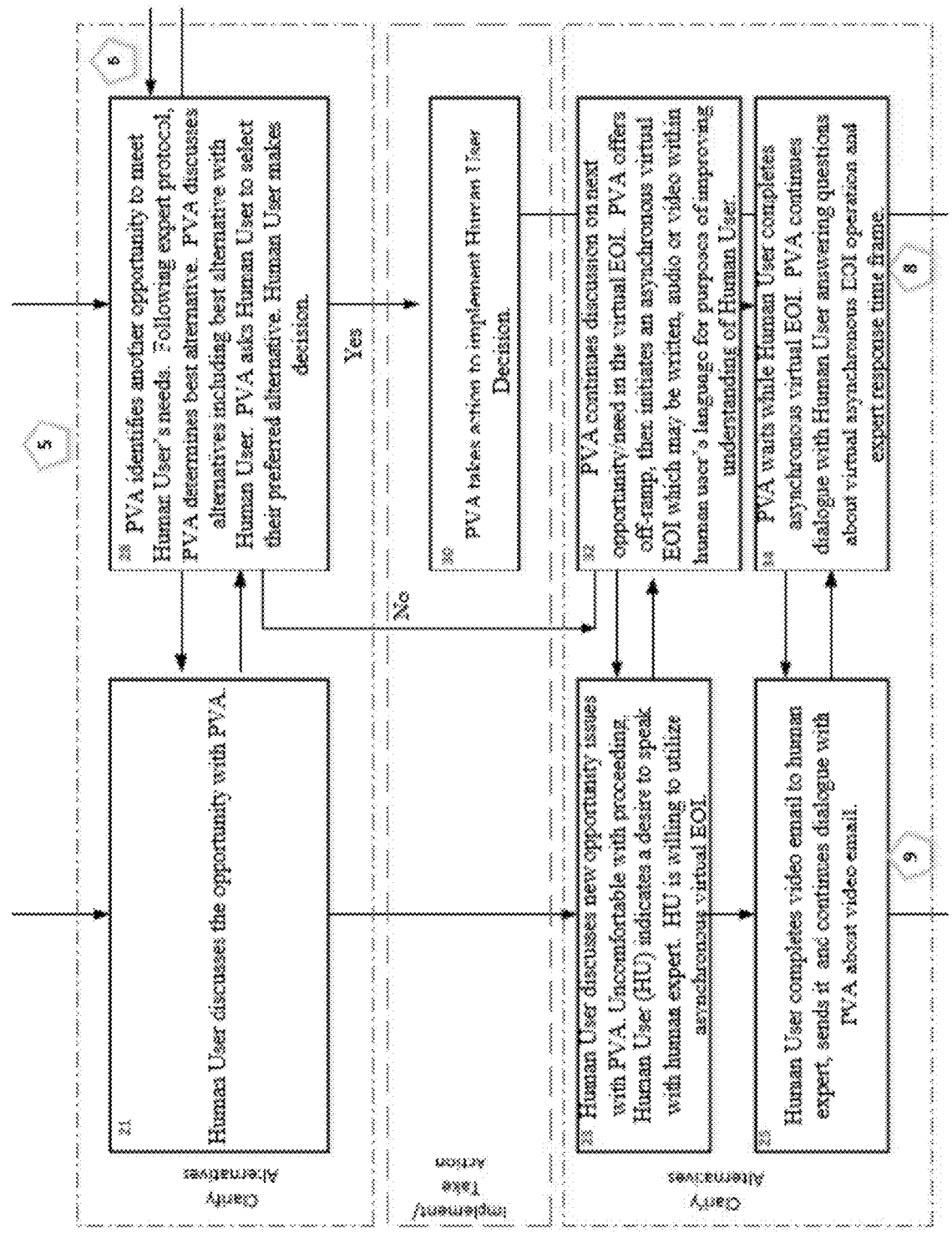
Figure 12F:
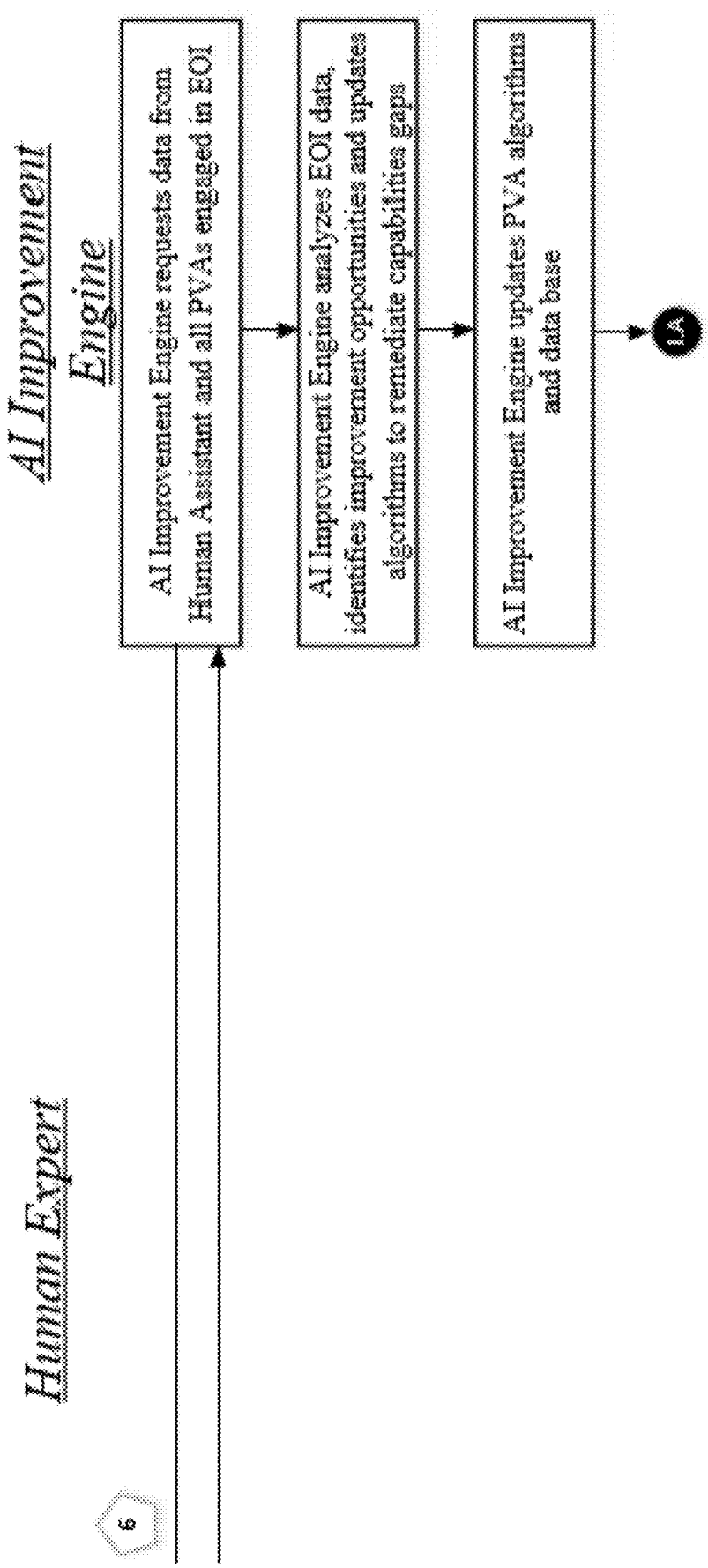
Figure 12G:
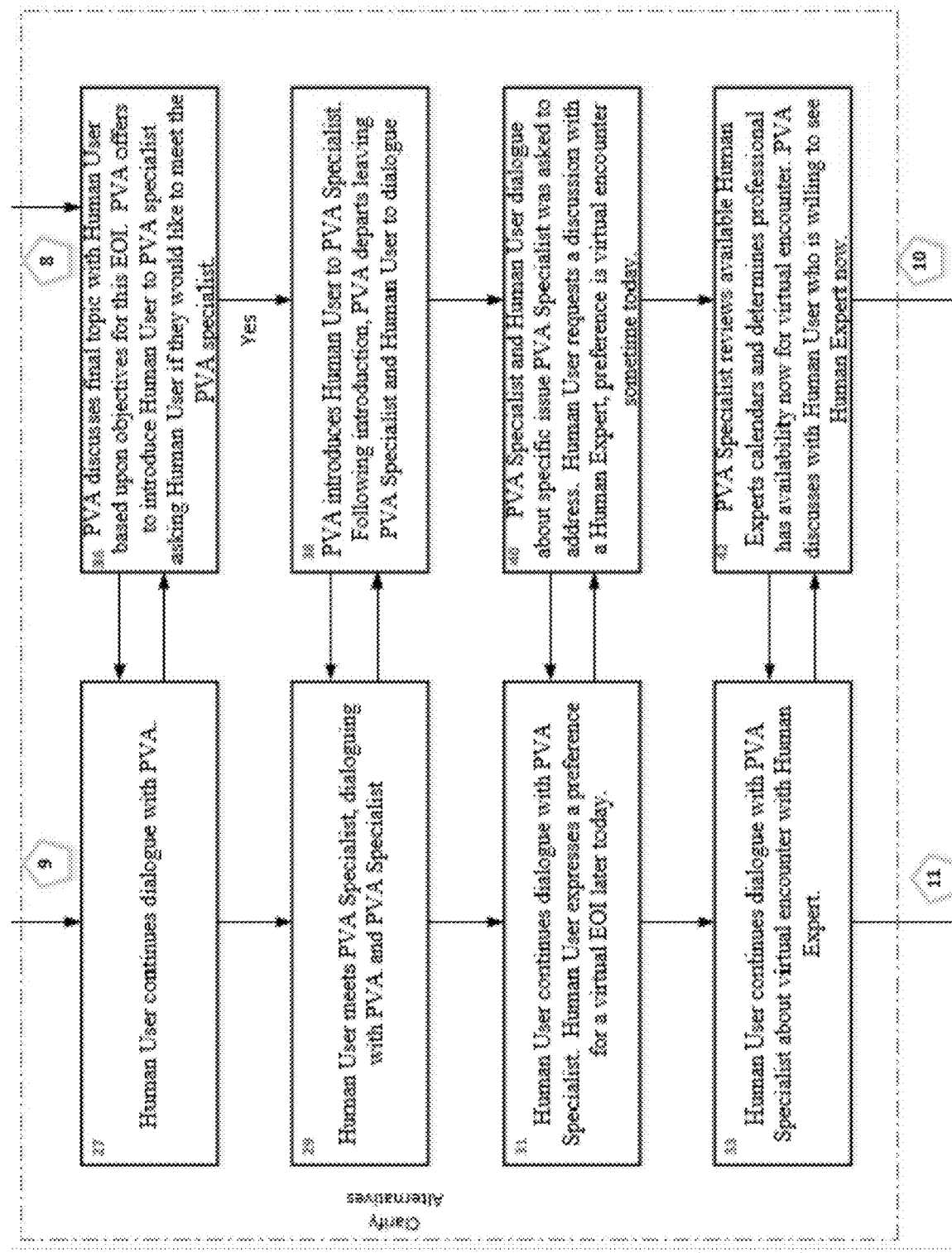
Figure 12H:
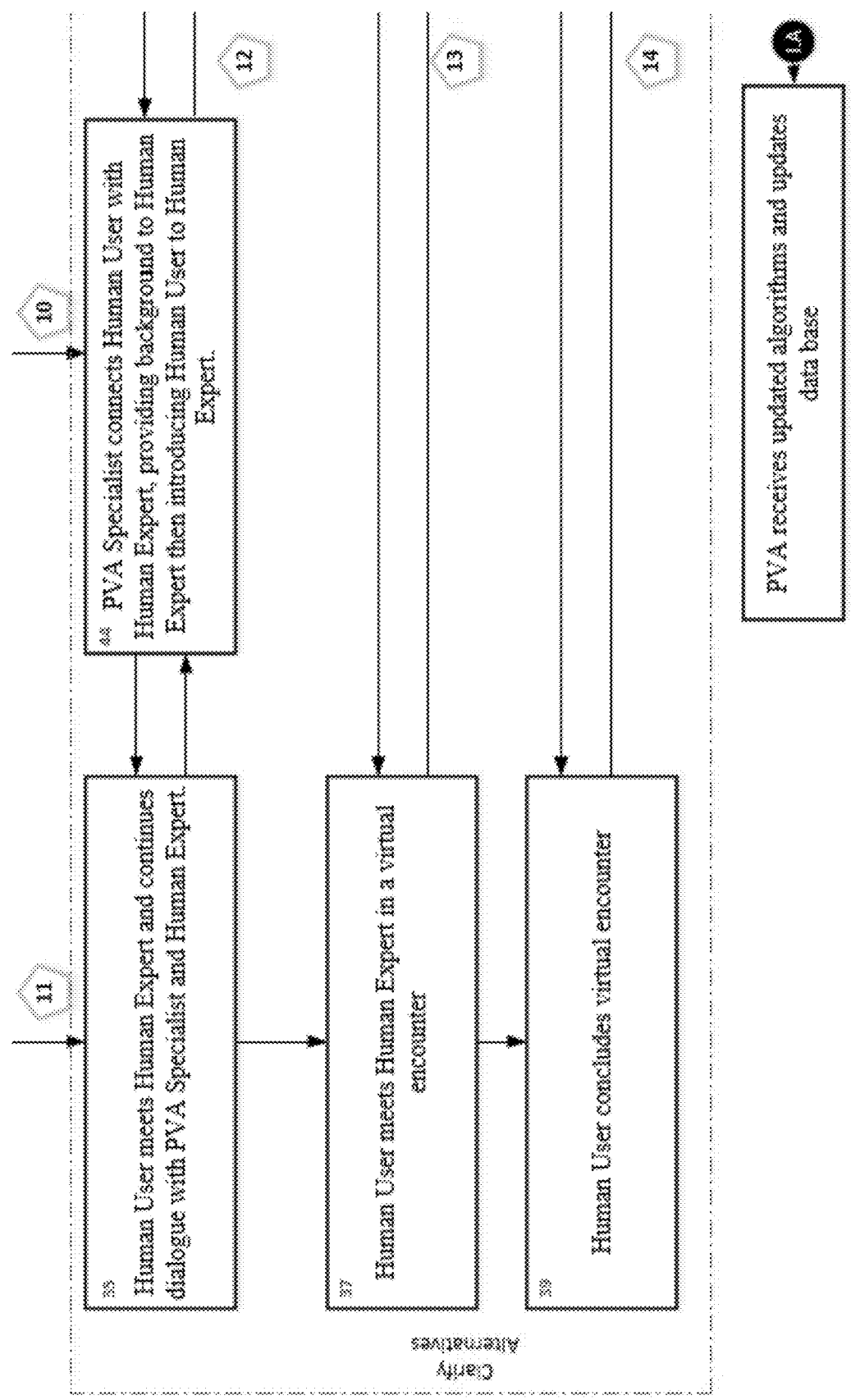
Figure 12I:
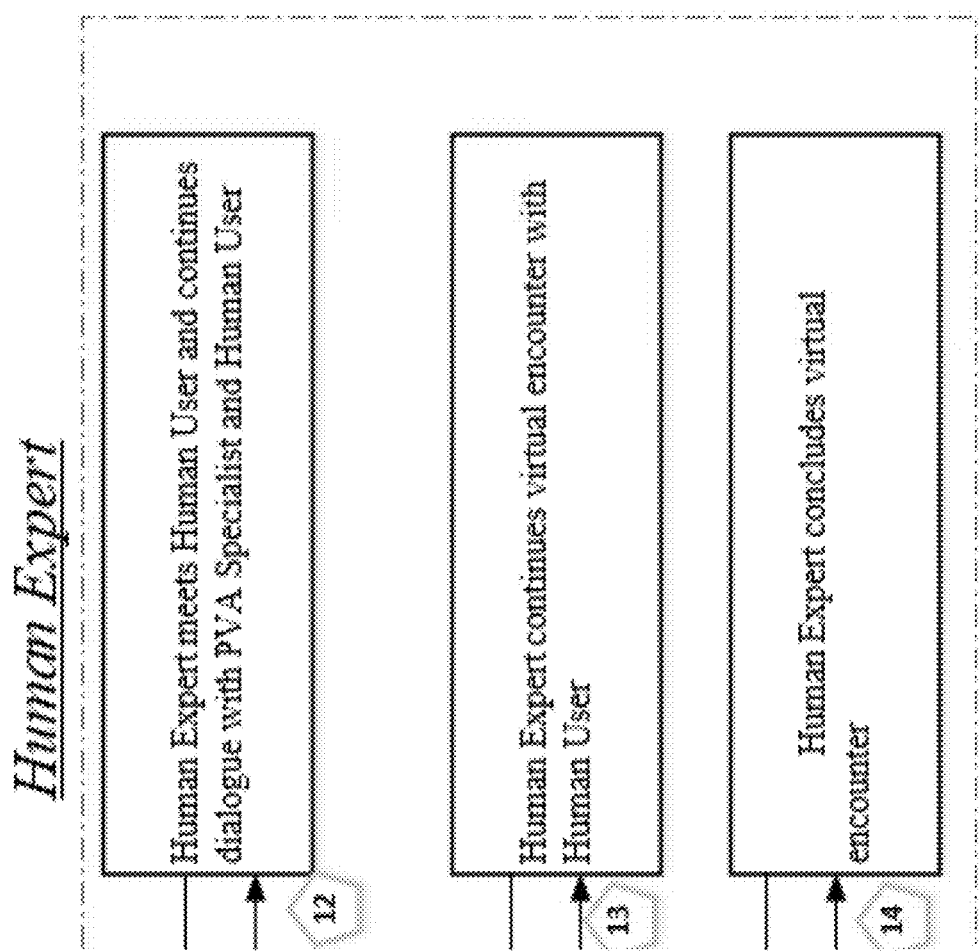
Figure 13:
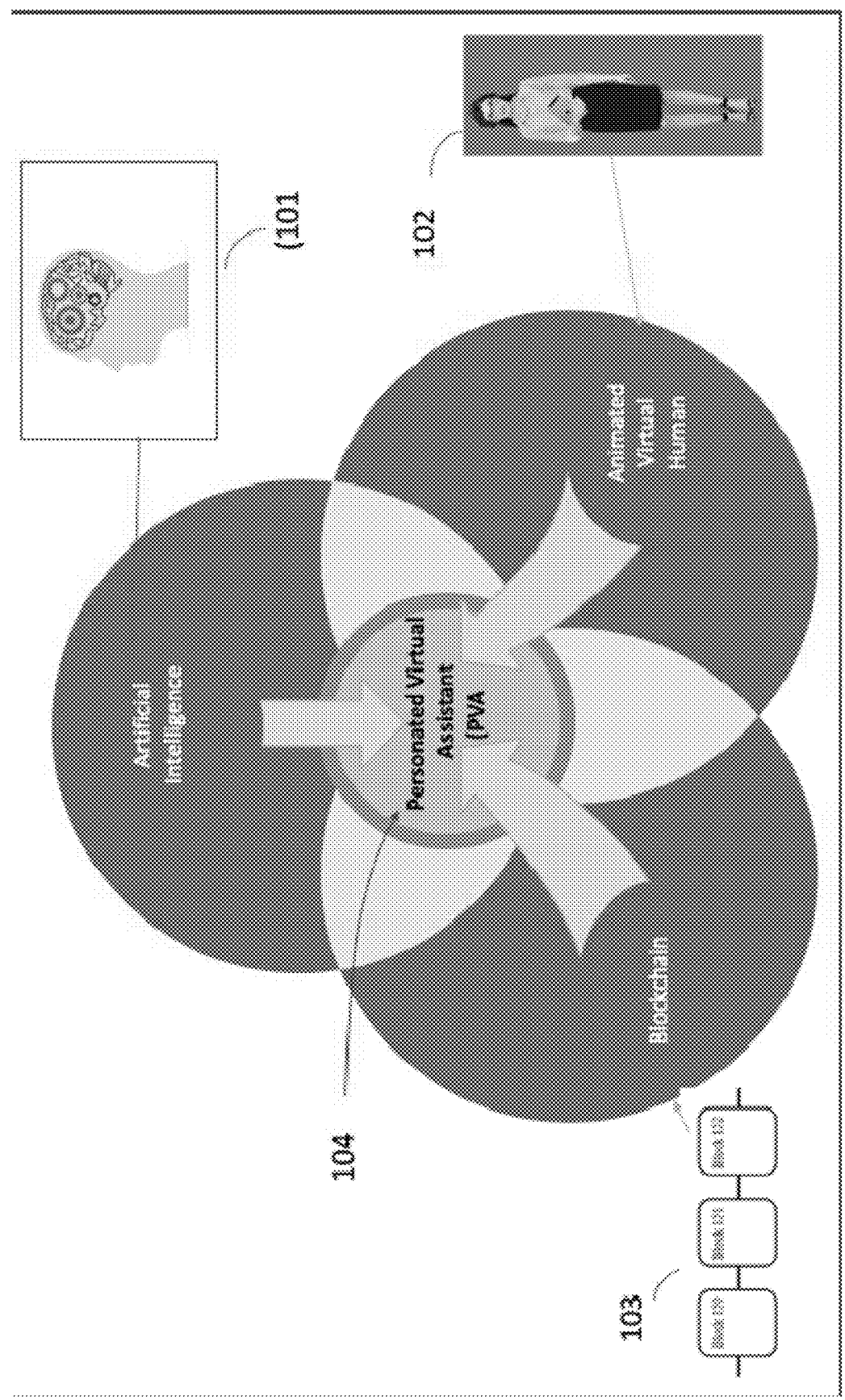

FIG. 11 illustrates the acquisition of data from a User through audio, text and video inputs analysis of this information utilizing artificial intelligence and creation of an appropriate response by a unique Personated Virtual Assistant FIGS. 12A-12I illustrate one Episode of Interaction between a User and a unique Personated Virtual Assistant FIG. 13 illustrates the Personated Reality Ecosystem where the unique Personated Virtual Assistant (UniquePVA) operates and a unique personated virtual assistant (UniquePVA). The Personated Reality Ecosystem is comprised of three components including artificial intelligence, an animated virtual human, and cloud computing and blockchain technologies.

Figure 14:
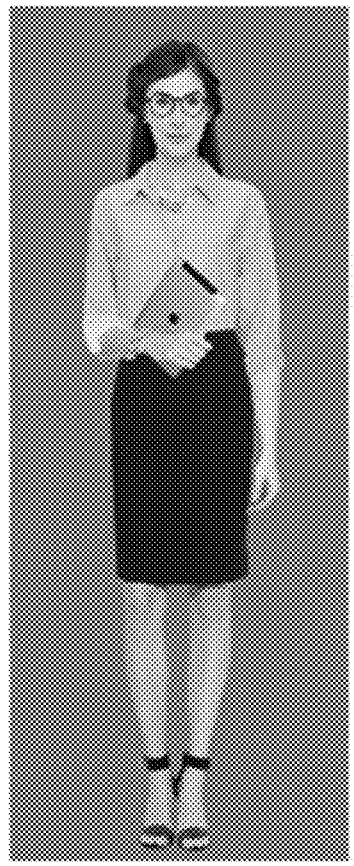
Figure 14:
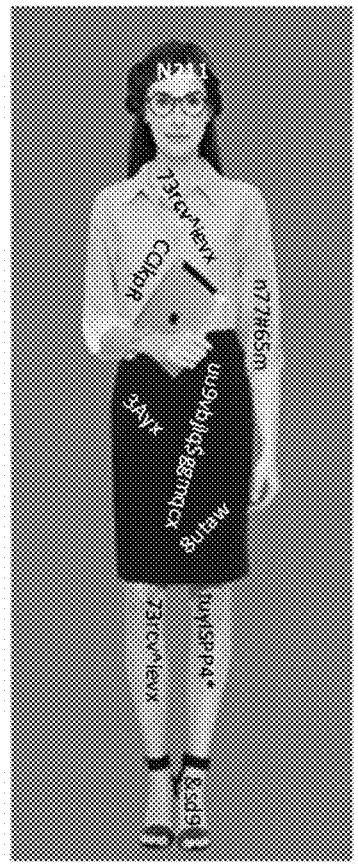
Figure 15A:
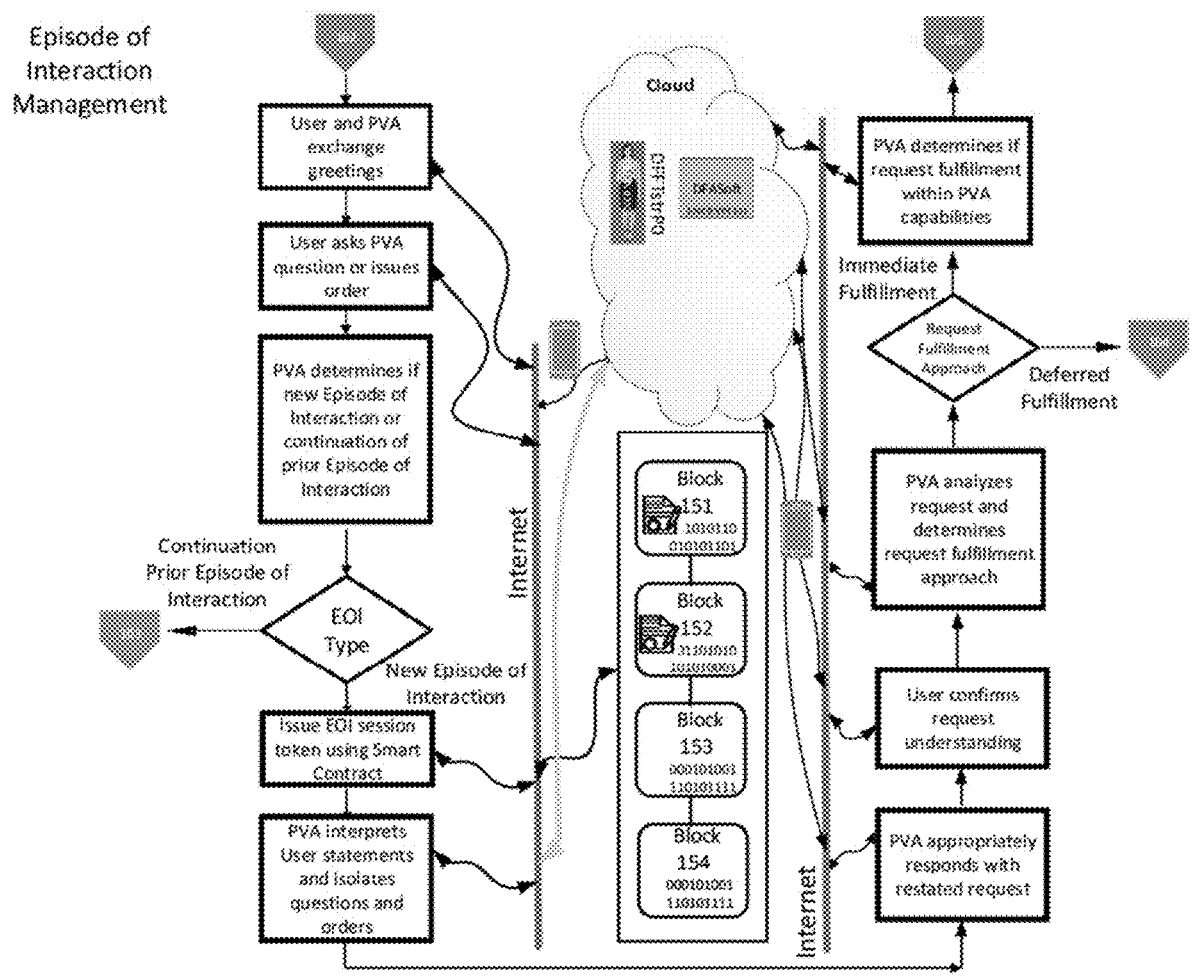
Figure 15B:
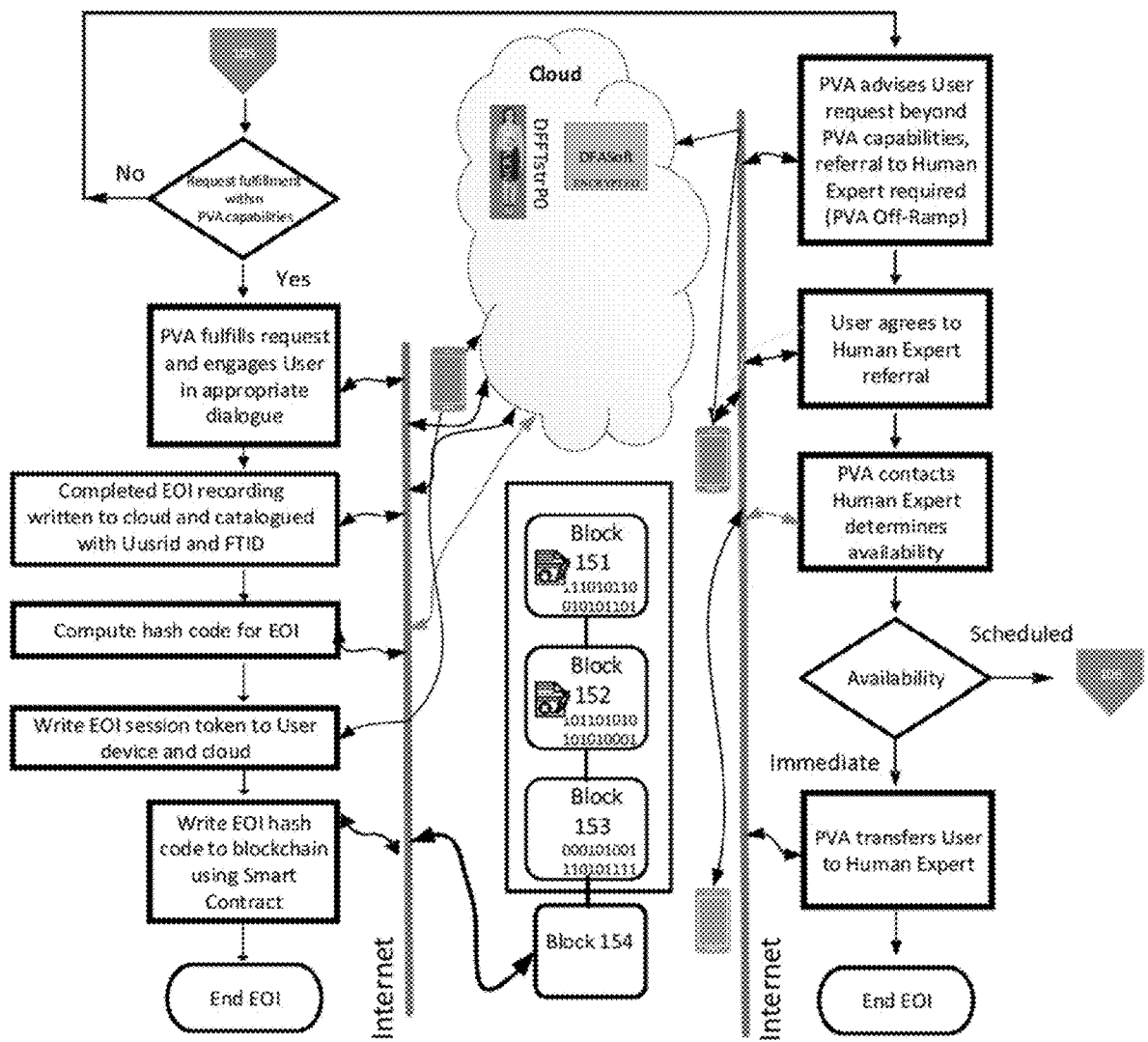
Figure 15C:
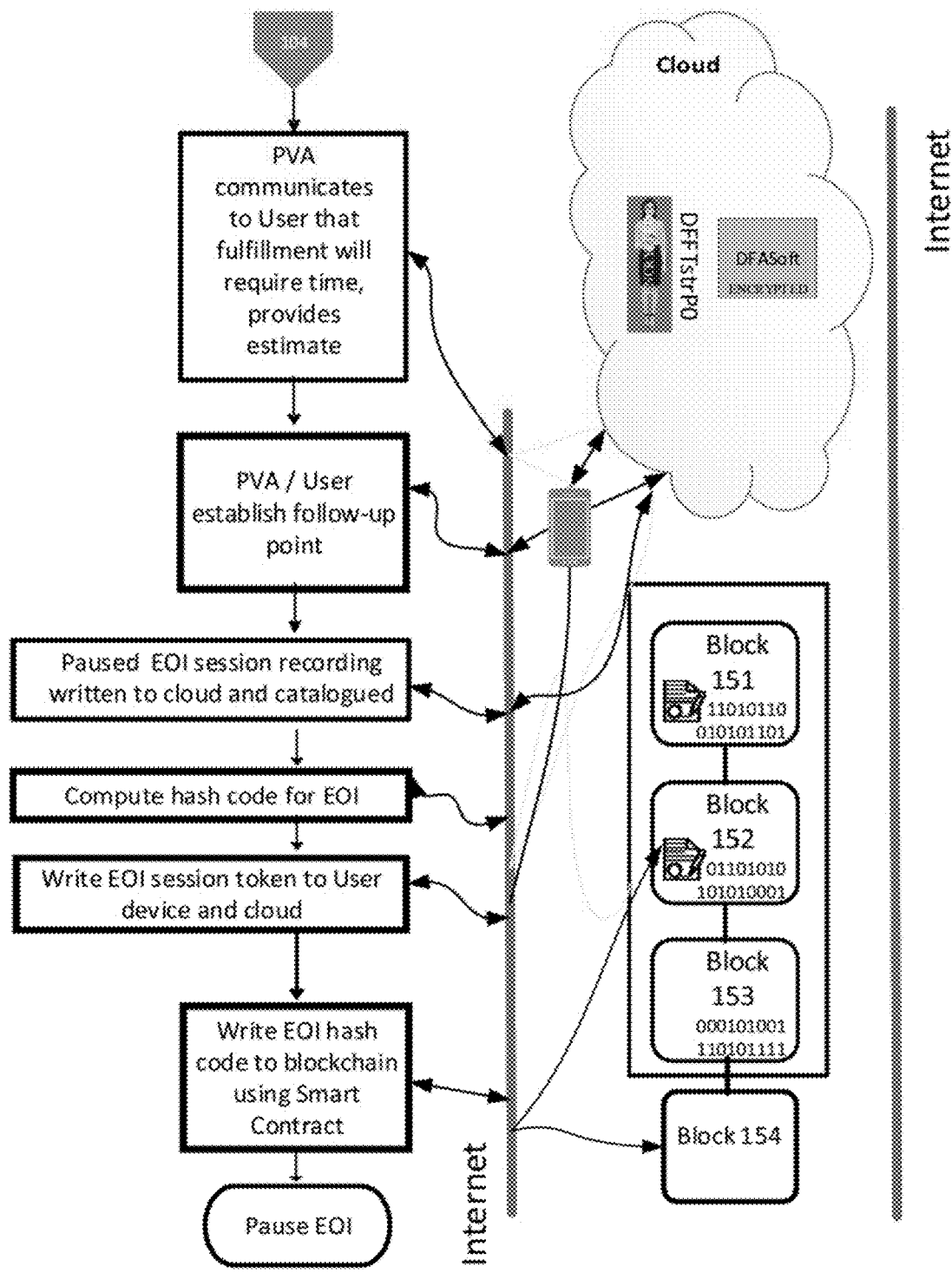
Figure 15D:
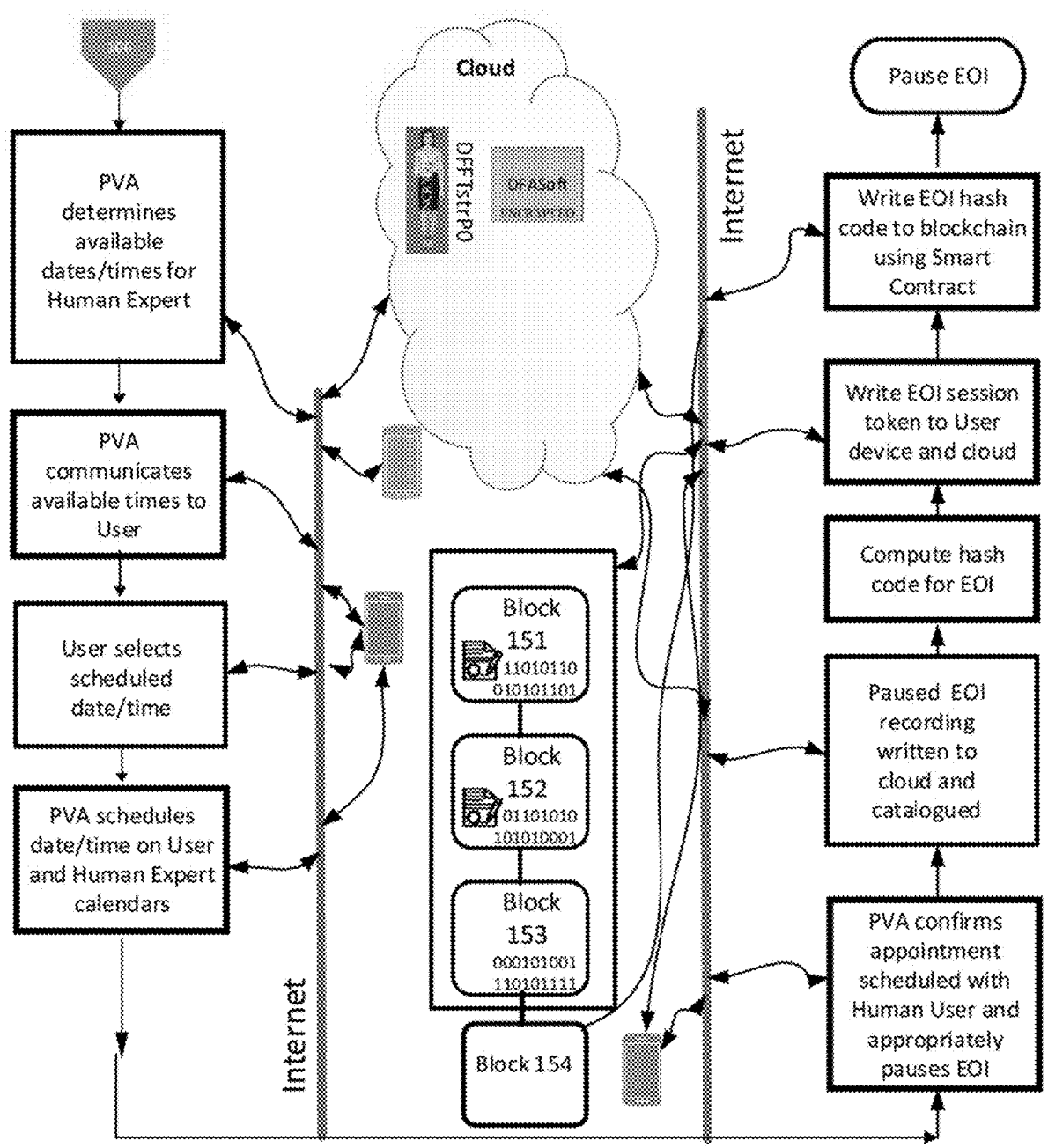
Figure 15E:
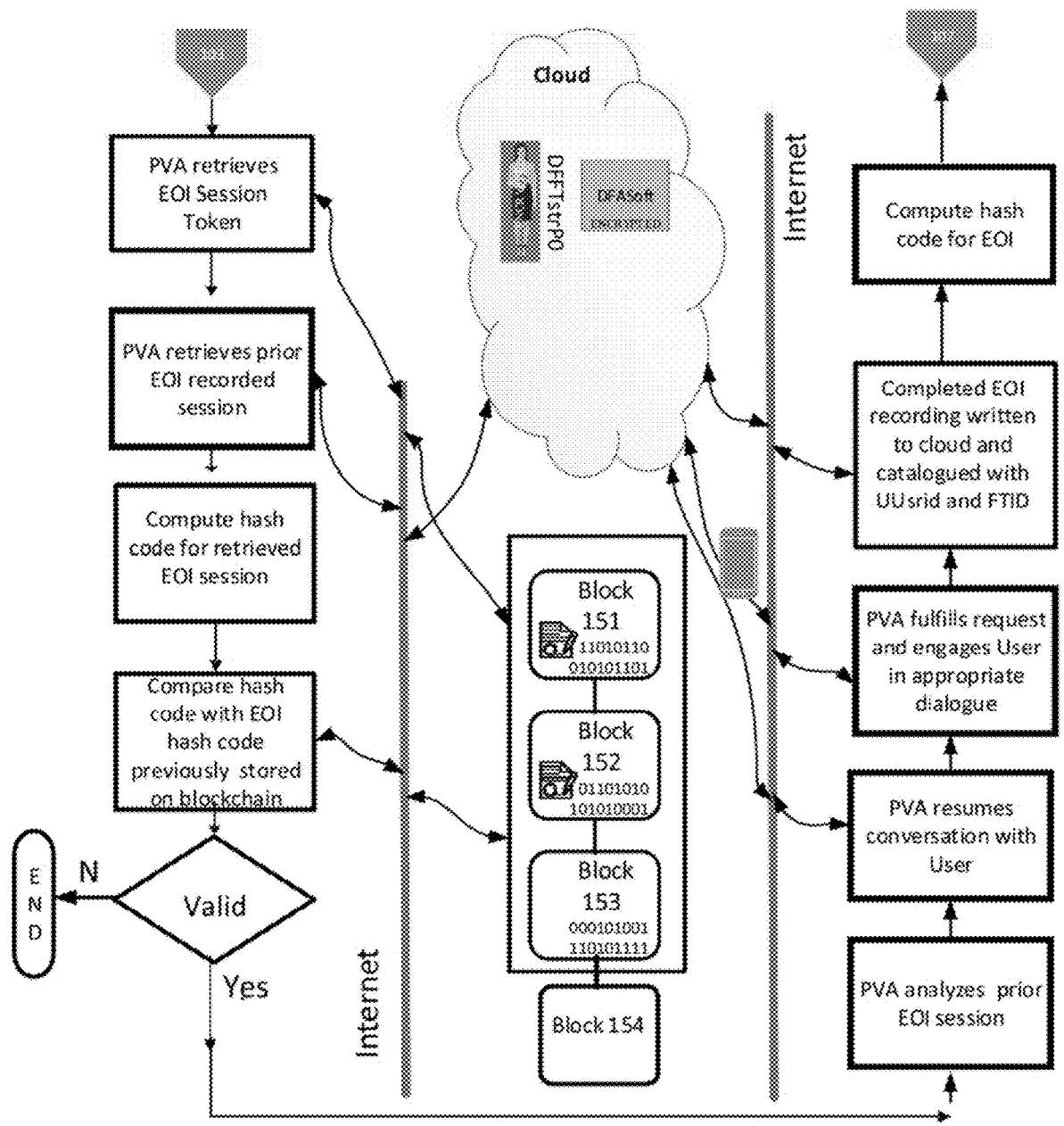
Figure 15F:
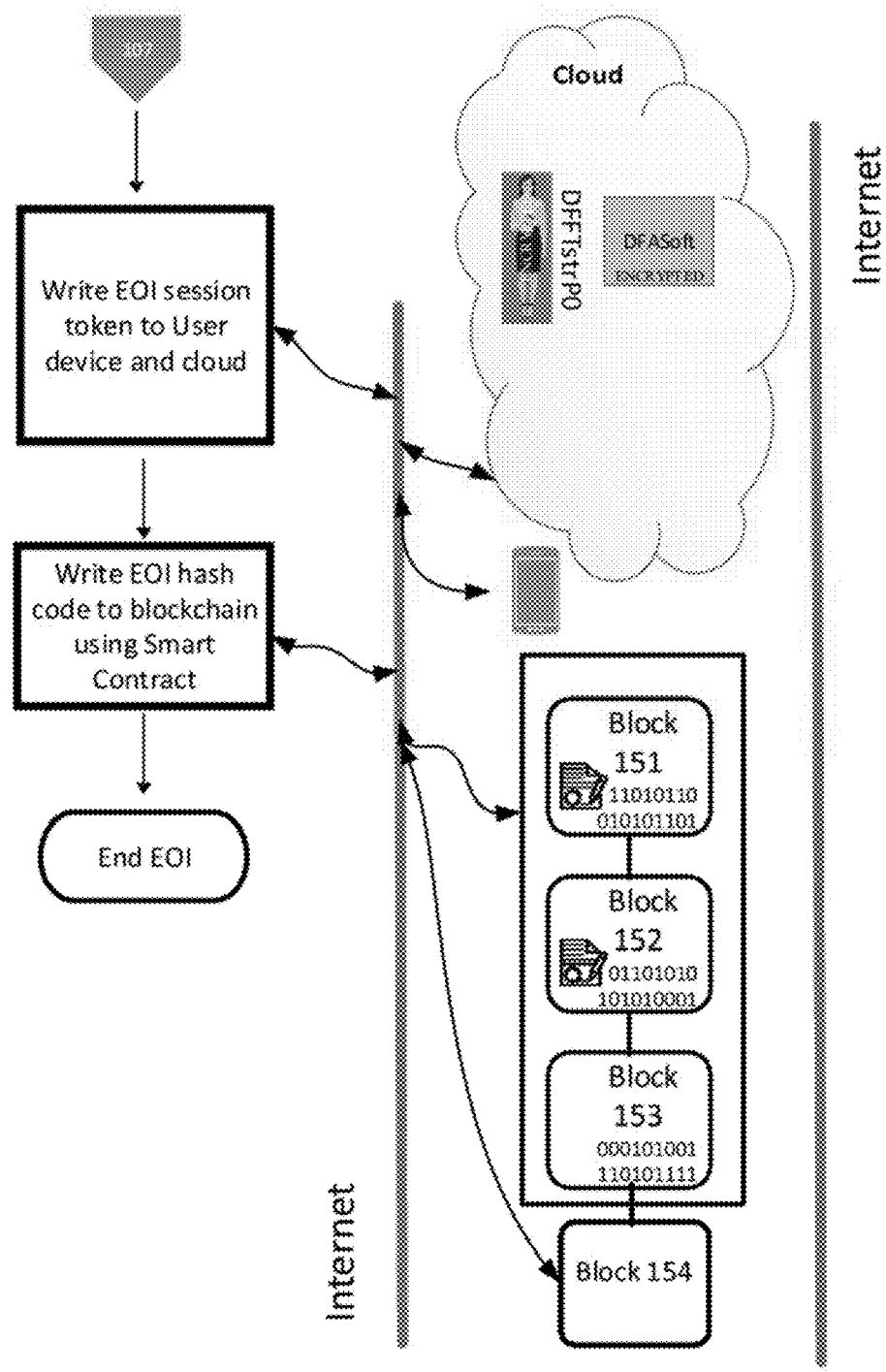

FIG. 14 illustrates the mechanism utilized to integrate unique digital DNA into the GenericPVA.

FIGS. 15A-15F illustrate the management of an interaction between PVAs and Users.

Figure 16A:
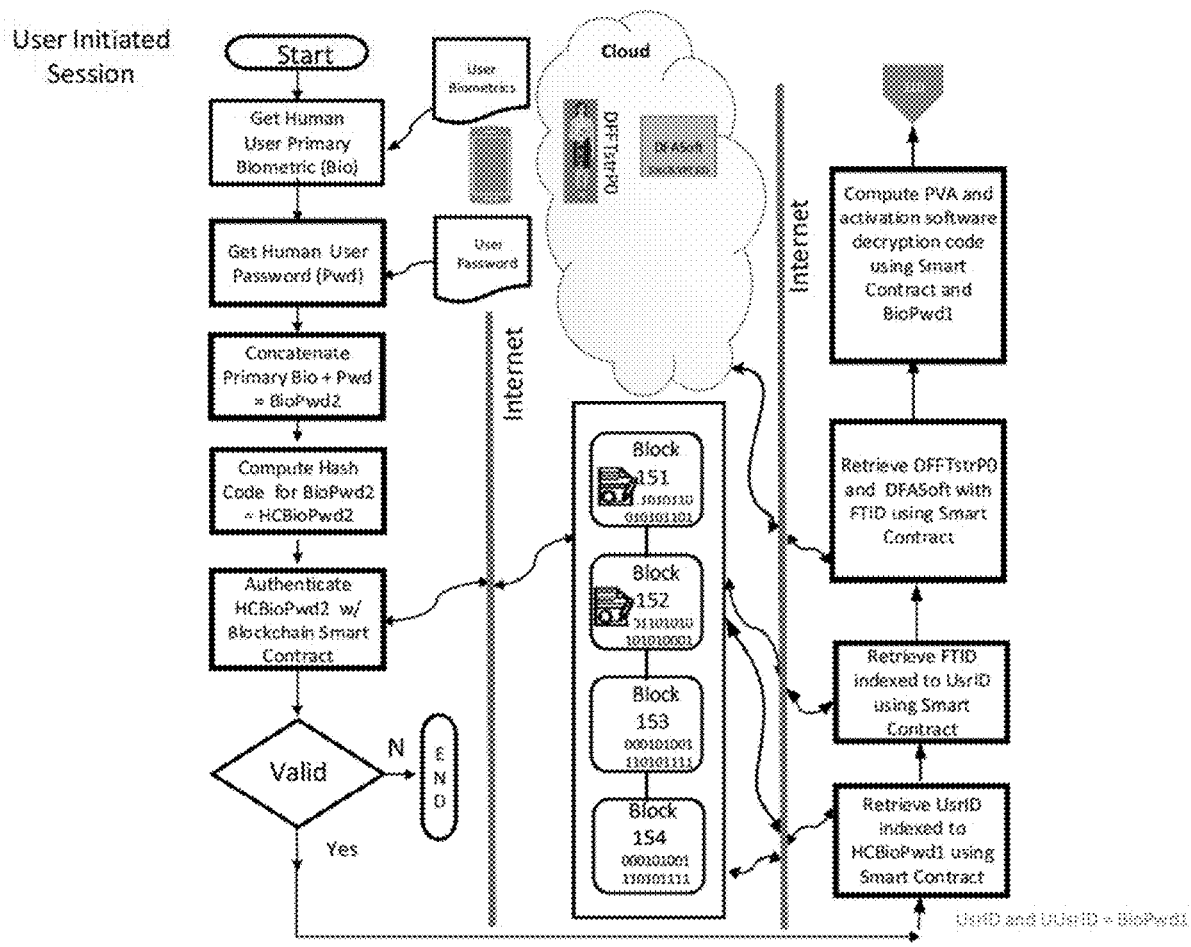
Figure 16B:
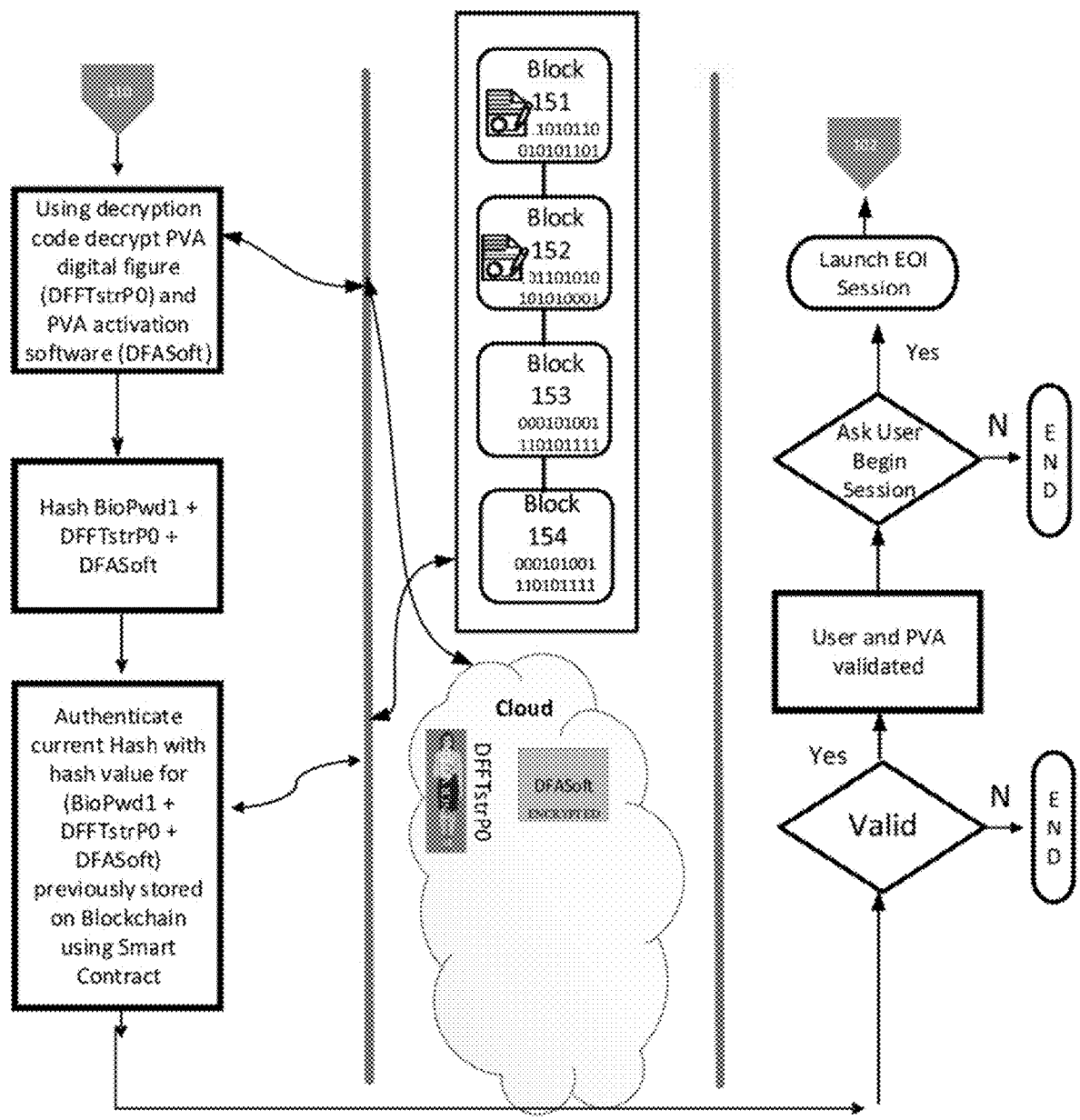

FIGS. 16A and 16B illustrate the mechanisms for a user initiated session.

Figure 17A:
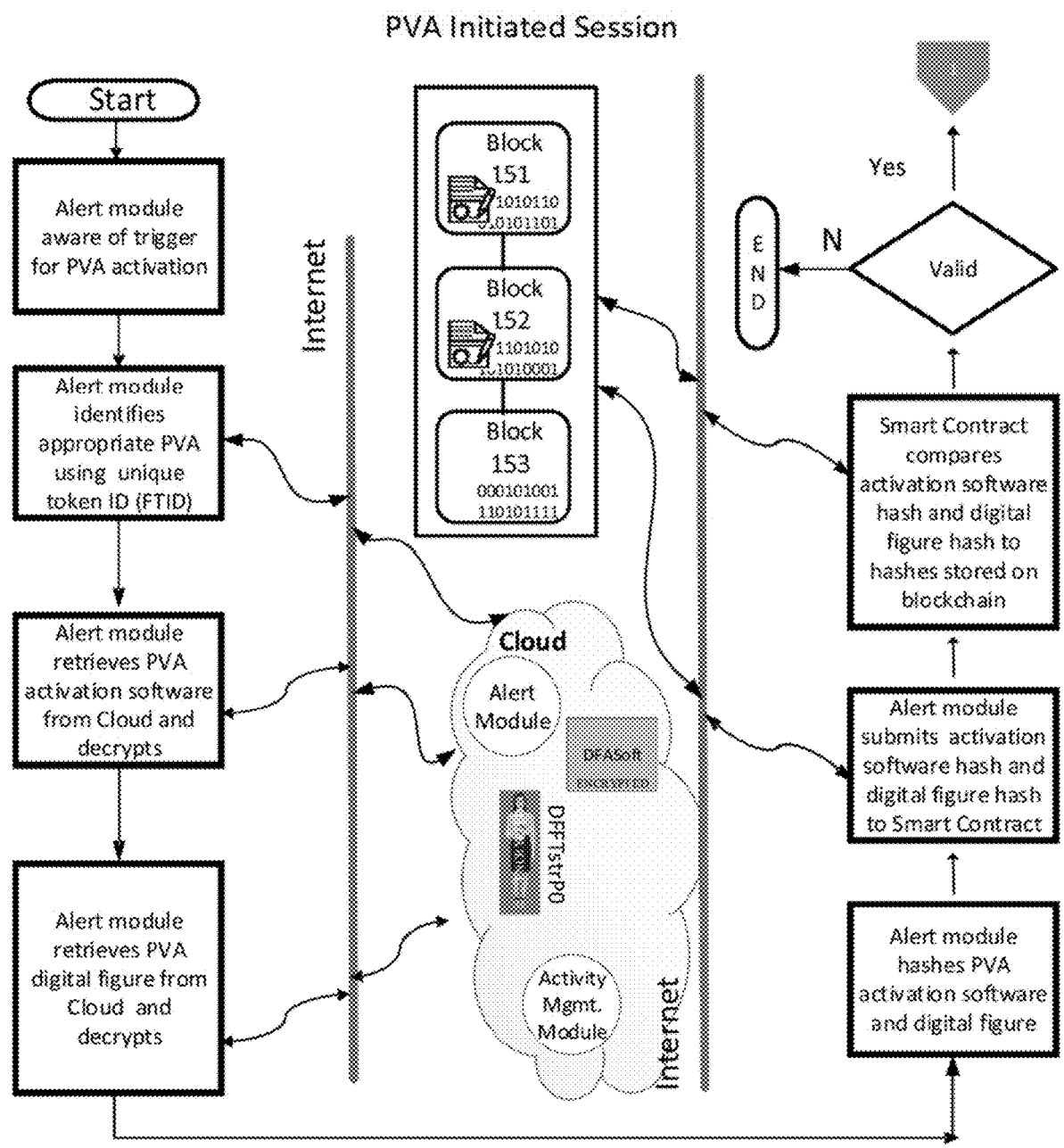
Figure 17B:
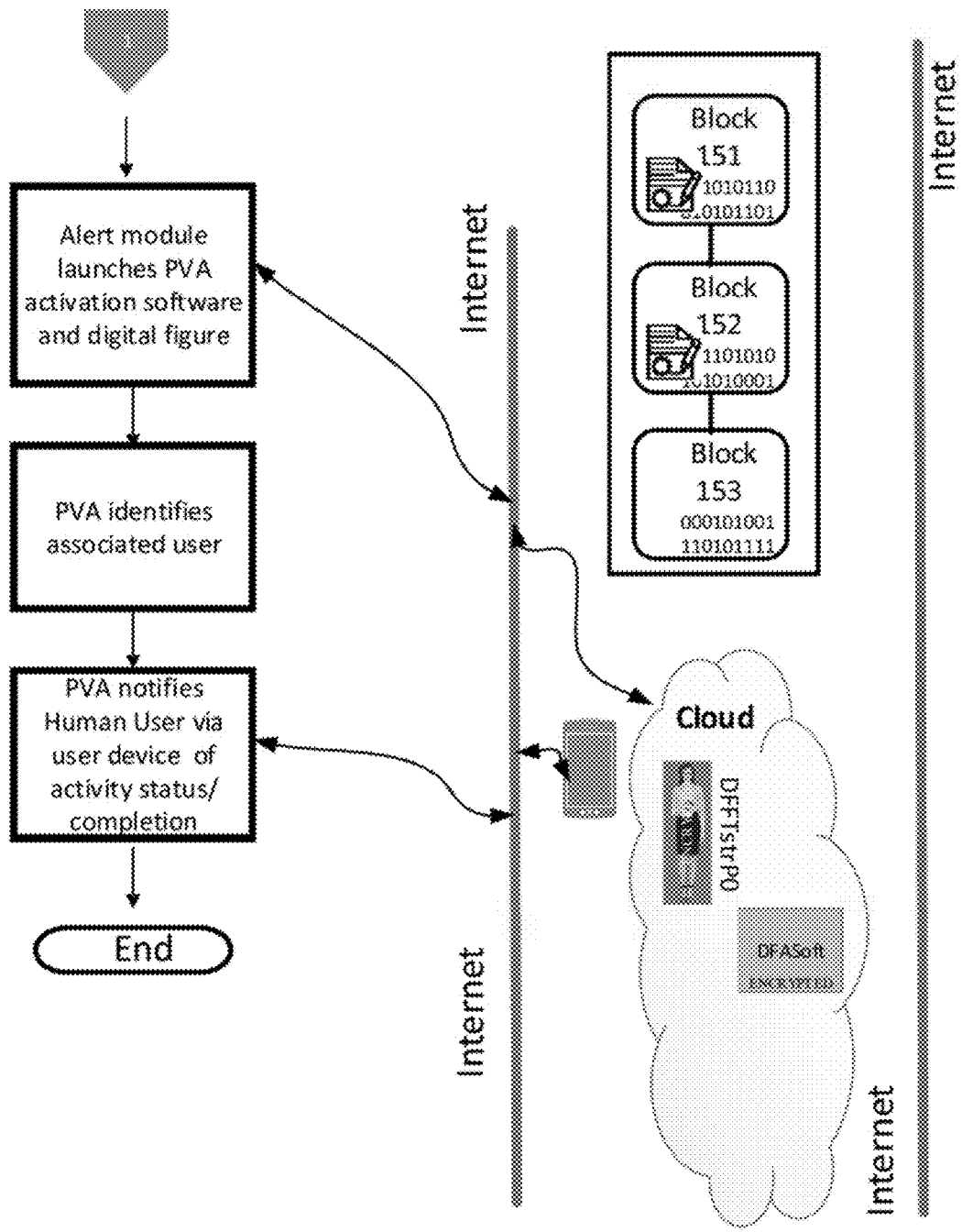

FIGS. 17A and 17B illustrate the mechanism for a UniquePVA initiated session.

Figure 18A:
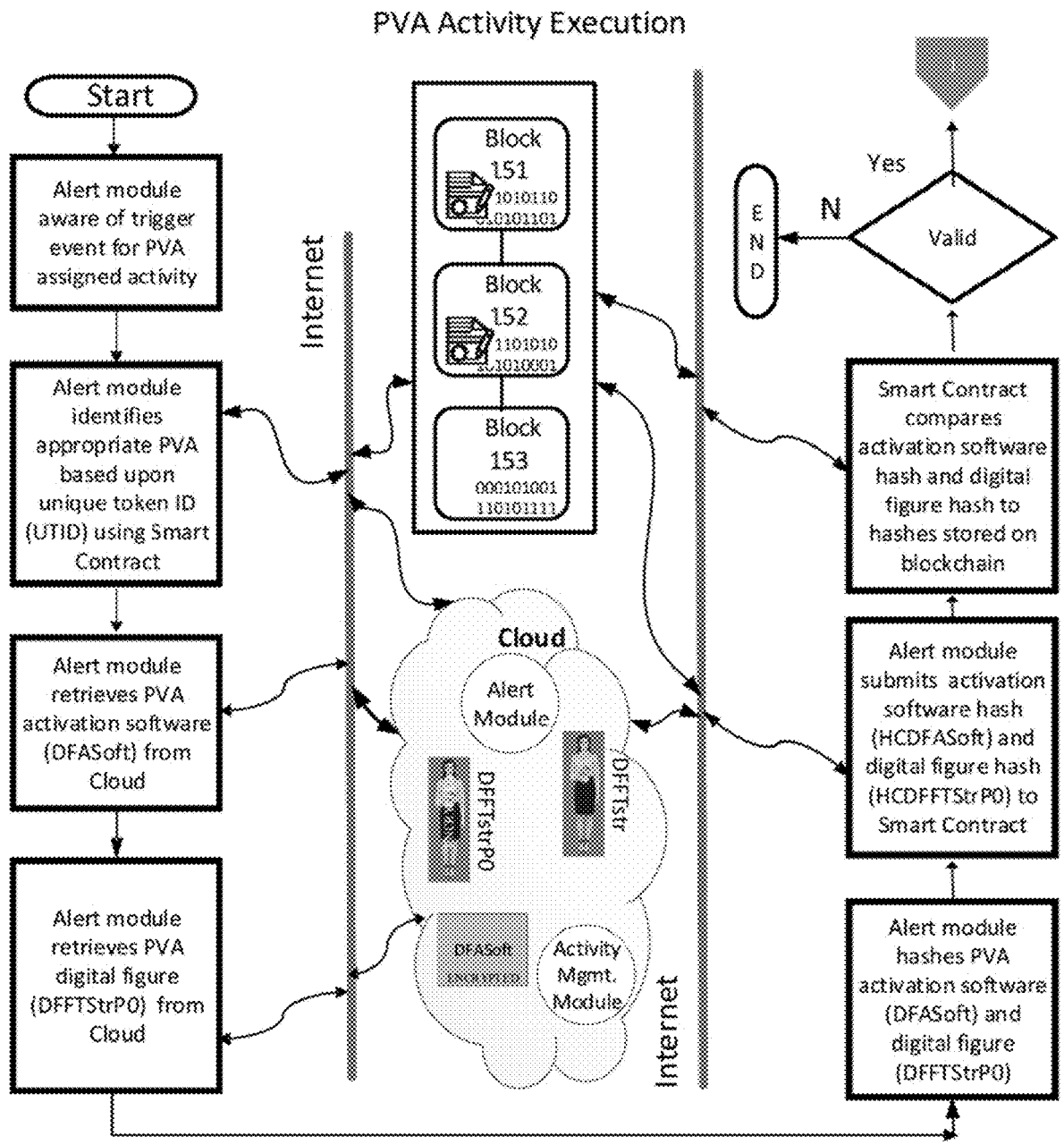
Figure 18B:
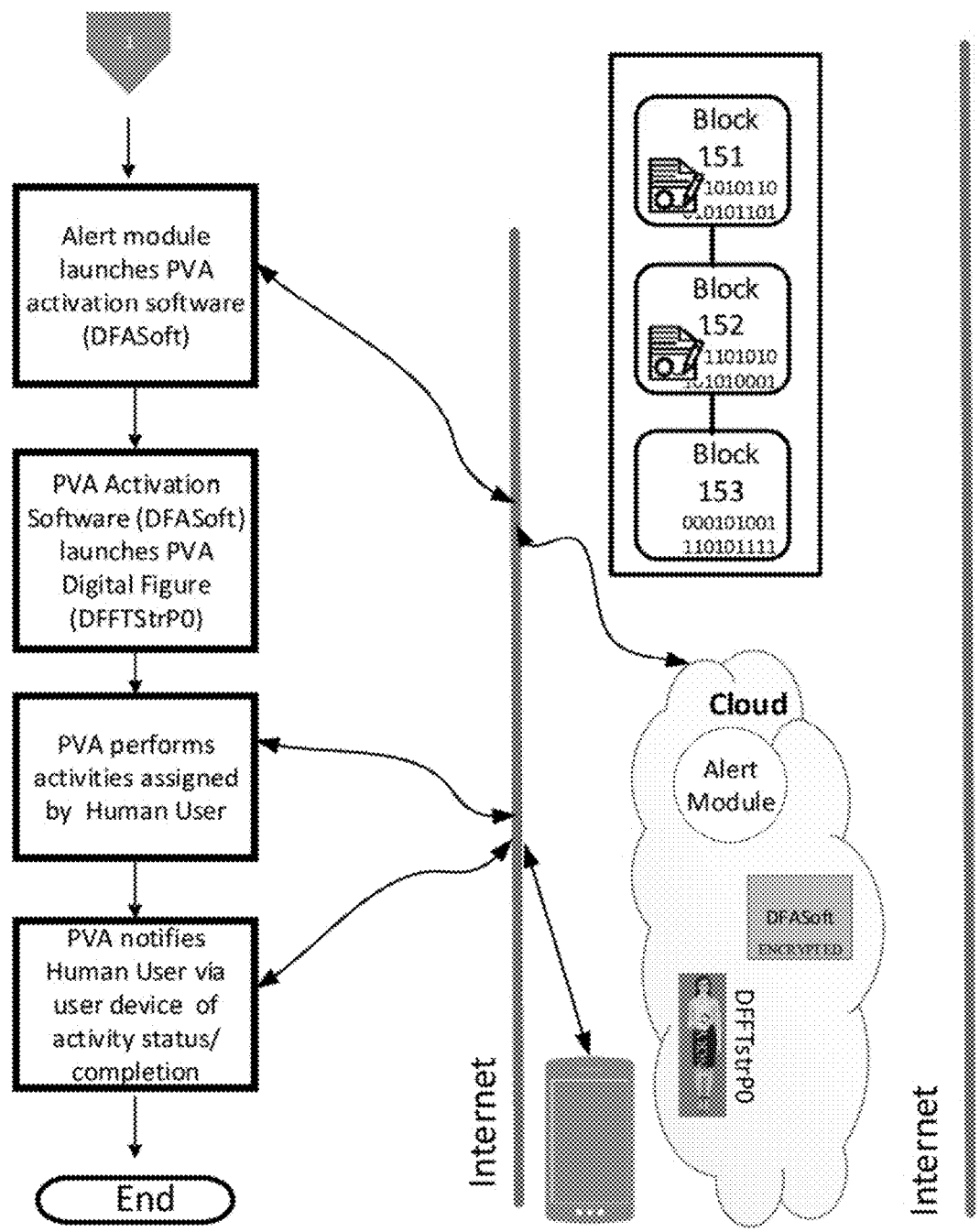

FIGS. 18A and 18B illustrate the mechanism by which a UniquePVA completes tasks, orders and activities required to meet the User articulated needs.

DETAILED DESCRIPTION OF THE INVENTION

The following description sets forth numerous specific details (e.g., specific configurations, parameters, examples, etc.) of the disclosed embodiments, examples of which are illustrated in the accompanying drawings. It should be recognized, however, that such description is not intended as a limitation on the scope of the disclosed embodiments, but is intended to elaborate upon the description of these embodiments. It will be evident to a person of ordinary skill in the art that the present invention can be practiced without every specific detail described infra. Moreover, well-known methods, procedures, components, and circuits have not been described in detail so as not to unnecessarily obscure aspects of the embodiments of the invention.

It is fully contemplated that the features, components, and/or steps described with respect to one embodiment may be combined with the features, components, and/or steps described with respect to other embodiments of the present disclosure. To avoid needless descriptive repetition, one or more components or actions described in accordance with one exemplary embodiment can be used or omitted as applicable from other embodiments. For the sake of brevity, the numerous iterations of these combinations will not be described separately. The same reference numbers may be used to refer to the same or similar elements in different drawings. Alternately, different reference numbers may be used to refer to the same or similar elements in the drawings of different embodiments. Any distinction of an element's reference number in one embodiment from another is not limiting in any way, does not suggest that elements of one embodiment could not be combined with or substituted for elements in another embodiment, and (most importantly) is specifically intended only to facilitate the matching of elements in the disclosure to their corresponding claim recitations.

Embodiments within the scope of the present invention may comprise non-transitory computer-readable media for storing computer-executable instructions. Instructions that cause at least one processing circuit to perform one or more operations are "computer-executable." The term "non-transitory" is used herein to distinguish two distinctly different kinds of computer-readable media: physical storage media that stores computer-executable instructions and transmission media that carries computer-executable instructions. Physical storage media includes RAM and other volatile types of memory; ROM, EEPROM and other non-volatile types of memory; CD-ROM, CD-RW, DVD-ROM, DVD-RW and other optical disk storage; magnetic disk storage or other magnetic storage devices; and any other tangible medium that can store computer-executable instructions that can be accessed and processed by at least one processing circuit.

Transmission media can include signals carrying computer-executable instructions over a network to be received by a general-purpose or special-purpose computer. Embodiments of the present invention expressly (by exemplary recitation such as "non-transitory") exclude signals carrying computer-executable instructions. However, it should be understood that once a signal carrying computer-executable instructions is received by a computer, the type of computer-readable storage media transforms automatically from transmission media to physical storage media. This transformation may even occur early on in intermediate memory such as (by way of example and not limitation) a buffer in the RAM of a network interface card, regardless of whether the buffer's content is later transferred to less volatile RAM in the computer. Thus, devices that merely repeat a signal are contemplated by the embodiments of the present invention, even though the media that carry the signal between such devices and the signal itself are expressly not included within the claim scope. Thus, it should be understood that "non-transitory computer-readable storage media" is used herein instead of simply "physical storage media" or "physical computer-readable storage media" in order to underscore that even transmission media necessarily involves eventual transformation into physical storage media and to therefore capture all embodiments where the computer-readable instructions are stored in physical storage media—even if only temporarily before transforming back into transmission media.

Those skilled in the art will appreciate that the present invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, and the like. The present invention may also be practiced in distributed system environments where operations are delegated to and/or shared between local and remote computer systems across a network. In a distributed system environment, program modules may be located in both local and remote memory storage devices. "Multi-touch input surface" includes capacitive and resistive surfaces.

Where two or more elements are said to be "coupled," the meaning shall include (in addition to configurations where the elements directly operate with each other because they are joined) configurations where the elements indirectly operate with each other (e.g., through one or more intermediate elements) so long as there is a link.

It should be understood that disclosures of all embodiments (and all combinations thereof) directed to methods of DNA-implantation of a UniquePVA also fully enable the practice of DNA-implantation in video, since all related methods (e.g., of generating a non-fungible token, of partitioning such a token into segments, of implantation of such segments into a 2-dimensional animated figure, etc.) can logically be practiced using any 2-dimensional animation—including video. Moreover, the same methods involving a 3-dimensional animated fully enable the practice of the present invention using virtual reality and augmented reality.

Also, while disclosure and recitation of the present invention is directed to a human user, it should be understood that the disclosed and recited methods of all embodiments and all combinations of embodiments may also be practiced with respect to a user of another animal species (i.e., an animal user), such that the UniquePVA is a virtual assistant of a veterinarian. Thus, it should be fully appreciated that the scope of the disclosure encompasses other embodiments not recited in the claims.

FIGS. 19A and 19B depict a schematic of an exemplary system (Personated Reality Ecosystem (PRE)) for communicating with a human user and performing tasks under the human user's direction, consistent with disclosed embodiments. In some embodiments, the PRE may comprise a personal computing device (comprising a processor, RAM, a disk, and one or more of a microphone, a keyboard, and a graphical user interface implemented on a multi-touch input surface), a blockchain distributed ledger 600 (comprising a distributed database operating on a network of independent computers that each include a processor capable of executing computer-executable instructions, RAM and a disk), and a cloud computing system 900 (comprising computing services that each include a processor capable of executing computer-executable instructions, RAM and a disk).

In some embodiments, the hard disk of the personal computing device stores an interface Module 303, a human user key generator (305, a Registration Module 306, a Digital DNA Generation Module 307, a Vault 315, a Key Generation Module 308, a Vault Mgmt. Module 309, an ID Generation Module 310, a UPVAIDHash Module 311, and a Launch Initial interaction Module 330, wherein each comprises computer-executable instructions.

In some embodiments, when executed by the processor of the personal computing device, the instructions constituting the Interface Module 303 may cause the processor to perform operations. The operations may comprise receiving human user data via the microphone, the video camera, and/or the keyboard; receiving a registration request from a human user via the microphone, graphical user interface implemented on the multi-touch input surface, and/or the keyboard; receiving a Unique User ID (UUID) 204 and human user data, wherein the human user data comprises any combination of two of a biometric and a password from the human user; transmitting the human user biometric 203 to a Vault Management (Mgmt.) Module 309; concatenating the human user biometric 203 and the password; securely transmitting the concatenation to the human user key generator 305; receiving a human user key 210 from the human user key generator 305; securely transmitting the human user key 210 to the Registration Module 306, receiving (via the microphone, graphical user interface implemented on the multi-touch input surface, and/or the keyboard) a request to initiate an Episode of Interaction (EOI); and securely transmitting the EOI request to a Launch Initial Interaction Module 330.

In some embodiments, when executed by the processor of the personal computing device, the instructions constituting the human user key generator 305 may cause the processor to perform operations. The operations may comprise receiving the concatenation of the human user biometric 203 and the password from the Interface Module 303; hashing that concatenation to generate the human user key 210; and securely transmitting the human user key 210 to the Interface Module 303.

In some embodiments, when executed by the processor of the personal computing device, the instructions constituting the Registration Module 306 may cause the processor to perform operations. The operations may comprise receiving the UUID 204 and the human user key 210 from the Interface Module 303; securely transmitting the UUID 204 and the human user key 210 to a smart contract UserReg 601 of the blockchain distributed ledger 600; receiving confirmation from the smart contract UserReg 601 when registration has been completed; receiving confirmation from a smart contract TokenGen 602 when a non-fungible token has been generated; authorizing the Digital DNA Generation Module 307 to proceed, upon receiving confirmation that the registration is complete and confirmation that the non-fungible token has been generated; and authorizing the Key Generation Module 308 to proceed, upon receiving confirmation that the registration is complete and confirmation that the non-fungible token has been generated.

In some embodiments, when executed by the processor of the personal computing device, the instructions constituting the Digital DNA Generation Module 307 may cause the processor to perform operations. The operations may comprise receiving the non-fungible token data string 615 from the smart contract TokenGen 602; dividing the non-fungible token data string 615 into a plurality of Digital DNA 1400 segments; and securely transmitting the Digital DNA 1400 segments to a Digital DNA Implant Module 922 in the Cloud Computing System 900. In some embodiments, the operations may comprise dividing the non-fungible token data string 815 into a plurality of individual characters and writing the individual characters to points within the PVA instead of along vectors.

In some embodiments, the Vault 315 comprises instructions for a storage function and instructions for an access function, in some embodiments, when executed by the processor of the personal computing device, the instructions for the storage function may cause the processor to perform operations. The operations may comprise receiving a key, encrypting the key, and storing the encrypted key. In some embodiments, when executed by the processor of the personal computing device, the instructions for the access function may cause the processor to perform operations. The operations may comprise receiving a request for a key from a module, retrieving the requested key, decrypting the retrieved key, and securely transmitting the decrypted key in response to the request from the module.

In some embodiments, when executed by the processor of the personal computing device, the instructions constituting the Key Generation Module 308 may cause the processor to perform operations. The operations may comprise receiving authorization from the Registration Module 306 to proceed, generating a Unique PVA ID Key 1204 upon receiving the authorization to proceed, and transmitting the Unique PVA ID Key 1204 to the Vault 315 for storage; generating a Binding Key 1212 upon receiving authorization from the Registration Module 306 to proceed, and transmitting the Binding Key 1212 to the Vault 315 for storage; generating a PVA public encryption key 1251 and PVA private decryption key 1252 upon receiving authorization from the Registration Module 306 to proceed, and transmitting the PVA public encryption key 1251 and the PVA private decryption key 1252 to the Vault 315 for storage; generating an EOI public encryption key 1821 and an EOI private decryption key 1822, and transmitting the EOI public encryption key 1821 and the EOI private decryption key 1852 to the Vault 315 for storage; and generating an EOI Digital Seal Key 1801 upon receiving authorization from the Registration Module 306 to proceed, and transmitting the EOI Digital Seal Key 1801 to the Vault 315 for storage.

In some embodiments, when executed by the processor of the personal computing device, the instructions constituting the Vault Mgmt. Module 309 may cause the processor to perform operations. The operations may comprise receiving the human user biometric 203 from the Interface Module 303; transmitting the human user biometric 203 to a HU/PVA Binding Module 923 in the Cloud Computing System 900; receiving a request for the Unique PVA ID Key 1204 from the ID Generation Module 310; requesting the Unique PVA ID Key 1204 from the Vault 315; receiving the Unique PVA ID Key 1204 from the Vault; transmitting the Unique PVA ID Key 1204 to the ID Generation Module 310; receiving a request for the Binding Key 1212 from the HU/PVA Binding Module 923; requesting the Binding Key 1212 from the Vault 315; receiving the Binding Key 1212 from the Vault 315; transmitting the Binding Key 1212 to the HU/PVA Binding Module 923; receiving a request for the PVA public encryption key 1251 from an Encryption Module 921 in the Cloud Computing System 900; requesting the PVA public encryption key 1251 from the Vault 315; receiving the PVA public encryption key 1251 from the Vault 315; transmitting the PVA public encryption key 1261 to the Encryption Module 921; receiving a request for the PVA private decryption key 1252 from a Decryption Module in the Cloud Computing System; requesting the PVA private decryption key 1252 from the Vault 315; receiving the PVA private decryption key 1252 from the Vault 315; transmitting the PVA private decryption key 1252 to the Decryption Module; receiving a request for the EOI Digital Seal Key 1801 from the Launch Initial Interaction Module 330; requesting the EOI Digital Seal Key 1801 from the Vault 315; receiving the EOI Digital Seal Key 1801 from the Vault 315; transmitting the EOI Digital Seal Key 1801 to the Launch Initial Interaction Module 330; receiving a request for the Unique PVA ID Key 1204 from the ID Generation Module 310; requesting the Unique PVA ID Key 1204 from the Vault 315; receiving the Unique PVA ID Key 1204 from the Vault 315; securely transmitting the PVA ID Key 1204 to the ID Generation Module 310; requesting a UPVAID 1205 from the Vault 315; receiving the UPVAID 1205 from the Vault 315; securely transmitting the UPVAID 1205 to a PVA Generation Module 920 in the Cloud Computing System 900; receiving a request for the UPVAID 1205 from the HU/PVA Biding Module 923; requesting the UPVAID 1205 from the Vault 315; receiving a request for the UPVAID 1205; securely transmitting the UPVAID 1205 to the HU/PVA Biding Module 923; receiving an EOI Transcript from the Launch Initial Interaction Module 330; and securely transmitting the EOI Transcript to an EOI Mgmt. Routine 925 in the Cloud Computing System 900.

In some embodiments, when executed by the processor of the personal computing device, the instructions constituting the ID Generation Module 310 may cause the processor to perform operations. The operations may comprise receiving the UUID 204 from the Interface Module 303; requesting the Unique PVA ID Key 1204 from the Vault Mgmt. Module; receiving the Unique PVA ID Key 1204 from the Vault Mgmt. Module; concatenating the UUID 204 and the Unique PVA ID Key 1204; securely transmitting the concatenation to a UPVAIDHash Module 311; receiving the UPVAID 1205 from the UPVAIDHash Module 311; and transmitting the UPVAID 1205 to the Vault 311 for storage.

In some embodiments, when executed by the processor of the personal computing device, the instructions constituting the UPVAIDHash Module 311 may cause the processor to perform operations. The operations may comprise receiving the concatenated the UUID 204 and the PVA ID Key 1204 from the ID Generation Module 310; generating a UPVAID 1205 by hashing the concatenated the UUID 204 and the PVA ID Key 1204; and securely transmitting the UPVAID 1205 to the ID Generation Module 310.

In some embodiments, when executed by the processor of the personal computing device, the instructions constituting the Launch Initial Interaction Module 330 may cause the processor to perform operations. The operations may comprise receiving an authorization to activate from a smart contract ChainVer 605 in the blockchain distributed ledger 600; initiating the EOI, between the human user 200 and a UniquePVA 1202 bound to the human user; recording in an EOI transcript 1800 an interaction between the human user 200 and the UniquePVA 1202; and transmitting the EOI transcript 1800 to the Vault Mgmt. Module 309.

In some embodiments, the blockchain distributed ledger 600 may comprise a smart contract UserReg 601, a smart contract TokenGen 602, a smart contract ChainWrit 603, a smart contract SealWrit 604, and a smart contract ChainVer 605, wherein each comprises computer-executable instructions.

In some embodiments, when executed by the processor of a computer in the network of independent computers that constitute the distributed database of the blockchain distributed ledger 600, the instructions constituting the smart contract UserReg 601 may cause the processor to perform operations. The operations may comprise receiving the human user key 210 and the UUID 204 from the Registration Module 306; writing the human user key 210 to a new block on the blockchain distributed ledger 600; transmitting the first human user key 210 and the UUID 204 to the smart contract TokenGen in the blockchain distributed ledger; and securely transmitting a confirmation that registration has been completed to the Registration Module 306.

In some embodiments, when executed by the processor of a computer in the network of independent computers that constitute the distributed database of the blockchain distributed ledger 600, the instructions constituting the smart contract TokenGen 602 may cause the processor to perform operations. The operations may comprise receiving the first human user key 210 and the UUID 204 from the smart contract UserReg 601; generating a unique non-fungible token using the human user key 210 and the UUID 204; generating a non-fungible token data string 615 using the non-fungible token; securely transmitting the non-fungible token data string 615 to the Digital DNA generation module 307; and securely transmitting a confirmation that the non-fungible token has been generated.

In some embodiments, when executed by the processor of a computer in the network of independent computers that constitute the distributed database of the blockchain distributed ledger 600, the instructions constituting a smart contract ChainWrit 603 may cause the processor to perform operations. The operations may comprise receiving a digital binding chain 1600 and the UPVAID 1205 from the HU/PVA Binding Module 923; and writing the digital binding chain 1600 and the UPVAID 1205 to a new block in the blockchain distributed ledger 600.

In some embodiments, when executed by the processor of a computer in the network of independent computers that constitute the distributed database of the blockchain distributed ledger 600, the instructions constituting a smart contract SealWrit 604 may cause the processor to perform operations. The operations may comprise receiving the EOI Digital Seal 1805 and the UPVAID 1205 from the EOI Mgmt. Module 925; and writing the EOI Digital Seal 1805 and the UPVAID 1205 to a new block in the blockchain distributed ledger 600.

In some embodiments, when executed by the processor of a computer in the network of independent computers that constitute the distributed database of the blockchain distributed ledger 600, the instructions constituting a smart contract ChainVer 605 may cause the processor to perform operations. The operations may comprise retrieving a first digital binding chain from the blockchain distributed ledger 600; receiving a second digital binding chain; determining whether the first digital binding chain and the second digital binding chain are identical; and securely transmitting to the Launch Initial Interaction Module 330 an authorization to activate if the first digital binding chain and the second digital binding chain are identical.

In some embodiments, the cloud computing system comprises a plurality of computing services, each comprising a processor capable of executing computer-executable instructions, RAM, and a storage service. In some embodiments, the storage service may comprise a PVA Generation Module 920, a Digital DNA Implant Module 922, an HU/PVA Binding Module 923, a ChainHash Module 905, an EOI Mgmt. Module 925, an EOIHash Module 904, and an Encryption Module 921.

In some embodiments, when executed by the processor of a computing service in the plurality of computing services that constitute the cloud computing system, the instructions constituting a PVA Generation Module 920 may cause the processor to perform operations. The operations may comprise receiving the UPVAID 1205 from the Vault Mgmt. Module 309; creating a personated virtual assistant (PVA), wherein the GenericPVA 1201 is an animated 2-dimensional or 3-dimensional digital figure configured to resemble the human user 200 or one of a plurality of human likenesses, communicate with the human user 200 and perform tasks under the direction of the human user 200; and transmitting securely the GenericPVA 1201 and the UPVAID 1205 to the Digital DNA implant module 922.

In some embodiments, when executed by the processor of a computing service in the plurality of computing services that constitute the cloud computing system, the instructions constituting a Digital DNA Implant Module 922 may cause the processor to perform operations. The operations may comprise receiving the GenericPVA 1201 and the UPVAID 1205 from the PVA Generation Module 920; receiving the Digital DNA 1400 from the Digital DNA Generation Module 307; creating a UniquePVA 1202 by implanting the Digital DNA 1400 into the GenericPVA 1201; and transmitting securely the UniquePVA 1202 to the HU/PVA Binding Module 923.

In some embodiments, when executed by the processor of a computing service in the plurality of computing services that constitute the cloud computing system, the instructions constituting a HU/PVA Binding Module 923 may cause the processor to perform operations. The operations may comprise receiving the human user biometric 203 from the Interface Module 303; receiving the Binding Key 1212 from the Vault Mgmt. Module 309; receiving the UniquePVA 1202 from the Digital DNA Implant Module 922; receiving the UPVAID 1205 from the Vault Mgmt. Module 309; concatenating the human user biometric 203, the binding key 1212 and the UniquePVA 1202; transmitting securely the concatenation to a ChainHash Module 905 in the Cloud Computing System 900; receiving the digital binding chain 1600 from the ChainHash module 905; and transmitting securely the digital binding chain 1600 and the UPVAID 1205 to the smart contract ChainWrit 603.

In some embodiments, when executed by the processor of a computing service in the plurality of computing services that constitute the cloud computing system, the instructions constituting a ChainHash Module 905 may cause the processor to perform operations. The operations may comprise receiving the concatenation of the human user biometric 203, the binding key 1212 and the UniquePVA 1202; generating the digital binding chain 1600 by hashing the concatenation of the human user biometric 203, the binding key 1212 and the UniquePVA 1202; and transmitting securely the digital binding chain 1600 to the HU/PVA Binding Module 923.

In some embodiments, when executed by the processor of a computing service in the plurality of computing services that constitute the cloud computing system, the instructions constituting an EOI Mgmt. Module 925 may cause the processor to perform operations. The operations may comprise receiving the EOI transcript 1800 from the Launch Initial Interaction Module 330; receiving the EOI seal key 1801 from the Vault Mgmt. Module 309; concatenating the EOI transcript 1800 and the EOI seal key 1801; transmitting securely the concatenation to an EOIHash Module 904 in the Cloud Computing System 900; receiving the EOI digital seal 1805 from the EOIHash module 904; and transmitting securely the EOI digital seal 1805 and the UPVAID 1205 to the smart contract SealWrit 604.

In some embodiments, when executed by the processor of a computing service in the plurality of computing services that constitute the cloud computing system, the instructions constituting an EOIHash Module 904 may cause the processor to perform operations. The operations may comprise receiving the concatenation of the EOI transcript 1800 and the EOI Digital Seal Key 1801; generating the EOI Digital Seal 1805 by hashing the concatenation; and transmitting securely the EOI Digital Seal 1805 to the EOI Mgmt. Module 925.

In some embodiments, when executed by the processor of a computing service in the plurality of computing services that constitute the cloud computing system, the instructions constituting an Encryption Module 921 may cause the processor to perform operations. The operations may comprise receiving the UniquePVA 1202 from the Digital DNA Implant Module 922; receiving the PVA public encryption key 1251 from the Vault Mgmt. Module 309; encrypting the UniquePVA 1202 using the PVA public encryption key 1251; and storing the encrypted UniquePVA 1202 in the Cloud Computing System 900.

In some embodiments, when executed by the processor of a computing service in the plurality of computing services that constitute the cloud computing system, the instructions constituting a PVA may cause the processor to perform operations. The operations may comprise receiving a plurality of Digital DNA 1454 segments which uniquely correspond to a human user 200; defining for each Digital DNA 1454 segment of the plurality of Digital DNA segments a vector 1431 within the GenericPVA 1201, wherein each vector 1431 of the plurality of vectors comprises origin coordinates and end coordinates, wherein the origin coordinates of each vector 1431 of the plurality of vectors are distinct from the origin coordinates of every other vector 1431 of the plurality of vectors, and wherein each vector 1431 of the plurality of vectors is nonparallel to every other vector 1431 of the plurality of vectors; assigning each Digital DNA 1454 segment of the plurality of Digital DNA segments to a respective vector 1431 of the plurality of vectors; and utilizing steganography to hide each Digital DNA 1454 segment of the plurality of Digital DNA segments along its respective vector 1431 such that the PVA is uniquely identified by the hidden Digital DNA 1454 segments.

As would be recognized by one of skill in the art, the description of the PRE in FIGS. 19A and 19B are not intended to be limiting. In some embodiments, additional elements may be added, and/or the depicted elements of the PRE may be combined, divided, modified, or removed. For example, envisioned embodiments may implement a superset or a subset of the depicted elements of the PRE. As an additional example, in some embodiments, blockchain distributed ledger 600 may be implemented with or combined into another element of PRE. In such embodiments, blockchain distributed ledger 600 may be stored in a non-transitory computer memory operated by the other element of the PRE.

Consistent with disclosed embodiments, processor may comprise a central processing unit (CPU), graphical processing unit (GPU), or similar microprocessor having one or more processing cores. Computing system may include one or more processors and may further operate with one or more other processors that are remote with respect to processors. Memory may include non-transitory memory containing non-transitory instructions, such as a computer hard disk, random access memory (RAM), removable storage, or remote computer storage. In some aspects, memory may be configured to store data and instructions, such as software programs. For example, memory may be configured to store data and instructions. In some aspects, processor may be configured to execute non-transitory instructions and/or programs stored on memory to configure computing system to perform operations of the disclosed systems and methods. In various aspects, as would be recognized by one of skill in the art, processor may be configured to execute non-transitory instructions and/or programs stored on a remote memory to perform operations of the disclosed systems and methods.

Display may be any device which provides a visual output, for example, a computer monitor, an LCD screen, etc. I/O interfaces may include hardware and/or a combination of hardware and software for communicating information to computing system from a user of computing system, such as a keyboard, mouse, trackball, audio input device, touch screen, infrared input interface, or similar device. Network adapter may include hardware and/or a combination of hardware and software for enabling computing system to exchange information using external networks, such as network. For example, network adapter may include a wireless wide area network (WWAN) adapter, a Bluetooth module, a near field communication (NFC) module, or a local area network (LAN) adapter.

Other embodiments will be apparent to those skilled in the art from consideration of the specification and practice of the disclosed embodiments disclosed herein. It is intended that the specification and examples be considered as exemplary only, with a true scope and spirit of the disclosed embodiments being indicated by the following claims. Furthermore, although aspects of the disclosed embodiments are described as being associated with data stored in memory and other tangible computer-executable storage mediums, one skilled in the art will appreciate that these aspects can also be stored on and executed from many types of tangible computer-executable media, such as secondary storage devices, like hard disks, floppy disks, or CD-ROM, or other forms of RAM or ROM. Accordingly, the invention is not limited to the disclosed embodiments, but instead is defined by the appended claims in light of their full scope of equivalents.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as example only, with a true scope and spirit being indicated by the following claims and their full scope of equivalents.

Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic and/or an appropriate combination thereof, as would be recognized by one skilled in the art to carry out the recited functions.) Software and firmware can be stored on computer-executable media. Some other processes can be implemented using analog circuitry, as is well known to one of ordinary skill in the art. Additionally, memory or other storage, as well as communication components, may be employed in embodiments of the invention.

Further, it should be appreciated that a cloud computing system 900 of FIGS. 19A and 19B may be embodied in any of a number of forms, such as a rack-mounted computer, mainframe, supercomputer, server, client, a desktop computer, a laptop computer, a tablet computer, hand-held computing device (e.g., PDA, cell phone, smart phone, palmtop, etc.), cluster grid, netbook, embedded systems, or any other type of special or general purpose computing device as may be desirable or appropriate for a given application or environment. Additionally, a computing system 900 can include a conventional network system including a client/server environment and one or more database servers, or integration with LIS/LIMS infrastructure. A number of conventional network systems, including a local area network (LAN) or a wide area network (WAN), and including wireless and/or wired components, are known in the art. Additionally, client/server environments, database servers, and networks are well documented in the art.

As used herein, the term "about" refers to plus or minus 10% of the referenced number.

While illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as example only, with a true scope and spirit being indicated by the following claims and their full scope of equivalents.

In some embodiments, the figures presented in this patent application are drawn to scale, including the angles, ratios of dimensions, etc. In other embodiments, the figures are representative only and the claims are not limited by the dimensions of the figures. In some embodiments, descriptions of the inventions described herein using the phrase "comprising" includes embodiments that could be described as "consisting of," and as such the written description requirement for claiming one or more embodiments of the present invention using the phrase "consisting of" is met.

The invention claimed is:

1. A Personated Reality Ecosystem (PRE) for authenticating a personated virtual assistant (PVA), the system comprising:
   a. a personal computing device, comprising a processor capable of executing computer-executable instructions, RAM, a disk, and at least one of a microphone, a video camera, a graphical user interface implemented on the multi-touch input surface, and a keyboard, wherein the disk comprises:
   i. an Interface Module (303), comprising instructions for:
      A. receiving, by one or more of the microphone and the keyboard, a registration request from a human user;
      B. receiving, by one or more of the microphone, the video camera, and the keyboard, a Unique User ID (UUID) (204) and a human user data, wherein the human user data comprises a biometric and a password from the human user,
      C. transmitting securely, by the Interface Module, the received human user biometric (203) to Vault Mgmt. Module (309),
      D. concatenating, by the Interface Module, the human user biometric (203) and the password,
      E. transmitting securely, by the Interface Module, the concatenation of the human user biometric (203) and the password to a human user key generator (305),
      F. receiving a human user key (210) from the human user key generator (305),
      G. transmitting securely the human user key (210) to a Registration Module (306),
      H. receiving, by one or more of the microphone, the graphical user interface implemented on a multi-touch input surface, and the keyboard, a request to initiate an Episode of Interaction (EOI), and
      I. transmitting securely, by the Interface Module, the EOI request to a Launch Initial Interaction Module (330),
   ii. the human user key generator (305),
   iii. the Registration Module (306), comprising instructions for:
      A. receiving the UUID (204) and the human user key (210) from the Interface Module (303),
      B. transmitting securely the UUID (204) and the human user key (210) to a smart contract UserReg (601) of a blockchain distributed ledger (600),
      C. receiving a confirmation from the smart contract UserReg (601) when registration has been completed,
      D. receiving a confirmation from a smart contract TokenGen (602) when a non-fungible token has been generated,
      E. authorizing a Digital DNA Generation Module (307) to proceed, upon receiving the confirmation that the registration is complete and the confirmation that the non-fungible token has been generated, and
      F. authorizing a Key Generation Module (308) to proceed, upon receiving the confirmation that the registration is complete and the confirmation that the non-fungible token has been generated,
   iv. the Digital DNA Generation Module (307), comprising instructions for:
      A. receiving the non-fungible token data string (615) from the smart contract TokenGen (602),
      B. dividing the non-fungible token data string (615) into a plurality of Digital DNA (1400) segments, and
      C. transmitting securely the Digital DNA (1400) segments to a Digital DNA Implant Module (922) in a Cloud Computing System (900),
   v. the Key Generation Module (308), comprising instructions for:
      A. receiving authorization to proceed from the Registration Module (306),
      B. generating a PVA ID Key (1204) upon receiving authorization to proceed from the Registration Module (306),
      C. transmitting securely the PVA ID Key (1204) to a Vault (315) for storage,
      D. generating a Binding Key (1212) upon receiving authorization to proceed from the Registration Module (306),
      E. transmitting securely the Binding Key (1212) to the Vault (315) for storage,
      F. generating a PVA public encryption key (1251) and a PVA private decryption key (1252) upon receiving authorization to proceed from the Registration Module (306),
      G. transmitting securely the PVA public encryption key (1251) and the PVA private decryption key (1252) to the Vault (315) for storage,
      H. generating an EOI public encryption key (1821) and an EOI private decryption key (1822),
      I. transmitting securely the EOI public encryption key (1821) and the private decryption key (1852) to the Vault (315) for storage,
      J. generating an EOI Digital Seal Key (1801) upon receiving authorization to proceed from the Registration Module (306), and
      K. transmitting securely the EOI Digital Seal Key (1801) to the Vault (315) for storage, vi. the Vault (315),
vii. the Vault Mgmt. Module (309), comprising instructions for:
A. receiving the human user biometric (203) from the Interface Module (303),
B. transmitting securely the human user biometric (203) to a Human User/Personalized Virtual Assistant (HU/PVA) Binding Module (923) in the Cloud Computing System (900),
C. receiving a request for a Unique Personalized Virtual Assistant (UPVAID) (1205) by the PVA Generation Module (920),
D. requesting the UPVAID (1205) from the Vault (315),
E. transmitting securely the UPVAID (1205) to PVA Generation Module (920),
F. receiving a request for the PVA ID Key (1204) from an ID Generation Module (310),
G. requesting the PVA ID Key (1204) from the Vault (315),
H. receiving the PVA ID Key (1204) from the Vault,
I. transmitting securely the PVA ID Key (1204) to the ID Generation Module (310),
J. receiving a request for the Binding Key (1212) from the HU/PVA Binding Module (923),
K. requesting the Binding Key (1212) from the Vault (315),
L. receiving the Binding Key (1212) from the Vault (315),
M. transmitting securely the Binding Key (1212) to the HU/PVA Binding Module (923),
N. receiving a request for the PVA public encryption key (1251) from an Encryption Module (921) in the Cloud Computing System (900),
O. requesting the PVA public encryption key (1251) from the Vault (315),
P. receiving the PVA public encryption key (1251) from the Vault (315),
Q. transmitting securely the PVA public encryption key (1251) to the Encryption Module (921),
R. receiving a request for the PVA private decryption key (1252) from a Decryption Module in the Cloud Computing System,
S. requesting the PVA private decryption key (1252) from the Vault (315),
T. receiving the PVA private decryption key (1252) from the Vault (315),
U. transmitting securely the PVA private decryption key (1252) to the Decryption Module,
V. receiving a request for the EOI Digital Seal Key (1801) from the EOI Mgmt. Module (925),
W. requesting the EOI Digital Seal Key (1801) from the Vault (315),
X. receiving the EOI Digital Seal Key (1801) from the Vault (315),
Y. transmitting securely the EOI Digital Seal Key (1801) to the Launch Initial Interaction Module (330),
Z. receiving a request for the PVA ID Key (1204) from the ID Generation Module (310),
AA. requesting the PVA ID Key (1204) from the Vault (315),
BB. receiving the PVA ID Key (1204) from the Vault (315),
CC. transmitting securely the PVA ID Key (1204) to the ID Generation Module (310),
DD. requesting the UPVAID (1205) from the Vault (315),
EE. receiving the UPVAID (1205) from the Vault (315),
FF. transmitting securely the UPVAID (1205) to a PVA Generation Module (920) in the Cloud Computing System (900),
GG. receiving a request for the UPVAID (1205) from the HU/PVA Biding Module (923),
HH. requesting the UPVAID (1205) from the Vault (315),
II. receiving a request for the UPVAID (1205),
JJ. transmitting securely the UPVAID (1205) to the HU/PVA Biding Module (923),
KK. receiving an EOI Transcript from the Launch Initial Interaction Module (330),
LL. transmitting securely the EOI Transcript to an EOI Mgmt. Routine (925) in the Cloud Computing System (900), and
MM. transmitting securely each Digital DNA (1454) segment of the plurality of Digital DNA segments with the origin coordinates and the end coordinates of each respective vector of the plurality of vectors to the Vault (315),
viii. the ID Generation Module (310), comprising instructions for:
A. receiving the UUID (204) from the Interface Module (303),
B. requesting the PVA ID Key (1204) from the Vault Mgmt. Module,
C. receiving the PVA ID Key (1204) from the Vault Mgmt. Module,
D. concatenating the UUID (204) and the PVA ID Key (1204),
E. transmitting securely the concatenation of the UUID (204) and the PVA ID Key (1204) to a UPVAIDHash Module (311),
F. receiving the UPVAID (1205) from the UPVAID-Hash Module (311), and
G. transmitting securely the UPVAID (1205) to the Vault (315) for storage, and
ix. the Launch Initial Interaction Module (330), comprising instructions for:
A. receiving an authorization to activate from a smart contract ChainVer (605) in the blockchain distributed ledger (600),
B. initiating the EOI, between the human user (200) and a UniquePVA (1202) bound to the human user,
C. recording in an EOI transcript (1800) an interaction between the human user (200) and the UniquePVA (1202), and
D. transmitting securely the EOI transcript (1800) to the EOI Mgmt. Module (925);
b. a blockchain distributed ledger (600), comprising:
i. the smart contract UserReg (601), comprising instructions for:
A. receiving the human user key (210) and the UUID (204) from the Registration Module (306),
B. writing the human user key (210) and the UUID (204) to a new block on the blockchain distributed ledger (600),
C. transmitting securely the human user key (210) and the UUID (204) to the smart contract TokenGen in the blockchain distributed ledger, and D. transmitting securely a confirmation that registration has been completed to the Registration Module (306), ii. the smart contract TokenGen (602), comprising instructions for:
  A. receiving the human user key (210) and the UUID (204) from the smart contract UserReg (601),
  B. generating a unique non-fungible token using the human user key (210) and the UUID (204),
  C. writing the unique non-fungible token and the UUID (204) to a new block on the blockchain distributed ledger (600),
  D. generating a non-fungible token data string (615) using the non-fungible token,
  E. transmitting securely the non-fungible token data string (615) to the Digital DNA generation module (307), and
  F. transmitting securely a confirmation that the non-fungible token has been generated, iii. a smart contract ChainWrit (603), comprising instructions for:
  A. receiving a digital binding chain (1600) and the UPVAID (1205) from the HU/PVA Binding Module (923), and
  B. writing the digital binding chain (1600) and the UPVAID (1205) to a new block in the blockchain distributed ledger (600), iv. a smart contract SealWrit (604), comprising instructions for:
  A. receiving the EOI Digital Seal (1805), the UUID (204) and the UPVAID (1205) from the EOI Mgmt. Module (925), and
  B. writing the EOI Digital Seal (1805), the UUID (204) and the UPVAID (1205) to a new block in the blockchain distributed ledger (600); and c. the cloud computing system, comprising a plurality of computing services, each comprising a processor capable of executing computer-executable instructions, RAM, and a storage service, wherein the storage service comprises:

i. the PVA Generation Module (920), comprising instructions for:
  A. requesting the UPVAID (1205) from the Vault Mgmt. Module (309),
  B. receiving the UPVAID (1205) from the Vault Mgmt. Module (309),
  C. creating a personated virtual assistant (PVA), wherein a GenericPVA (1201) is an animated 2-dimensional or 3-dimensional digital figure configured to:
    I. communicate with the human user (200) and
    II. perform tasks under the direction of the human user (200), and
  D. transmitting securely the GenericPVA (1201) and the UPVAID (1205) to the Digital DNA implant module (922), ii. a Digital DNA Implant Module (922), comprising instructions for:
  A. receiving the GenericPVA (1201) and the UPVAID (1205) from the PVA Generation Module (920),
  B. receiving authorization to proceed from the Registration Module (306),
  C. receiving the Digital DNA (1400) from the Digital DNA Generation Module (307),
  D. creating the UniquePVA (1202) by implanting the Digital DNA (1400) into the GenericPVA (1201), and
  E. transmitting securely the UniquePVA (1202) to the HU/PVA Binding Module (923), iii. the HU/PVA Binding Module (923), comprising instructions for:
  A. receiving the human user biometric (203) from the Interface Module (303),
  B. receiving the Binding Key (1212) from the Vault Mgmt. Module (309),
  C. receiving the UniquePVA (1202) from the Digital DNA Implant Module (922),
  D. receiving the UPVAID (1205) from the Vault Mgmt. Module (309),
  E. concatenating the human user biometric (203), the binding key (1212) and the UniquePVA (1202),
  F. transmitting securely the concatenation of the human user biometric (203), the binding key (1212) and the UniquePVA (1202) to a ChainHash Module (905) in the Cloud Computing System (900),
  G. receiving the digital binding chain (1600) from the ChainHash module (905), and
  H. transmitting securely the digital binding chain (1600) and the UPVAID (1205) to the smart contract ChainWrit (603), iv. the ChainHash Module (905), comprising instructions for:
  A. receiving the concatenation of the human user biometric (203), the binding key (1212) and the UniquePVA (1202),
  B. generating the digital binding chain (1600) by hashing the concatenation of the human user biometric (203), the binding key (1212) and the UniquePVA (1202), and
  C. transmitting securely the digital binding chain (1600) to the HU/PVA Binding Module (923), v. the EOI Mgmt. Module (925), comprising instructions for:
  A. receiving the EOI transcript (1800) from the Launch Initial Interaction Module (330),
  B. requesting the EOI Digital Seal Key (1801) from the Vault Mgmt. Module (309),
  C. receiving the EOI Digital Seal Key (1801) from the Vault Mgmt. Module (309),
  D. concatenating the EOI transcript (1800) and the EOI Digital Seal Key (1801),
  E. transmitting securely the concatenation of the EOI transcript (1800) and the EOI Digital Seal Key (1801) to an EOIHash Module (904) in the Cloud Computing System (900),
  F. receiving the EOI digital seal (1805) from the EOIHash module (904), and
  G. transmitting securely the EOI digital seal (1805) and the UPVAID (1205) to the smart contract SealWrit (604), vi. the EOIHash Module (904), and
  A. receiving the concatenation of the EOI transcript (1800) and the EOI Digital Seal Key (1801),
  B. generating the EOI Digital Seal (1805) by hashing the concatenation of the EOI transcript (1800) and the EOI Digital Seal Key (1801),
  C. transmitting securely the EOI Digital Seal (1805) to the EOI Mgmt. Module (925), and vii. the Encryption Module (921).

2. The system of claim 1, wherein the PVA is further configured to:
   a. resemble the human user (200) or one of a plurality of human likenesses.
3. The system of claim 1, wherein the human user key generator (305) comprises instructions for:
   a. receiving the concatenation of the human user biometric (203) and the password from the Interface Module (303),
   b. hashing the concatenation of the human user biometric (203) and the human user password to generate the human user key (210), and
   c. transmitting securely the human user key (210) to the Interface Module (303).
4. The system of claim 1, wherein the Vault (315) comprises instructions for:
   a. storage, comprising:
      i. receiving a key,
      ii. encrypting the key, and
      iii. storing the encrypted key, and
   b. access, comprising:
      i. receiving a request for a key,
      ii. retrieving the requested key,
      iii. decrypting the retrieved key, and
      iv. transmitting securely the decrypted key in response to the request.
5. The system of claim 1, wherein the UPVAIDHash Module (311) comprises instructions for:
   a. receiving the concatenation of the UUID (204) and the PVA ID Key (1204) from the ID Generation Module (310),
   b. generating a UPVAID (1205) by hashing the concatenation of the UUID (204) and the PVA ID Key (1204), and
   c. transmitting securely the UPVAID (1205) to the ID Generation Module (310).
6. The system of claim 1, wherein the Encryption Module (921) comprises instructions for:
   a. receiving the UniquePVA (1202) from the Digital DNA Implant Module (922),
   b. receiving the PVA public encryption key (1251) from the Vault Mgmt. Module (309),
   c. encrypting the UniquePVA (1202) using the PVA public encryption key (1251), and
   d. storing the encrypted UniquePVA (1202) in the Cloud Computing System (900).
7. The system of claim 1, wherein the EOIHash Module (904) comprises instructions for:
   a. receiving the concatenation of the EOI transcript (1800) and the EOI Digital Seal Key (1801),
   b. generating the EOI Digital Seal (1805) by hashing the concatenation of the EOI transcript (1800) and the EOI Digital Seal Key (1801), and
   c. transmitting securely the EOI Digital Seal (1805) to the EOI Mgmt. Module (925).
8. A method of authenticating a personated virtual assistant (PVA) comprising:
   i. receiving, by one or more of a microphone or a keyboard of a Personal Computing Device, a registration request from a human user,
   ii. receiving, by the Personal Computing Device, a Unique User ID (UUID) (204) and a human user data, wherein the human user data comprises a biometric (203) and a password from the human user,
   iii. transmitting securely, by an Interface Module (303), the received human user biometric (203) to a Vault Mgmt. Module (309) in the Personal Computing Device,
   iv. receiving, by the Vault Mgmt. Module (309), the human user biometric (203) from the Interface Module (303),
   v. transmitting securely, by the Vault Mgmt. Module (309), the human user biometric (203) to a HU/PVA Binding Module (923) in a Cloud Computing System (900),
   vi. receiving, by the HU/PVA Binding Module (923), the human user biometric (203) from the Interface Module (303),
   vii. concatenating, by the Interface Module, the human user biometric (203) and the password,
   viii. transmitting securely, by the Interface Module, the concatenation of the human user biometric (203) and the password to a human user key generator (305) in the Personal Computing Device,
   ix. receiving, by human user key generator (305), the concatenation of the human user biometric (203) and the password from the Interface Module (303),
   x. generating, by human user key generator (305), a human user key (210) by hashing the concatenation of the human user biometric (203) and the human user password,
   xi. transmitting securely, by human user key generator (305), the human user key (210) to the Interface Module (303),
   xii. receiving, by the Interface Module, a human user key (210) from the human user key generator (305),
   xiii. transmitting securely, by the Interface Module, the human user key (210) to a Registration Module (306),
   xiv. receiving, by the Registration Module (306), the UUID (204) and the human user key (210) from the Interface Module (303),
   xv. transmitting securely, by the Registration Module (306), the UUID (204) and the human user key (210) to a smart contract UserReg (601) of a blockchain distributed ledger (600),
   xvi. receiving, by the smart contract UserReg (601), the human user key (210) and the UUID (204) from the Registration Module (306),
   xvii. writing, by the smart contract UserReg (601), the human user key (210) to a new block on the blockchain distributed ledger (600),
   xviii. transmitting securely, by the smart contract UserReg (601), the human user key (210) and the UUID (204) to a smart contract TokenGen in the blockchain distributed ledger,
   xix. transmitting securely, by the smart contract UserReg (601), a confirmation that registration has been completed to the Registration Module (306),
   xx. receiving, by the smart contract TokenGen (602), the human user key (210) and the UUID (204) from the smart contract UserReg (601),
   xxi. generating, by the smart contract TokenGen (602), a unique non-fungible token using the human user key (210) and the UUID (204),
   xxii. writing, by the smart contract TokenGen (603), the unique non-fungible token and the UUID (204) to a new block on the blockchain distributed ledger (600),
   xxiii. generating, by the smart contract TokenGen (602), a non-fungible token data string (615) using the non-fungible token, xxiv. transmitting securely, by the smart contract TokenGen (602), the non-fungible token data string (615) to a Digital DNA generation module (307), xxv. transmitting securely, by the smart contract TokenGen (602), a confirmation that the non-fungible token has been generated, xxvi. receiving, by the Registration Module (306), a confirmation from the smart contract UserReg (601) when registration has been completed, xxvii. receiving, by the Registration Module (306), a confirmation from the smart contract TokenGen (602) when a non-fungible token has been generated, xxviii. authorizing, by the Registration Module (306), the Digital DNA Generation Module (307) to proceed, upon receiving the confirmation that the registration is complete and the confirmation that the non-fungible token has been generated, xxix. receiving, by the Digital DNA Generation Module (307), the non-fungible token data string (615) from the smart contract TokenGen (602), xxx. receiving, by the Digital DNA Generation Module (307), authorization to proceed from the Registration Module (306), xxxi. dividing, by the Digital DNA Generation Module (307), the non-fungible token data string (615) into a plurality of Digital DNA (1400) segments, xxxii. transmitting securely, by the Digital DNA Generation Module (307), the Digital DNA (1400) segments to a Digital DNA Implant Module (922) in the Cloud Computing System (900), xxxiii. receiving, by a Digital DNA Implant Module (922), the Digital DNA (1400) from the Digital DNA Generation Module (307), xxxiv. transmitting securely, by the Interface Module (303), the UUID (204) to the ID Generation Module (310), xxxv. receiving, by the ID Generation Module (310), the UUID (204) from the Interface Module (303), xxxvi. requesting, by the ID Generation Module (310), a PVA ID Key (1204) from the Vault Mgmt. Module (309), xxxvii. receiving, by the Vault Mgmt. Module (309), a request for the PVA ID Key (1204) from the ID Generation Module (310), xxxviii. requesting, by the Vault Mgmt. Module (309), the PVA ID Key (1204) from a Vault (315), xxxix. receiving, by the Vault (315), a request for the PVA ID Key (1204), xl. retrieving, by the Vault (315), the requested the PVA ID Key (1204), xli. decrypting, by the Vault (315), the retrieved PVA ID Key (1204), xlii. transmitting securely, by the Vault (315), the decrypted PVA ID Key (1204) in response to the request, xliii. transmitting securely, by the Vault Mgmt. Module (309), the PVA ID Key (1204) to the ID Generation Module (310), xliv. receiving, by the ID Generation Module (310), the PVA ID Key (1204) from the Vault Mgmt. Module, xlv. concatenating, by the ID Generation Module (310), the UUID (204) and the PVA ID Key (1204), xlvi. transmitting securely, by the ID Generation Module (310), the concatenation of the UUID (204) and the PVA ID Key (1204) to a UPVAIDHash Module (311), xlvii. receiving, by the UPVAIDHash Module (311), the concatenation of the UUID (204) and the PVA ID Key (1204) from the ID Generation Module (310), xlviii. generating, by the UPVAIDHash Module (311), a UPVAID (1205) by hashing the concatenation of the UUID (204) and the PVA ID Key (1204), xlix. transmitting securely, by the UPVAIDHash Module (311), the UPVAID (1205) to the ID Generation Module (310), l. receiving, by the ID Generation Module (310), the UPVAID (1205) from the UPVAIDHash Module (311), li. transmitting securely, by the ID Generation Module (310), the UPVAID (1205) to the Vault (315) for storage, lii. receiving, by the Vault (315), the UPVAID (1205), liii. encrypting, by the Vault (315), the UPVAID (1205), liv. storing the encrypted UPVAID (1205), lv. requesting, by a PVA Generation Module (920), the UPVAID (1205) from the Vault Mgmt. Module (309), lvi. receiving a request, by the Vault Mgmt. Module (309), for UPVAID (1205), lvii. requesting, by the Vault Mgmt. Module (309), the UPVAID (1205) from the Vault (315), lviii. receiving, by the Vault (315), a request for the PVA ID Key (1204), lix. retrieving, by the Vault (315), the requested the PVA ID Key (1204), lx. decrypting, by the Vault (315), the retrieved the PVA ID Key (1204), lxi. transmitting securely, by the Vault (315), the decrypted PVA ID Key (1204) in response to the request, lxii. receiving, by the Vault Mgmt. Module (309), the UPVAID (1205) from the Vault (315), lxiii. transmitting securely, by the Vault Mgmt. Module (309), the UPVAID (1205) to a PVA Generation Module (920) in the Cloud Computing System (900), lxiv. receiving, by the PVA Generation Module (920), the UPVAID (1205) from the Vault Mgmt. Module (309), lxv. creating, by the PVA Generation Module (920), a personated virtual assistant (PVA), wherein a GenericPVA (1201) is an animated 2-dimensional or 3-dimensional digital figure configured to communicate with the human user (200) and perform tasks under the direction of the human user (200), lxvi. transmitting securely, by the PVA Generation Module (920), the GenericPVA (1201) and the UPVAID (1205) to the Digital DNA implant module (922), lxvii. receiving, by a Digital DNA Implant Module (922), the GenericPVA (1201) and the UPVAID (1205) from the PVA Generation Module (920), lxviii. creating, by a Digital DNA Implant Module (922), a UniquePVA (1202) by implanting the Digital DNA (1400) into the GenericPVA (1201), lxix. transmitting securely, by the Digital DNA Implant Module (922), the UniquePVA (1202) to a Encryption Module (921), lxx. receiving, by the Encryption Module (921), the UniquePVA (1202) from the Digital DNA Implant Module (922), lxxi. requesting, by the Encryption Module (921), a PVA public encryption key (1251) from the Vault Mgmt. Module (309), lxxii. receiving, by the Vault Mgmt. Module (309), a request for the PVA public encryption key (1251) from an Encryption Module (921) in the Cloud Computing System (900), lxxiii. requesting, by the Vault Mgmt. Module (309), the PVA public encryption key (1251) from the Vault (315), lxxiv. receiving, by the Vault (315), a request for the PVA public encryption key (1251), lxxv. retrieving, by the Vault (315), the requested the PVA public encryption key (1251), lxxvi. decrypting, by the Vault (315), the retrieved the PVA public encryption key (1251), lxxvii. transmitting securely, by the Vault (315), the decrypted PVA public encryption key (1251) in response to the request, lxxviii. receiving, by the Vault Mgmt. Module (309), the PVA public encryption key (1251) from the Vault (315), lxxix. transmitting securely, by the Vault Mgmt. Module (309), the PVA public encryption key (1251) to the Encryption Module (921), lxxx. receiving, by the Encryption Module (921), the PVA public encryption key (1251) from the Vault Mgmt. Module (309), lxxxi. encrypting, by the Encryption Module (921), the UniquePVA (1202) using the PVA public encryption key (1251), lxxxii. storing, by the Encryption Module (921), an encrypted UniquePVA (1202) in the Cloud Computing System (900), lxxxiii. transmitting securely, by a Digital DNA Implant Module (922), the UniquePVA (1202) to the HU/PVA Binding Module (923), lxxxiv. receiving, by the HU/PVA Binding Module (923), the UniquePVA (1202) from the Digital DNA Implant Module (922), lxxxv. requesting, by the HU/PVA Binding Module (923), a Binding Key (1212) from the Vault Mgmt. Module (309), lxxxvi. receiving, by the Vault Mgmt. Module (309), a request for the Binding Key (1212) from the HU/PVA Binding Module (923), lxxxvii. requesting, by the Vault Mgmt. Module (309), the Binding Key (1212) from the Vault (315), xxxviii. receiving, by the Vault (315), a request for the Binding Key (1212), lxxxix. retrieving, by the Vault (315), the requested the Binding Key (1212), xc. decrypting, by the Vault (315), the retrieved the Binding Key (1212), xci. transmitting securely, by the Vault (315), the decrypted Binding Key (1212) in response to the request, xcii. receiving, by the Vault Mgmt. Module (309), the Binding Key (1212) from the Vault (315), xciii. transmitting securely, by the Vault Mgmt. Module (309), the Binding Key (1212) to the HU/PVA Binding Module (923), xciv. receiving, by the HU/PVA Binding Module (923), the Binding Key (1212) from the Vault Mgmt. Module (309), xcv. requesting, by the HU/PVA Binding Module (923), the UPVAID (1205) from the Vault Mgmt. Module (309), xcvi. receiving, by the Vault Mgmt. Module (309), a request for the UPVAID (1205) from the HU/PVA Biding Module (923), xcvii. requesting, by the Vault Mgmt. Module (309), the UPVAID (1205) from the Vault (315), xcviii. receiving, by the Vault (315), a request for the UPVAID (1205), xcix. retrieving, by the Vault (315), the requested the UPVAID (1205), c. decrypting, by the Vault (315), the retrieved the UPVAID (1205), ci. transmitting securely, by the Vault (315), the decrypted UPVAID (1205) in response to the request, cii. receiving, by the Vault Mgmt. Module (309), the UPVAID (1205) from the Vault (315), ciii. transmitting securely, by the Vault Mgmt. Module (309), the UPVAID (1205) to the HU/PVA Biding Module (923), civ. receiving, by the HU/PVA Binding Module (923), the UPVAID (1205) from the Vault Mgmt. Module (309), cv. concatenating, by the HU/PVA Binding Module (923), the human user biometric (203), the binding key (1212) and the UniquePVA (1202), cvi. transmitting securely, by the HU/PVA Binding Module (923), the concatenation of the human user biometric (203), the binding key (1212) and the UniquePVA (1202) to a ChainHash Module (905) in the Cloud Computing System (900), cvii. receiving, by the ChainHash Module (905), the concatenation of the human user biometric (203), the binding key (1212) and the UniquePVA (1202), cviii. generating, by the ChainHash Module (905), a digital binding chain (1600) by hashing the concatenation of the human user biometric (203), the binding key (1212) and the UniquePVA (1202, by the ChainHash Module (905), securely the digital binding chain (1600) to the HU/PVA Binding Module (923), cix. receiving, by the HU/PVA Binding Module (923), the digital binding chain (1600) from the ChainHash module (905), cx. transmitting securely, by the HU/PVA Binding Module (923), the digital binding chain (1600) and the UPVAID (1205) to a smart contract ChainWrit (603), cxi. receiving, by the smart contract ChainWrit (603), the digital binding chain (1600) and the UPVAID (1205) from the HU/PVA Binding Module (923), cxii. writing, by the smart contract ChainWrit (603), the digital binding chain (1600) and the UPVAID (1205) to a new block in the blockchain distributed ledger (600), cxiii. authorizing, by the Registration Module (306), aKey Generation Module (308) to proceed, upon receiving the confirmation that the registration is complete and the confirmation that the non-fungible token has been generated, cxiv. receiving, by the Key Generation Module (308), authorization to proceed from the Registration Module (306), cxvy. generating, by the Key Generation Module (308), a PVA ID Key (1204) upon receiving authorization to proceed from the Registration Module (306), cxvi. transmitting securely, by the Key Generation Module (308), the PVA ID Key (1204) to the Vault (315) for storage, cxvii. generating, by the Key Generation Module (308), a PVA public encryption key (1251) and a PVA private decryption key (1252) upon receiving authorization to proceed from the Registration Module (306), cxviii. transmitting securely, by the Key Generation Module (308), the PVA public encryption key (1251) and the PVA private decryption key (1252) to the Vault (315) for storage, cxix. receiving, by the Vault (315), the PVA ID Key (1204), cxx. encrypting, by the Vault (315), the PVA ID Key (1204), cxxi. storing the encrypted the PVA ID Key (1204), cxxii. generating, by the Key Generation Module (308), a Binding Key (1212) upon receiving authorization to proceed from the Registration Module (306), cxxiii. transmitting securely, by the Key Generation Module (308), the Binding Key (1212) to the Vault (315) for storage, cxxiv. receiving, by the Vault (315), the Binding Key (1212), cxxv. encrypting, by the Vault (315), the Binding Key (1212), cxxvi. storing the encrypted the Binding Key (1212), cxxvii. receiving, by the Vault (315), the PVA public encryption key (1251) and the PVA private decryption key (1252), cxxviii. encrypting, by the Vault (315), the PVA public encryption key (1251) and the PVA private decryption key (1252), cxxix. storing the encrypted PVA public encryption key (1251) and the encrypted PVA private decryption key (1252), cxxx. receiving, by one or more of the microphone or the keyboard, a request to initiate an Episode of Interaction (EOI), cxxxi. transmitting securely, by the Interface Module, the EOI request to a Launch Initial Interaction Module (330), cxxxii. initiating, by the Launch Initial Interaction Module (330), the EOI, between the human user (200) and the UniquePVA (1202) bound to the human user, cxxxiii. recording, by the Launch Initial Interaction Module (330), in an EOI transcript (1800) an interaction between the human user (200) and the UniquePVA (1202), cxxxiv. transmitting securely, by the Launch Initial Interaction Module (330), the EOI transcript (1800) to the Vault Mgmt. Module (309), cxxxv. receiving, by the Vault Mgmt. Module (309), an EOI Transcript from the Launch Initial Interaction Module (330), cxxxvi. transmitting securely, by the Vault Mgmt. Module (309), the EOI transcript to an EOI Mgmt. Module (925) in the Cloud Computing System (900), :xxxvii. receiving, by the EOI Mgmt. Module (925), the EOI transcript (1800), xxxviii. requesting, by the EOI Mgmt. Module (925), an EOI Digital Seal Key (1801) from the Vault Mgmt. Module (309), cxxxix. receiving, by the Vault Mgmt. Module (309), a request for the EOI Digital Seal Key (1801) from the EOI Mgmt. Module (925), cxl. requesting, by the Vault Mgmt. Module (309), the EOI Digital Seal Key (1801) from the Vault (315), cxli. receiving, by the Vault (315), a request for the EOI Digital Seal Key (1801), cxlii. retrieving, by the Vault (315), the requested EOI Digital Seal Key (1801), cxliii. decrypting, by the Vault (315), the retrieved EOI Digital Seal Key (1801), cxliv. transmitting securely, by the Vault (315), the decrypted EOI Digital Seal Key (1801) in response to the request, cxlv. receiving, by the Vault Mgmt. Module (309), the EOI Digital Seal Key (1801) from the Vault (315), cxlvi. transmitting securely, by the Vault Mgmt. Module (309), the EOI Digital Seal Key (1801) to the EOI Mgmt. Module (925), cxlvii. receiving, by the EOI Mgmt. Module (925), the EOI Digital Seal Key (1801) from the Vault Mgmt. Module (309), cxlviii. concatenating, by the EOI Mgmt. Module (925), the EOI transcript (1800) and the EOI Digital Seal Key (1801), cxlix. transmitting securely, by the EOI Mgmt. Module (925), the concatenation of the EOI transcript (1800) and the EOI Digital Seal Key (1801) to an EOIHash Module (904) in the Cloud Computing System (900), cl. receiving, by the EOIHash Module (904), the concatenation of the EOI transcript (1800) and the EOI Digital Seal Key (1801), cli. generating, by the EOIHash Module (904), an EOI Digital Seal (1805) by hashing the concatenation of the EOI transcript (1800) and the EOI Digital Seal Key (1801), clii. transmitting securely, by the EOIHash Module (904), the EOI Digital Seal (1805) to the EOI Mgmt. Module (925), cliii. receiving, by the EOI Mgmt. Module (925), the EOI digital seal (1805) from the EOIHash module (904), cliv. transmitting securely, by the EOI Mgmt. Module (925), the EOI digital seal (1805) and the UPVAID (1205) to a smart contract SealWrit (604), clv. receiving, by the smart contract SealWrit (604), the EOI Digital Seal (1805) and the UPVAID (1205) from the EOI Mgmt. Module (925), clvi. writing, by the smart contract SealWrit (604), the EOI Digital Seal (1805) and the UPVAID (1205) to a new block in the blockchain distributed ledger (600), clvii. generating, by the Key Generation Module (308), an EOI public encryption key (1821) and an EOI private decryption key (1822), clviii. transmitting securely, by the Key Generation Module (308), the EOI public encryption key (1821) and the private decryption key (1852) to the Vault (315) for storage, clix. generating, by the Key Generation Module (308), the EOI Digital Seal Key (1801) upon receiving authorization to proceed from the Registration Module (306), clx. transmitting securely, by the Key Generation Module (308), the EOI Digital Seal Key (1801) to the Vault (315) for storage, clxi. receiving, by the Vault Mgmt. Module (309), a request for the PVA private decryption key (1252) from a Decryption Module in the Cloud Computing System, clxii. requesting, by the Vault Mgmt. Module (309), the PVA private decryption key (1252) from the Vault (315), clxiii. receiving, by the Vault (315), a request for the PVA private decryption key (1252), clxiv. retrieving, by the Vault (315), the requested PVA private decryption key (1252), clxv. decrypting, by the Vault (315), the retrieved PVA private decryption key (1252), clxvi. transmitting securely, by the Vault (315), the decrypted PVA private decryption key (1252) to the Vault Mgmt. Module (309), clxvii. receiving, by the Vault Mgmt. Module (309), the PVA private decryption key (1252) from the Vault (315), clxviii. transmitting securely, by the Vault Mgmt. Module (309), the PVA private decryption key (1252) to the Decryption Module, clxix. transmitting securely each Digital DNA (1454) segment of the plurality of Digital DNA segments with a plurality of origin coordinates and a plurality of end coordinates of each respective vector of the plurality of vectors to the Vault Mgmt. Module (309), clxx. transmitting securely, by the Vault Mgmt. Module (309), each Digital DNA (1454) segment of the plurality of Digital DNA segments with the origin coordinates and the end coordinates of each respective vector of the plurality of vectors to the Vault (315), clxxi. retrieving, by a smart contract ChainVer (605), a first digital binding chain from the blockchain distributed ledger (600), clxxii. receiving, by a smart contract ChainVer (605), a second digital binding chain, clxxiii. determining, by a smart contract ChainVer (605), whether the first digital binding chain and the second digital binding chain are identical, clxxiv. transmitting securely, by a smart contract ChainVer (605), an authorization to activate to the Launch Initial Interaction Module (330) if the first digital binding chain and the second digital binding chain are identical, and clxxv. receiving, by the Launch Initial Interaction Module (330), an authorization to activate from a smart contract ChainVer (605) in the blockchain distributed ledger (600).

9. The method of claim 8, wherein the created PVA is further configured to:
   a. resemble the human user (200) or one of a plurality of human likenesses.

10. The method of claim 8, further comprising:
   a. receiving the concatenation of the human user biometric (203) and the password from the Interface Module (303),
   b. hashing the concatenation of the human user biometric (203) and the human user password to generate the human user key (210), and
   c. transmitting securely the human user key (210) to the Interface Module (303).

11. The method of claim 8, further comprising:
   a. a method of storage, comprising:
      i. receiving a key,
      ii. encrypting the key, and
      iii. storing the encrypted key, and
   b. a method of access, comprising:
      i. receiving a request for a key,
      ii. retrieving the requested key,
      iii. decrypting the retrieved key, and
      iv. transmitting securely the decrypted key in response to the request.

12. The method of claim 8, further comprising:
   a. receiving the concatenation of the UUID (204) and the PVA ID Key (1204) from the ID Generation Module (310),
   b. generating a UPVAID (1205) by hashing the concatenation of the UUID (204) and the PVA ID Key (1204), and
   c. transmitting securely the UPVAID (1205) to the ID Generation Module (310).

13. The method of claim 8, further comprising:
   a. receiving the UniquePVA (1202) from the Digital DNA Implant Module (922),
   b. receiving the PVA public encryption key (1251) from the Vault Mgmt. Module (309),
   c. encrypting the UniquePVA (1202) using the PVA public encryption key (1251), and
   d. storing the encrypted UniquePVA (1202) in the Cloud Computing System (900).

14. The method of claim 8, further comprising:
   a. receiving the concatenation of the EOI transcript (1800) and the EOI Digital Seal Key (1801),
   b. generating the EOI Digital Seal (1805) by hashing the concatenation of the EOI transcript (1800) and the EOI Digital Seal Key (1801), and
   c. transmitting securely the EOI Digital Seal (1805) to the EOI Mgmt. Module (925).

15. A non-transitory computer-readable storage medium storing computer-executable instructions for generating a unique personated virtual assistant (UniquePVA), wherein the computer-executable instructions comprise instructions for:
   a. generating a personated virtual assistant (PVA), comprising a 2-dimensional or 3-dimensional digital figure, the digital figure comprising a human likeness,
   b. receiving a plurality of Digital DNA (1454) segments which uniquely correspond to a human user (200),
   c. defining for each Digital DNA (1454) segment of the plurality of Digital DNA segments a vector (1431) within a GenericPVA (1201),
      i. wherein each vector (1431) of the plurality of vectors comprises origin coordinates and end coordinates,
      ii. wherein the origin coordinates of each vector (1431) of the plurality of vectors are distinct from the origin coordinates of every other vector (1431) of the plurality of vectors, and
      iii. wherein each vector (1431) of the plurality of vectors is nonparallel to every other vector (1431) of the plurality of vectors,
   d. assigning each Digital DNA (1454) segment of the plurality of Digital DNA segments to a respective vector (1431) of the plurality of vectors, and
   e. utilizing steganography to hide each Digital DNA (1454) segment of the plurality of Digital DNA segments along its respective vector (1431) such that the PVA is uniquely identified by the hidden Digital DNA (1454) segments.

16. The non-transitory computer-readable storage medium of claim 15,
   wherein the origin coordinates comprise:
      a. XY coordinates when the PVA is 2-dimensional, and
      b. XYZ coordinates when the PVA is 3-dimensional, and
   wherein the end coordinates comprise:
      a. XY coordinates when the PVA is 2-dimensional, and
      b. XYZ coordinates when the PVA is 3-dimensional.

17. The non-transitory computer-readable storage medium of claim 15, wherein the instructions for utilizing steganography further comprise:
   a. matching, for each Digital DNA (1454) segment of the plurality of Digital DNA segments, a change of one or more of the origin coordinates and the end coordinates of each respective vector of the plurality of vectors responsive to one or more of translation, rotation, reflection, and dilation.

18. The non-transitory computer-readable storage medium of claim 16, wherein the instructions for utilizing steganography further comprise:
   a. matching one or more of a font, a size, a color, a letter case, a letter spacing, a gradient, a texture, a shadow, a reflection, a glow, a bevel, and a lighting of each of the plurality of segments to one or more of a font, a size, a color, a letter case, a letter spacing, a gradient, a texture, a shadow, a reflection, a glow, a bevel, and a lighting of a contiguous area of the PVA.

19. The non-transitory computer-readable storage medium of claim 15, wherein the instructions further comprise:
   a. storing each Digital DNA (1454) segment of the plurality of Digital DNA segments with the origin coordinates and the end coordinates of each respective vector of the plurality of vectors.

20. The non-transitory computer-readable storage medium of claim 15, wherein the instructions further comprise:
   a. selecting a human likeness, wherein the human likeness is either:
      i. a likeness of the human user (200) or
      ii. a human likeness of a plurality of human likenesses.

\* \* \* \* \*